US012569893B1

(12) United States Patent
Pinsky et al.

(10) Patent No.: US 12,569,893 B1
(45) Date of Patent: Mar. 10, 2026

(54) MEDICATION DISPOSAL SYSTEMS AND METHODS OF USE THEREOF

(71) Applicant: MIDAS Healthcare Solutions, Inc., Center Moriches, NY (US)

(72) Inventors: Jonathan Pinsky, Pleasantville, NY (US); Jeffrey R. Wahl, Beachwood, OH (US); Michael A. Lafauci, Center Moriches, NY (US)

(73) Assignee: MIDAS Healthcare Solutions, Inc., Center Moriches, NY (US)

( * ) Notice: Subject to any disclaimer, the term of this patent is extended or adjusted under 35 U.S.C. 154(b) by 0 days.

(21) Appl. No.: 19/182,226

(22) Filed: Apr. 17, 2025

Related U.S. Application Data

(63) Continuation of application No. 17/492,058, filed on Oct. 1, 2021, now abandoned, which is a continuation (Continued)

(51) Int. Cl.
*B09B 3/00* (2022.01)
*G06V 40/16* (2022.01)
*B09B 101/65* (2022.01)

(52) U.S. Cl.
CPC .............. *B09B 3/00* (2013.01); *G06V 40/172* (2022.01); *B09B 2101/65* (2022.01)

(58) Field of Classification Search
CPC ...... B09B 3/00; B09B 2101/65; G06V 40/172
See application file for complete search history.

(56) References Cited

U.S. PATENT DOCUMENTS

| | | | |
|---|---|---|---|
| 9,283,321 | B2 | 3/2016 | Nelson et al. |
| 9,662,062 | B2 | 5/2017 | De Guia et al. |

(Continued)

FOREIGN PATENT DOCUMENTS

| | | |
|---|---|---|
| CN | 118405390 A | 7/2024 |
| EP | 1941411 B1 | 9/2011 |

(Continued)

OTHER PUBLICATIONS

EP20220750569.0 Extended European Search Report dated Oct. 25, 2024.

(Continued)

*Primary Examiner* — Timothy A Musselman
(74) *Attorney, Agent, or Firm* — Wilson Sonsini Goodrich & Rosati

(57) ABSTRACT

The present disclosure provides systems and methods for medication disposal, e.g., at a medical institution or a pharmacy. For example, a system for medical disposal can comprise a receiving unit configured to receive a medication from a user. The medication can be an unused or leftover portion of a prescribed medication for a subject in need thereof. The system can comprise one or more sensors operatively coupled to the receiving unit. The one or more sensors can be configured to detect the medication received by the receiving unit. The system can comprise an analysis engine operatively coupled to the one or more sensors. The analysis engine can be configured to determine a score indicative of a management of the prescribed medication by the user, based at least in part on (i) the detection of the medication received.

21 Claims, 41 Drawing Sheets

Related U.S. Application Data of application No. PCT/US2020/026434, filed on Apr. 2, 2020.

(60) Provisional application No. 62/873,610, filed on Jul. 12, 2019, provisional application No. 62/830,215, filed on Apr. 5, 2019.

(56) References Cited

U.S. PATENT DOCUMENTS

| | | | |
|---|---|---|---|
| 11,481,739 B1 * | 10/2022 | McKinzie | G01G 19/52 |
| 2006/0200365 A1 | 9/2006 | Mallett et al. | |
| 2008/0195247 A1 | 8/2008 | Mallett et al. | |
| 2008/0198021 A1 | 8/2008 | Flood | |
| 2009/0014461 A1 | 1/2009 | Omura et al. | |
| 2010/0211005 A1 * | 8/2010 | Edwards | A61M 15/008 |
| | | | 604/82 |
| 2012/0059911 A1 | 3/2012 | Randhawa et al. | |
| 2012/0065999 A1 | 3/2012 | Takatoku et al. | |
| 2012/0210252 A1 | 8/2012 | Fedoseyeva et al. | |
| 2012/0226447 A1 * | 9/2012 | Nelson | G16H 40/60 |
| | | | 702/25 |
| 2013/0046555 A1 | 2/2013 | Hyde et al. | |
| 2013/0179282 A1 * | 7/2013 | Leuck | G06Q 30/06 |
| | | | 705/26.1 |
| 2013/0282392 A1 | 10/2013 | Wurm | |
| 2013/0325727 A1 | 12/2013 | Macdonell et al. | |
| 2014/0190845 A1 | 7/2014 | Maness | |
| 2014/0318078 A1 | 10/2014 | Kondo et al. | |
| 2015/0144012 A1 | 5/2015 | Frybarger | |
| 2017/0255760 A1 | 9/2017 | Lee et al. | |
| 2018/0300994 A1 | 10/2018 | Nelson et al. | |
| 2019/0244699 A1 | 8/2019 | Loebig et al. | |
| 2020/0365244 A1 | 11/2020 | Shah et al. | |
| 2021/0027259 A1 | 1/2021 | Burgess et al. | |
| 2022/0254470 A1 | 8/2022 | Lafauci et al. | |
| 2024/0212815 A1 | 6/2024 | Lafauci et al. | |

FOREIGN PATENT DOCUMENTS

| | | | |
|---|---|---|---|
| EP | 2866163 A2 | | 4/2015 |
| EP | 2866163 B1 | | 9/2018 |
| JP | 2012138086 A | | 7/2012 |
| WO | WO-2015131038 A2 | | 12/2015 |
| WO | WO-2017066652 A1 | | 4/2017 |
| WO | WO-2018051186 A2 | | 4/2018 |
| WO | WO-2020018577 A1 | | 1/2020 |
| WO | WO-2020172471 A1 | | 8/2020 |
| WO | WO-2020206154 A1 | | 10/2020 |
| WO | WO-2022170236 A1 | | 8/2022 |

OTHER PUBLICATIONS

EP20783942.4 Extended Search Report dated Nov. 11, 2022.

PCT/US2020/026434 International Search Report with Written Opinion dated Jul. 21, 2020.

PCT/US2020/015595 International Search Report with Written Opinion dated Jun. 21, 2022.

PCT/US2024/051588 International Search Report and Written Opinion dated Dec. 17, 2024.

U.S. Appl. No. 17/492,058 Office Action dated Jan. 10, 2025.

U.S. Appl. No. 17/492,058 Office Action dated May 22, 2024.

U.S. Appl. No. 17/492,058 Office Action dated Nov. 1, 2023.

U.S. Appl. No. 17/492,058 Office Action dated Sep. 5, 2024.

U.S. Appl. No. 18/230,482 Office Action dated Jun. 4, 2025.

* cited by examiner

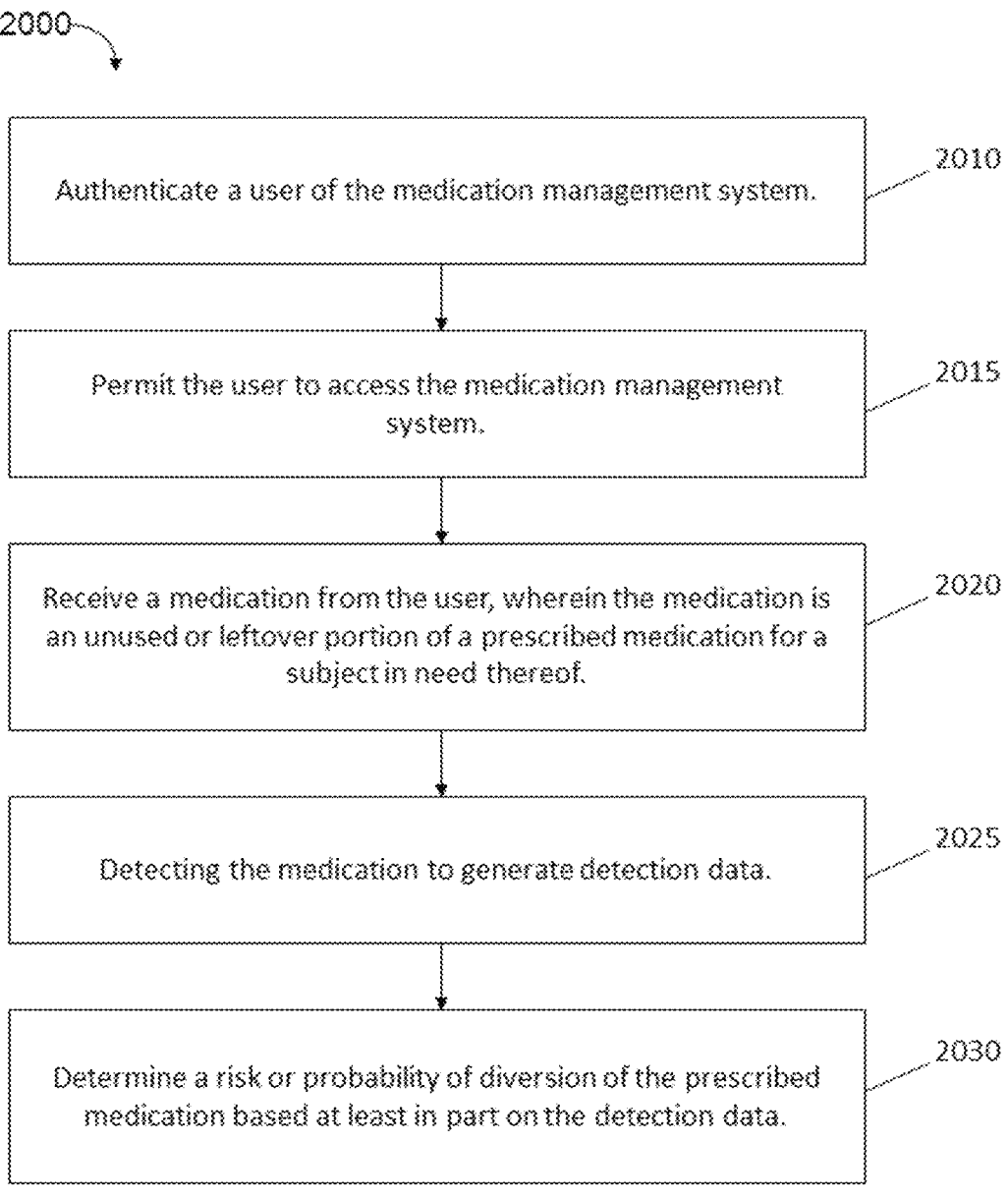

2000

Authenticate a user of the medication management system.                                    2010

Permit the user to access the medication management system.                                  2015

Receive a medication from the user, wherein the medication is an unused or leftover portion of a prescribed medication for a subject in need thereof.                                     2020

Detecting the medication to generate detection data.                                         2025

Determine a risk or probability of diversion of the prescribed medication based at least in part on the detection data.        2030

*FIG. 3C*

Medication
Management
System
1400
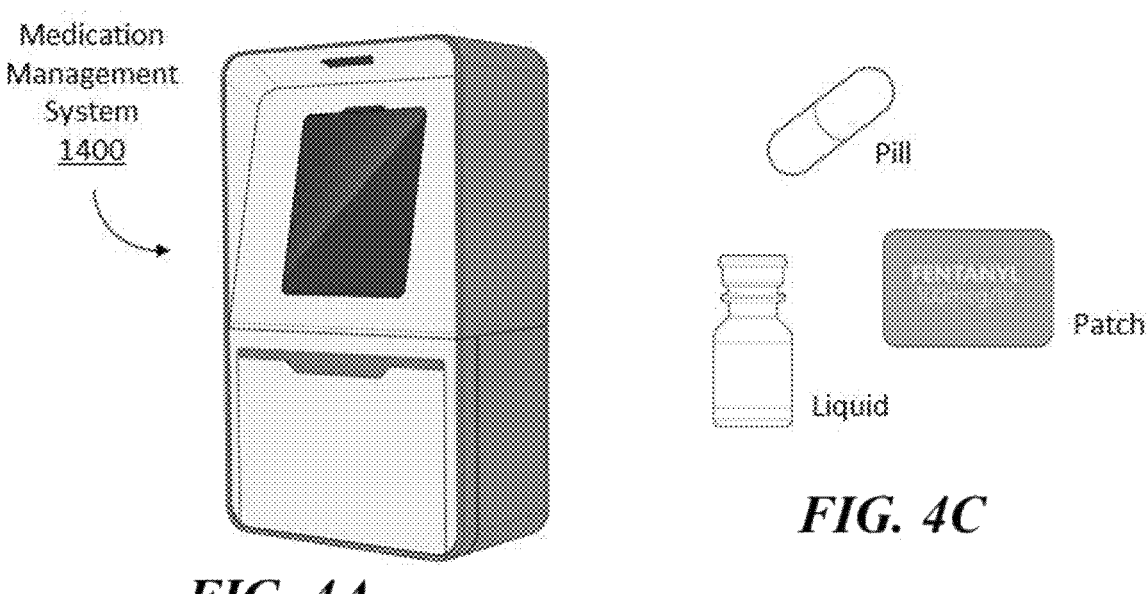
*FIG. 4A*
Pill
Liquid
Patch
*FIG. 4C*
Medication
Wasting Camera
1415
User
Identification Camera
1410
1400
User
1405
Display
1420
Pill Collector
1462
Patch Collector
1466
Work Station
Opening Direction
1430
Liquid
Collector
1464
Work Station
1440
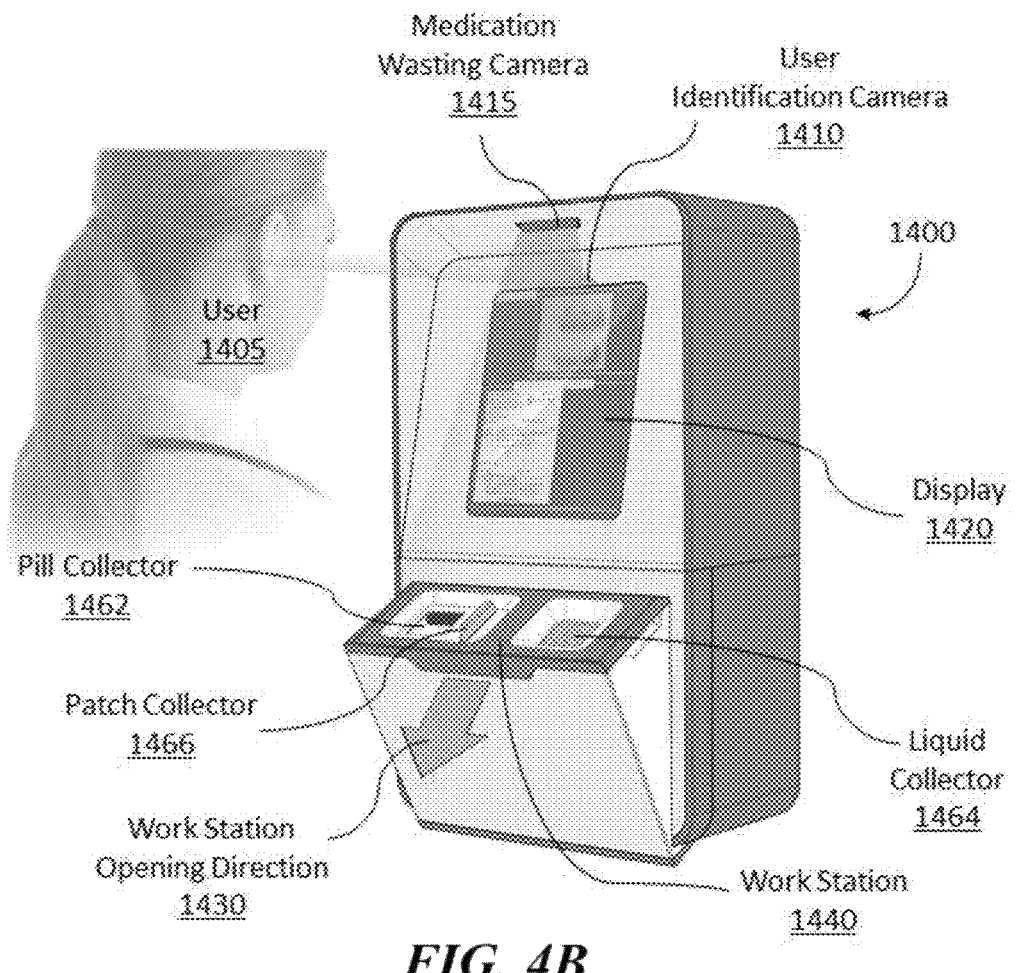
*FIG. 4B*

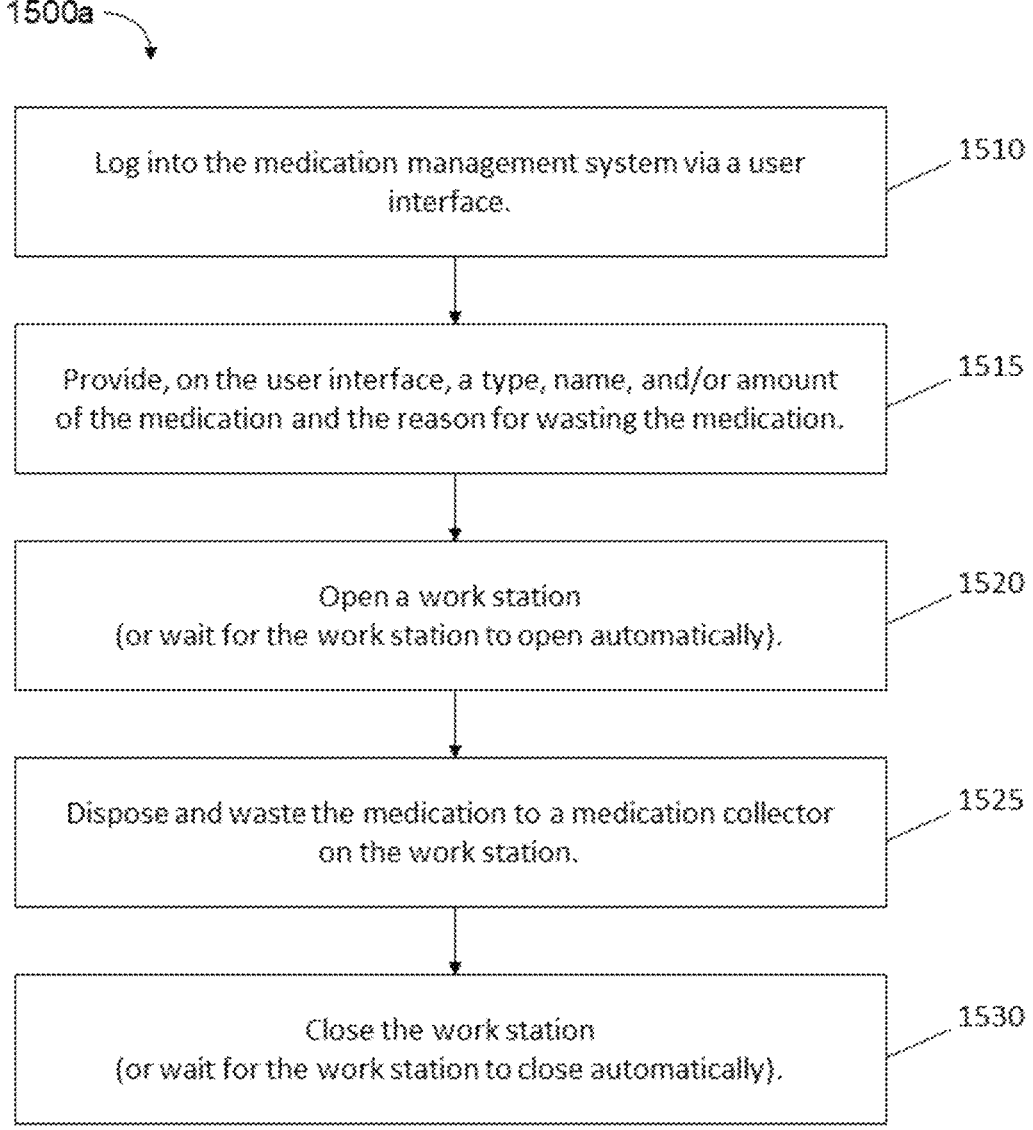

1500a

Log into the medication management system via a user interface. — 1510

Provide, on the user interface, a type, name, and/or amount of the medication and the reason for wasting the medication. — 1515

Open a work station (or wait for the work station to open automatically). — 1520

Dispose and waste the medication to a medication collector on the work station. — 1525

Close the work station (or wait for the work station to close automatically). — 1530

*FIG. 5A*

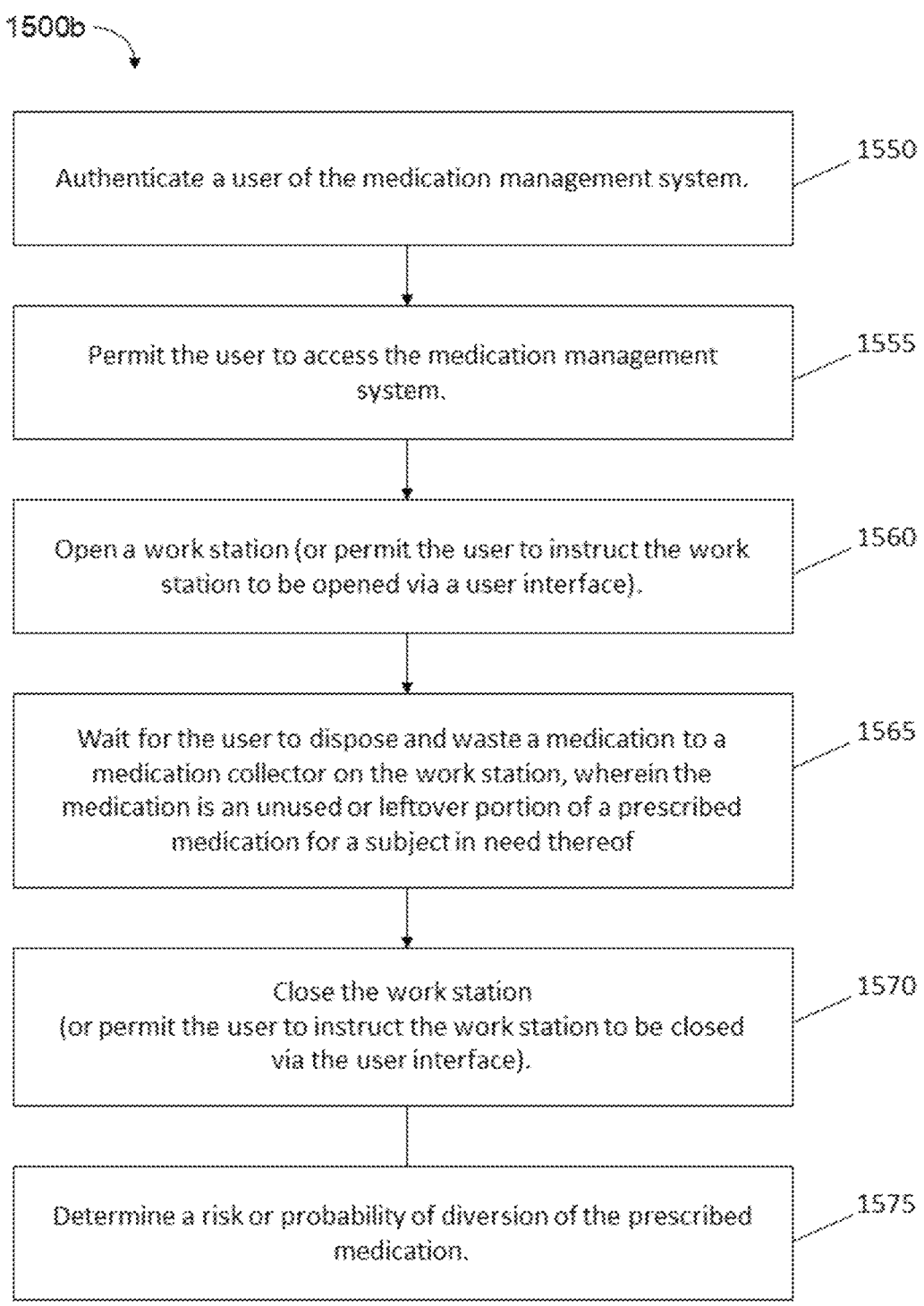

1500b

Authenticate a user of the medication management system. — 1550

Permit the user to access the medication management system. — 1555

Open a work station (or permit the user to instruct the work station to be opened via a user interface). — 1560

Wait for the user to dispose and waste a medication to a medication collector on the work station, wherein the medication is an unused or leftover portion of a prescribed medication for a subject in need thereof — 1565

Close the work station (or permit the user to instruct the work station to be closed via the user interface). — 1570

Determine a risk or probability of diversion of the prescribed medication. — 1575

*FIG. 5B*

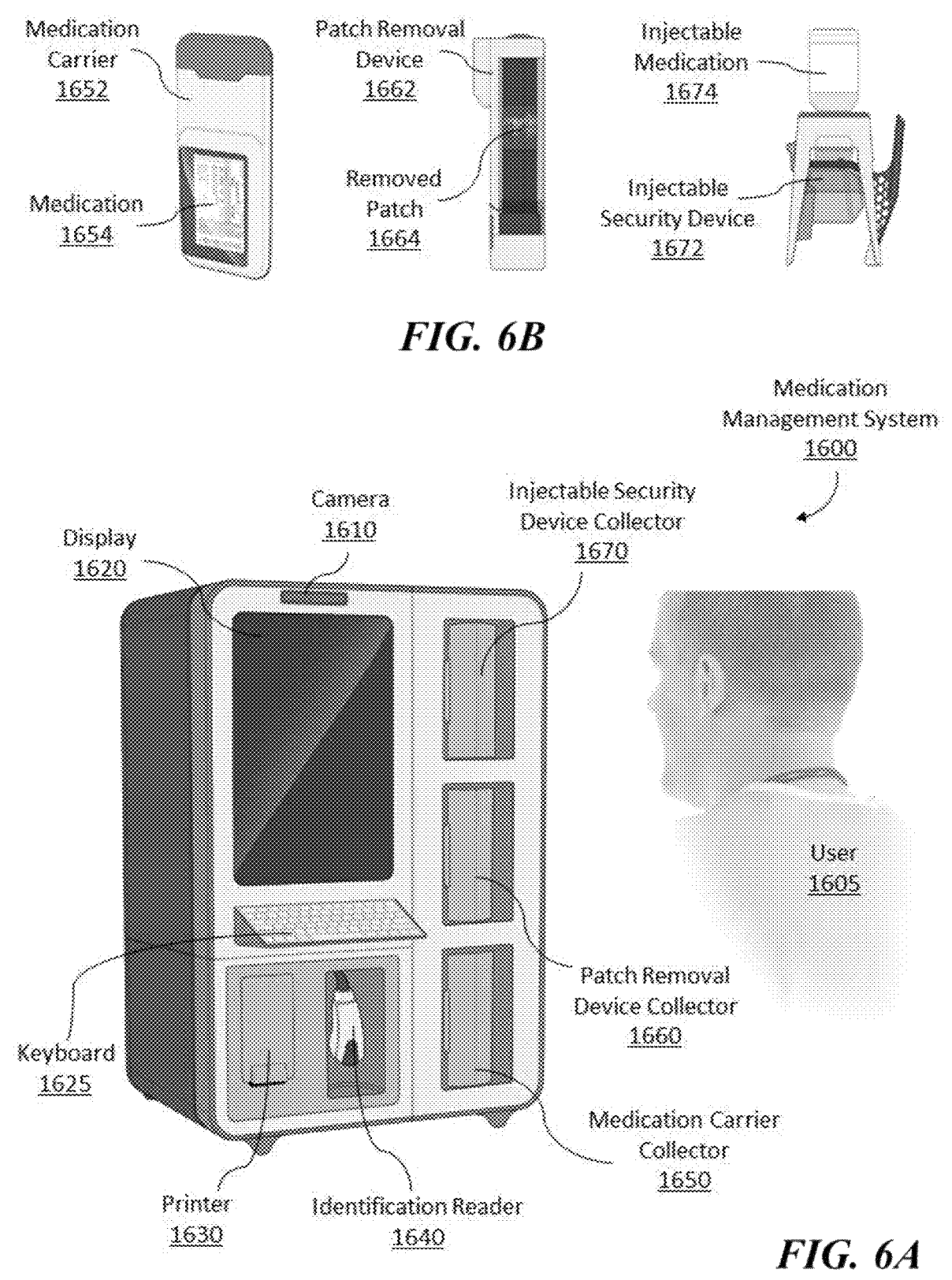

Medication Carrier 1652

Medication 1654

Patch Removal Device 1662

Removed Patch 1664

Injectable Medication 1674

Injectable Security Device 1672

FIG. 6B

Medication Management System 1600

Camera 1610

Injectable Security Device Collector 1670

Display 1620

User 1605

Keyboard 1625

Patch Removal Device Collector 1660

Printer 1630

Identification Reader 1640

Medication Carrier Collector 1650

FIG. 6A

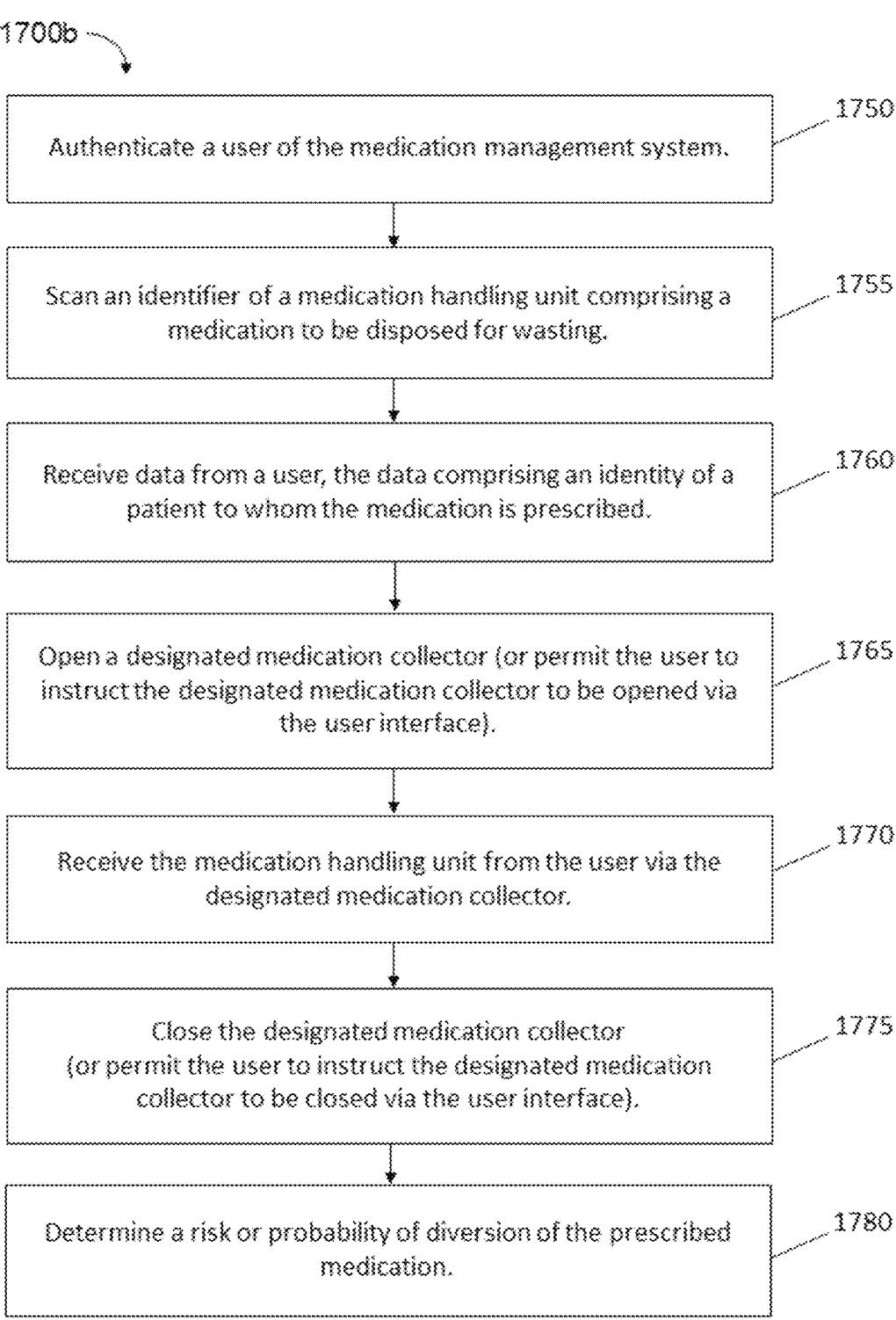

1700b

Authenticate a user of the medication management system.          1750

Scan an identifier of a medication handling unit comprising a medication to be disposed for wasting.          1755

Receive data from a user, the data comprising an identity of a patient to whom the medication is prescribed.          1760

Open a designated medication collector (or permit the user to instruct the designated medication collector to be opened via the user interface).          1765

Receive the medication handling unit from the user via the designated medication collector.          1770

Close the designated medication collector (or permit the user to instruct the designated medication collector to be closed via the user interface).          1775

Determine a risk or probability of diversion of the prescribed medication.          1780

Medication Management System 1900

Display 1920

Medication Wasting Camera 1915b

User Identification Camera 1910

Medication Wasting Camera 1915a

Patch Removal Device 1952

1900

Patch Removal Device Collector 1950

Pill Collector 1942

Patch Collector 1944

Liquid Collector 1946

Liquid vial 1962

Liquid vial Collector 1960

Work Station 1930

Display 1920

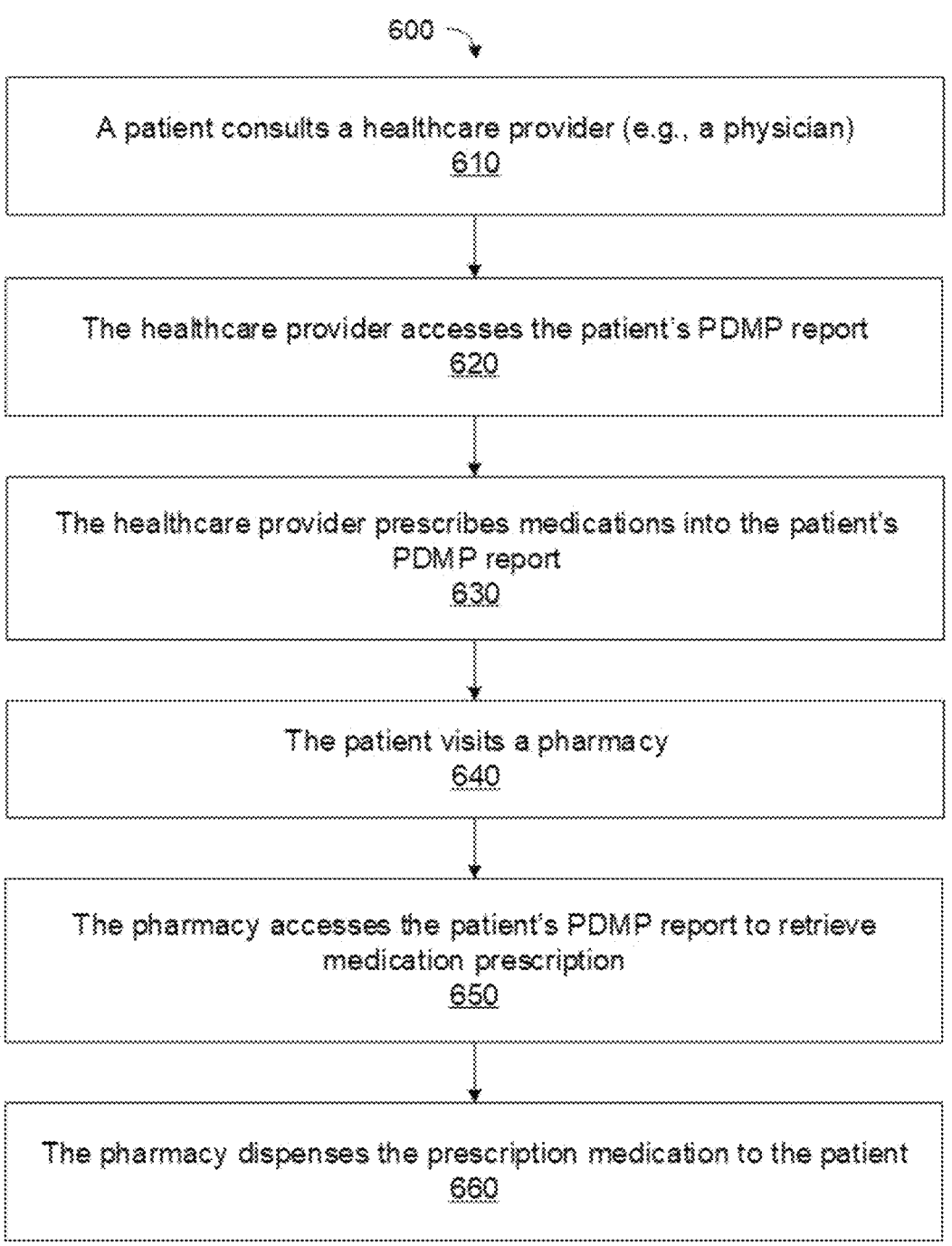

600

A patient consults a healthcare provider (e.g., a physician)
610

The healthcare provider accesses the patient's PDMP report
620

The healthcare provider prescribes medications into the patient's PDMP report
630

The patient visits a pharmacy
640

The pharmacy accesses the patient's PDMP report to retrieve medication prescription
650

The pharmacy dispenses the prescription medication to the patient
660

*FIG. 18*

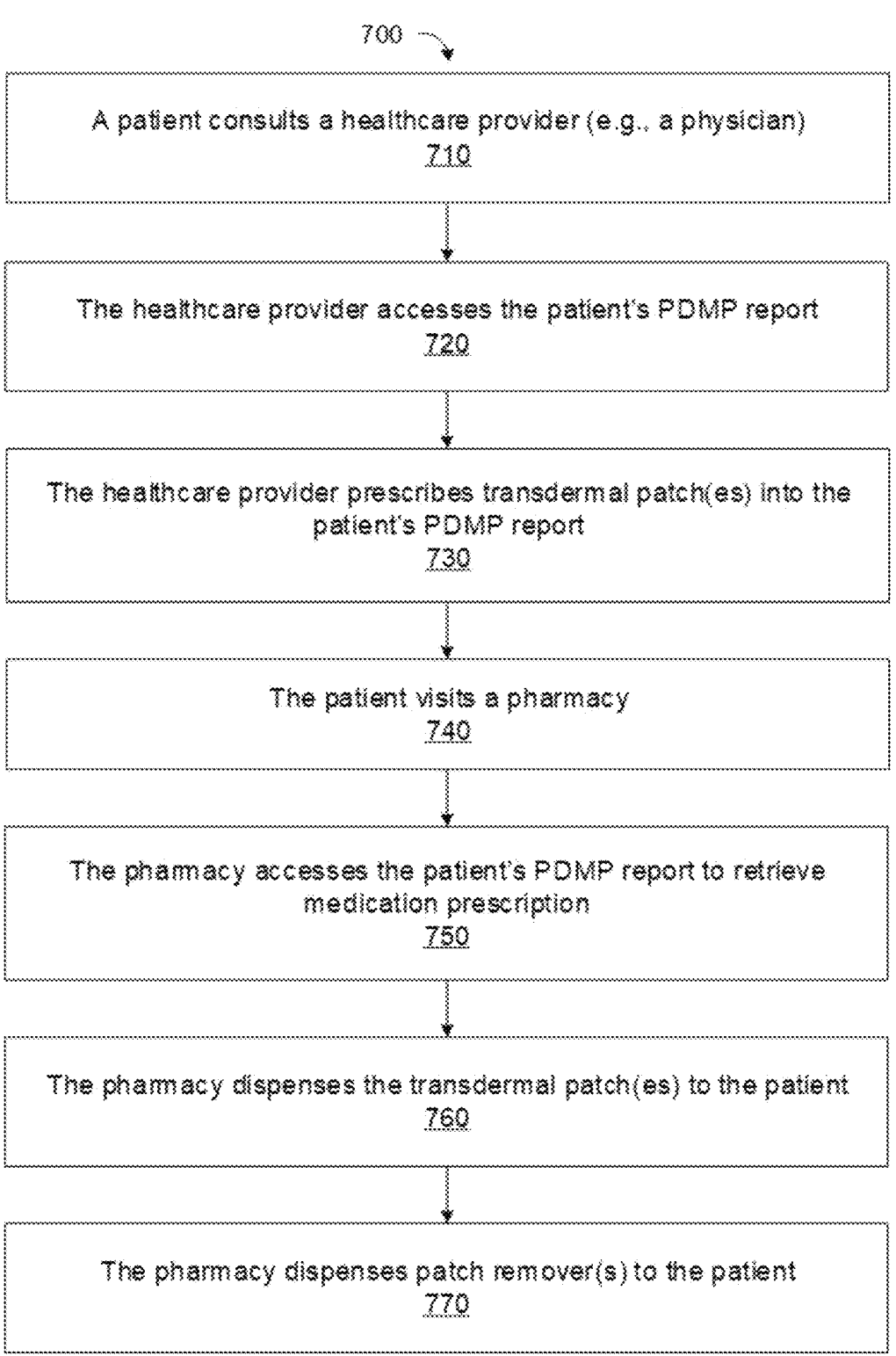

700 ⇀

A patient consults a healthcare provider (e.g., a physician)
710

The healthcare provider accesses the patient's PDMP report
720

The healthcare provider prescribes transdermal patch(es) into the patient's PDMP report
730

The patient visits a pharmacy
740

The pharmacy accesses the patient's PDMP report to retrieve medication prescription
750

The pharmacy dispenses the transdermal patch(es) to the patient
760

The pharmacy dispenses patch remover(s) to the patient
770

*FIG. 19*

Pill

Patch

General Medication(s)
2132

Patch Removal Device
2142

Removed Patch
2144

Pill Container
2152

Pills
2154

Smart Medication Collection System
2100

Camera
2110

Unused Modular Compartment
2160

Display
2120

Printer
2125

User
2105

Pill Container Collector
2150

Patch Removal Device Collector
2140

General Medication Collector
2130

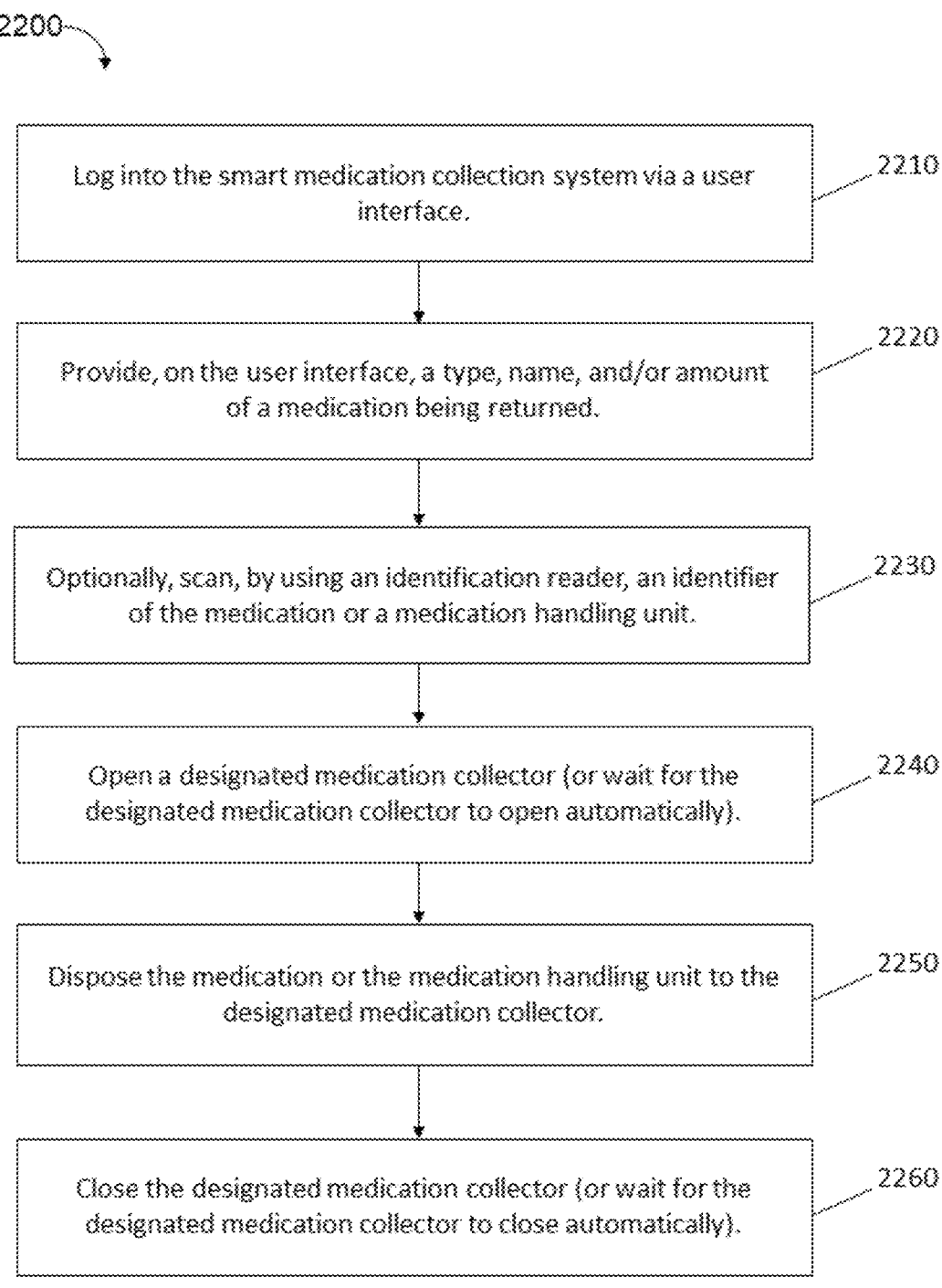

2200

Log into the smart medication collection system via a user interface.          2210

Provide, on the user interface, a type, name, and/or amount of a medication being returned.          2220

Optionally, scan, by using an identification reader, an identifier of the medication or a medication handling unit.          2230

Open a designated medication collector (or wait for the designated medication collector to open automatically).          2240

Dispose the medication or the medication handling unit to the designated medication collector.          2250

Close the designated medication collector (or wait for the designated medication collector to close automatically).          2260

*FIG. 22*

MEDICATION DISPOSAL SYSTEMS AND METHODS OF USE THEREOF

CROSS-REFERENCE TO RELATED APPLICATIONS

This application is a continuation of U.S. patent application Ser. No. 17/492,058, filed Oct. 1, 2021, which is a continuation of International Application No. PCT/US20/26434, filed Apr. 2, 2020, which claims the benefit of U.S. Provisional Application Nos. 62/873,610, filed Jul. 12, 2019, and 62/830,215 filed Apr. 5, 2019, each of which are incorporated herein by reference in their entireties in the present disclosure.

BACKGROUND

Prescription medications (e.g., controlled or non-controlled substances in the form of liquid, patches, pills, etc.) can be provided to a patient in a number of ways. For example, a healthcare provider (e.g., a nurse) can retrieve new medication orders from a system (e.g., electronic medication administration record (eMAR), by EPIC, Cerner, computerized provider order entry (CPOE), etc.). Following, the healthcare provider can obtain the medications from a pharmacy or a medication room located within a medical institution (e.g., a hospital), and deliver the medications to the patient. The patient can be in a patient room, emergency room, or a surgery room. Subsequently, any unused or leftover medications (e.g., due to overprescription or refusal by the patient) can be brought back to a collection site by the healthcare provider. The healthcare provider may be required to record (e.g., electronically or by paper) the type and/or amount of such medications being returned for waste. Optionally, a third-party witness (e.g., an employee at the collection site) can be required to witness the return/waste process. Alternatively, the healthcare provider may not and need not be required to return any unused or leftover medication to the collection site.

In some cases, inaccurate recording of the unused or leftover medications can occur due to mismanagement (e.g., human error). The inaccurate recording can make it difficult to identify and resolve such mismanagement. In some cases, inaccurate recording of the unused or leftover medications may be intentional by the healthcare provider to conceal any mishandling or misuse of the medications, e.g., medication diversion. Such misuse can occur (1) prior to administration of the medications to the patient and/or (2) subsequent to the administration and usage of the medications to the patient.

Prescription medications can also be provided directly to the patient. For example, the patient can receive the medications from healthcare providers (e.g., physicians) or at a pharmacy (e.g., in a hospital or a retail store). In some cases, the healthcare providers can prescribe a limited (e.g., 1, 2, 3, 4, or 5) or unlimited number of refills, thus allowing the patients to receive one or more refills of the medications at the same or a different pharmacy (e.g., when they run out of the first prescription, when they travel without their medications, etc.). Details of the medications prescribed (e.g., type, dosage, duration of the medications, etc.) can be based on a feedback from the patients or a general guideline (e.g., "one size fits all" recommendation from a universal or federally determined guideline, or a different standard of care), which may not evolve overtime per patient- or disease-basis.

After use, or lack thereof, the patients can have unused or leftover medications. The patients can be prescribed more than an adequate or clinically necessary amount of the medications (i.e., overprescription). Alternatively, the patients can be prescribed less than an adequate or clinically necessary amount of the medications (e.g., underprescription), whereby asking for a refill can lead to unused medications. Thus, the patients can be instructed to discard (e.g., flush in the toilet, discard as trash, etc.) any unused medications or return the unused medications to a drug take-back location (e.g., into a drug collection unit at a pharmacy). In some cases, the patients can return the unused medications on a Drug Enforcement Administration (DEA) Prescription Drug Take Back Day. However, improper discarding or return of the unused medications can expose the medications to third-party access (e.g., medication diversion), misuses and related outcomes (e.g., addictions), and/or accidental exposures (e.g., to children). In some cases, two major sources of misused prescription medications (e.g., pain relievers) can include (i) prescription from healthcare providers, and (ii) a friend or family member.

SUMMARY

Recognized herein is a need for systems and methods for systems and methods for management of medications (e.g., controlled or non-controlled) that encourages and promote healthcare providers (e.g., nurses, advance practice nurses, nurse anesthetists, physicians, physicians assistants, etc.) to manage medications properly during retrieval of the medications and/or return of any unused or leftover medications after use. In some cases, the returned unused/leftover medications can be ultimately collected for destruction. The systems and methods for medication management herein can, for example, prevent or reduce a chance of diversion of the medications at medical institutions, and/or ensure that the patients receive a correct medication at a correct dose and time. thereby to enhance patient safety. The systems and methods provided herein can provide a safe and secure environment for healthcare providers to prepare medications for patients and for the institutions to monitor their healthcare providers' behaviors. The systems and methods provided herein can (1) reduce medication costs for the patients and/or the institutions, (2) reduce chances of medication losses and/or any financial issue caused therefrom, and/or (3) promote or enhance patient safety.

The systems and methods for medical management herein can be implemented, for example, in medication rooms (i.e., med rooms), patient rooms, emergency rooms, and/or surgery rooms. Such systems and methods can improve medication handling, management, and/or security of the medications in various situations: (1) when the healthcare provider obtains or prepares the medications for the patient (e.g., retrieving a predetermined number of pills or coverings (e.g., patches), withdrawing a predetermined volume of a liquid drug, etc.); (2) between a time a healthcare provider obtains a patient's medication from a source of the medication (e.g., from a pharmacy or an automated dispensing cabinet (ADC)) and a time the healthcare provider delivers or administers the medication to the patient; and/or (3) when handling any unused or leftover medications to be returned and/or wasted.

An aspect of the present disclosure provides a system for medication disposal, comprising: a receiving unit configured to receive a medication from a user, wherein the medication is an unused or leftover portion of a prescribed medication for a subject in need thereof; one or more sensors operatively coupled to the receiving unit, wherein the one or more sensors are configured to detect the medication received by the receiving unit and generate sensor data; and an analysis engine operatively coupled to the one or more sensors, wherein the analysis engine is configured to determine a risk or probability of diversion of the prescribed medication based at least in part on (i) the sensor data.

In some embodiments, the risk or probability is quantified in a scoring system comprising: an alphabetical range, a numerical range, a color range, or symbols.

In some embodiments, the determining the score is based at least in part on (ii) one or more of the following: (1) a number of the prescribed medication, (2) a weight of the prescribed medication, (3) a volume of the prescribed medication, (4) a chemical content of the prescribed medication, (5) a date or time of retrieval of the prescribed medication from a source of the prescribed medication, or (6) a date or time of administration of at least a portion of the prescribed medication to the subject.

In some embodiments, the medication is provided in one or more members selected from the group consisting of: of tablets, capsules, pills, powders, granules, dragees, gels, slurries, ointments, solutions suppositories, solutions, inhalants, aerosols, transdermal patches, modifications thereof, or combinations thereof. In some embodiments, the medication is provided in one or more of the tablets, capsules, or pills. In some embodiments, the medication is provided in one or more of the solutions. In some embodiments, the medication is provided in one or more of the transdermal patches.

In some embodiments, the detecting the medication comprises measuring one or more members of the following: (1) a number of the medication, (2) a weight of the medication, (3) a volume of the medication, (4) an optical property of the medication, or (5) a chemical content of the medication.

In some embodiments, the one or more sensors or a different sensor is configured to scan a label on a surface of the medication to obtain an additional information about the medication. In some embodiments, the medication is contained in a medication handling unit when deposited to the receiving unit by the user. In some embodiments, the one or more sensors or a different sensor is configured to scan a label on a surface of the medication handling unit to obtain an additional information about the medication. In some embodiments of any subject system disclosed herein, the label comprises texts, symbols, numbers, and/or a machine readable code. In some embodiments of any subject system disclosed herein, the additional information comprises one or more members of the following: (1) a number of the prescribed medication, (2) a weight of the prescribed medication, (3) a volume of the prescribed medication, or (4) a chemical content of the prescribed medication.

In some embodiments, the analysis engine is configured to retrieve from a database: (1) a date or time of retrieval of the prescribed medication from a source of the prescribed medication or (2) a date or time of administration of at least a portion of the prescribed medication to the subject.

In some embodiments, the one or more sensors or a different sensor of the system is configured to determine or authenticate an identity of the user. In some embodiments, the determining or authenticating the identity is based on a biometric data selected from the group consisting of: fingerprint, palm print, hand geometry, finger vein pattern, palm vein pattern, facial pattern, iris pattern, retina pattern, heart rate, and voice.

In some embodiments, the one or more sensors or a different sensor of the system is configured to record an image or a video of the user while the user is disposing the medication to the receiving unit.

In some embodiments, the one or more sensors or a different sensor of the system is configured to detect a biometric data of the user, and wherein the analysis engine is configured to determine a health condition of the user.

In some embodiments, the system further comprises a storage unit configured to collect at least the medication from the receiving unit.

In some embodiments, the analysis engine is further configured to report the score to one or more of the following: (1) the user, (2) a supervisor of the user, or (3) an administrator of the system.

In some embodiments, the system is operatively coupled to an automated dispensing cabinet to store and dispense at least the prescribed medication.

In some embodiments, the system comprises an automated dispensing cabinet to store and dispense at least the prescribed medication.

In some embodiments, the system further comprises a housing that comprises at least the receiving unit and the one or more sensors.

Another aspect of the present disclosure provides a method for medication disposal, comprising: (a) providing a system for a user to dispose a medication, wherein the system comprises: a receiving unit configured to receive the medication from the user, wherein the medication is an unused or leftover portion of a prescribed medication for a subject in need thereof, one or more sensors operatively coupled to the receiving unit, wherein the one or more sensors are configured to detect the medication received by the receiving unit and generate sensor data; and an analysis engine operatively coupled to the one or more sensors, wherein the analysis engine is configured to determine a risk or probability of diversion of the prescribed medication based at least in part on (i) the sensor data; and (b) receiving, by the receiving unit, the medication; (c) detecting, by the one or more sensors, the medication; (d) generating, by the one or more sensors, the sensor data; and (e) determining, by the analysis engine, the risk or probability of diversion of the prescribed medication.

In some embodiments, the risk or probability is quantified in a scoring system comprising: an alphabetical range, a numerical range, a color range, or symbols.

In some embodiments, the determining the score is based at least in part on (ii) one or more of the following: (1) a number of the prescribed medication, (2) a weight of the prescribed medication, (3) a volume of the prescribed medication, (4) a chemical content of the prescribed medication, (5) a date or time of retrieval of the prescribed medication from a source of the prescribed medication, or (6) a date or time of administration of at least a portion of the prescribed medication to the subject.

In some embodiments, the medication is provided in one or more members selected from the group consisting of: of tablets, capsules, pills, powders, granules, dragees, gels, slurries, ointments, solutions suppositories, solutions, inhalants, aerosols, transdermal patches, modifications thereof, or combinations thereof. In some embodiments, the medication is provided in one or more of the tablets, capsules, or pills. In some embodiments, the medication is provided in one or more of the solutions. In some embodiments, the medication is provided in one or more of the transdermal patches.

In some embodiments, the detecting the medication comprises measuring one or more of the following: (1) a number of the medication, (2) a weight of the medication, (3) a volume of the medication, (4) an optical property of the medication, or (5) a chemical content of the medication.

In some embodiments, the method further comprises, by the one or more sensors or a different sensor of the system, scanning a label on a surface of the medication to obtain an additional information about the medication. In some embodiments, the medication is contained in a medication handling unit when deposited to the receiving unit by the user. In some embodiments, the method further comprises, by the one or more sensors or a different sensor of the system, scanning a label on a surface of the medication handling unit to obtain an additional information about the medication. In some embodiments of any subject method disclosed herein, the label comprises texts, symbols, numbers, and/or a machine readable code. In some embodiments of any subject method disclosed herein, the additional information comprises one or more of the following: (1) a number of the prescribed medication, (2) a weight of the prescribed medication, (3) a volume of the prescribed medication, or (4) a chemical content of the prescribed medication.

In some embodiments, the method further comprises retrieving from a database: (1) a date or time of retrieval of the prescribed medication from a source of the prescribed medication or (2) a date or time of administration of at least a portion of the prescribed medication to the subject.

In some embodiments, the method further comprises, by the one or more sensors or a different sensor of the system, determining or authenticating an identity of the user. In some embodiments, the determining or authenticating the identity is based on a biometric data selected from the group consisting of: fingerprint, palm print, hand geometry, finger vein pattern, palm vein pattern, facial pattern, iris pattern, retina pattern, heart rate, and voice.

In some embodiments, the method further comprises, by the one or more sensors or a different sensor of the system, recoding an image or a video of the user while the user is disposing the medication to the receiving unit.

In some embodiments, the method further comprises, (1) detecting, by the one or more sensors or a different sensor of the system, a biometric data of the user, and (2) determining, by the analysis engine, a health condition of the user.

In some embodiments, the method further comprises collecting at least the medication from the receiving unit to a storage unit of the system.

In some embodiments, the method further comprises, by the analysis engine, reporting the score to one or more of the following: (1) the user, (2) a supervisor of the user, or (3) an administrator of the system.

In some embodiments, the system is operatively coupled to an automated dispensing cabinet to store and dispense at least the prescribed medication.

In some embodiments, the system comprises an automated dispensing cabinet to store and dispense at least the prescribed medication.

In some embodiments, the system further comprises a housing that comprises at least the receiving unit and the one or more sensors.

Also recognized herein is a need for systems and methods for medication management (e.g., take-back or drug disposal) that encourages and promotes patients to return any unused prescribed medications. In some embodiments, the systems and methods for medication management provided herein can promote the patients to return any unused medications at a predetermined location (e.g., a pharmacy) in a timely manner (e.g., within a predetermined time window) to prevent or reduce a chance of third party access, misuse, and/or accidental exposures. In some embodiments, the systems and methods medication management provided herein can promote anyone to return any unused or leftover medications without any time constraint, e.g., any unused or leftover medications found in one's household. In an example, a user can utilize the medication management system disclosed herein to return medications that have been kept in his or her medication cabinet for a number of years.

In some cases, the systems and methods for drug take-back provided herein can track each patient's medication return and assess the returned medications (e.g., count a number of unused pills, validate the unused pills, etc.), to thereby (i) identify overprescription or underprescription of the medications, (ii) track each patient's medication utilization and/or compliance to the medication prescription, and/or (iii) provide a medication utilization history of the patient to the patient's physicians to help personalize any future medication prescription for the patient. In some cases, the systems and methods for drug take-back provided herein can provide incentives or rewards to the patient upon returning any unused medication and/or an empty container of the prescription medication, to thereby encourage adherence to the drug take-back.

Another aspect of the present disclosure provides a system for tracking use of one or more unused medications, comprising: a receiving unit configured to receive a container from a user, wherein the container is configured to contain at least the unused medication(s); one or more sensors operatively coupled to the unit, configured to detect a presence and an amount of the unused medication(s) from the container; and an analysis engine operatively coupled to the sensor(s), configured to determine a score indicative of a utilization of the unused medication(s) by the user, based at least in part on (i) the detection of the unused medication (s) received within the container.

In some embodiments, the receiving unit comprises a closed receiving unit. In some embodiments, the closed receiving unit is operatively coupled a cover (e.g., a door) configured to hide the receiving unit from use. In some embodiments, the cover is opened automatically or by the user to receive the container containing the at least unused medication(s).

In some embodiments, the receiving unit comprises an open receiving unit. In some embodiments, the open receiving unit is permanently open to receive the container containing the at least the unused medication(s). In some embodiments, the open receiving unit comprises at least one slot to receive the container. In some embodiments, the at least one slot is a predetermined slot for a specific type of container or medication. In some embodiments, the open receiving unit comprises a plurality of predetermined slots for a plurality of different types of containers or medications.

In some embodiments, a dimension of the opening of the receiving unit is no more than about 10 times greater than a dimension of a cross-sectional area of the container. In some embodiments, a dimension of the opening of the receiving unit is no more than about 5 times greater than a dimension of a cross-sectional area of the container. In some embodiments, a dimension of the opening of the receiving unit is no more than about 4 times greater than a dimension of a cross-sectional area of the container. In some embodiments, a dimension of the opening of the receiving unit is no more than about 2 times greater than a dimension of a cross-sectional area of the container. In some embodiments, the dimension of the opening of the receiving unit is sufficiently large to receive the container, and sufficiently small to prevent accidental or intentional discarding of non-medical products, such as trash. In some embodiments, the dimension comprises a length, a width, a height, a diagonal length or a radius, and/or a cross-sectional area.

In some embodiments, a shape of the opening of the receiving unit is approximately the same as an outer contour of the container to be returned to the system.

In some embodiments, the receiving unit comprises a receiving platform.

In some embodiments, the detecting of the unused medication(s) by the sensor(s) comprises measuring a number of the unused medication(s).

In some embodiments, the detecting of the unused medication(s) by the sensor(s) comprises measuring a weight of the unused medication(s).

In some embodiments, the system further comprises a storage unit configured to collect the container and/or the unused medication(s) from the receiving platform.

In some embodiments, the sensor(s) are further configured to scan a label on a surface of the container to obtain an original amount of medication(s) dispensed in the container. In some embodiments, the analysis engine is further configured to determine the score indicative of the utilization of the unused medication(s) by the user, based at least in part on (ii) the original amount of medication(s). In some embodiments, the label comprises texts, symbols, numbers, and/or a machine readable code.

In some embodiments, the sensor(s) are not part of the receiving platform.

In some embodiments, the sensor(s) are part of the receiving platform.

In some embodiments, the sensor(s) are configured to detect the unused medication(s) while the unused medication(s) are contained within the container.

In some embodiments, the sensor(s) are configured to detect the unused medication(s) after the unused medication(s) are removed from the container. In some embodiments, the system further comprises one or more actuators configured to open a cap of the container and remove the unused medication(s) from the container.

In some embodiments, the unused medication(s) are provided in one or more of tablets, capsules, pills, powders, granules, dragees, gels, slurries, ointments, solutions suppositories, injections, inhalants, aerosols, transdermal patches, modifications thereof, or combinations thereof. In some embodiments, the unused medication(s) are provided in one or more of the tablets, capsules, or pills. In some embodiments, the unused medication(s) are provided in one or more of the transdermal patches. In some embodiments, the container is further configured to contain one or more patch removers capable of selectively removing the transdermal patches from the user's skin.

Another aspect of the present disclosure provides a method for tracking use of one or more medications, comprising: (a) providing a system for tracking the use of the unused medication(s), wherein the system comprises: a receiving unit configured to receive a container from a user, wherein the container is configured to contain at least the unused medication(s); one or more sensors operatively coupled to the platform, configured to detect a presence and an amount of the unused medication(s) from the container; and an analysis engine operatively coupled to the sensor(s), configured to determine a score indicative of a utilization of the unused medication(s) by the user, based at least in part on (i) the detection of the unused medication(s) received within the container; (b) receiving, by the receiving unit, the container; (c) detecting, by the sensor(s), the presence and the amount of the unused medication(s) from the container;

and (d) determining, by the analysis engine, the score indicative of the utilization of the unused medication(s) by the user.

In some embodiments, the receiving unit comprises a closed receiving unit. In some embodiments, the closed receiving unit is operatively coupled a cover (e.g., a door) configured to hide the receiving unit from use. In some embodiments, the cover is opened automatically or by the user to receive the container containing the at least the unused medication(s).

In some embodiments, the receiving unit comprises an open receiving unit. In some embodiments, the open receiving unit is permanently open to receive the container containing the at least the unused medication(s). In some embodiments, the open receiving unit comprises at least one slot to receive the container. In some embodiments, the at least one slot is a predetermined slot for a specific type of container or medication. In some embodiments, the open receiving unit comprises a plurality of predetermined slots for a plurality of different types of containers or medications.

In some embodiments, a dimension of the opening of the receiving unit is no more than about 10 times greater than a dimension of a cross-sectional area of the container. In some embodiments, a dimension of the opening of the receiving unit is no more than about 5 times greater than a dimension of a cross-sectional area of the container. In some embodiments, a dimension of the opening of the receiving unit is no more than about 4 times greater than a dimension of a cross-sectional area of the container. In some embodiments, a dimension of the opening of the receiving unit is no more than about 2 times greater than a dimension of a cross-sectional area of the container. In some embodiments, the dimension of the opening of the receiving unit is sufficiently large to receive the container, and sufficiently small to prevent accidental or intentional discarding of non-medical products, such as trash. In some embodiments, the dimension comprises a length, a width, a height, a diagonal length or a radius, and/or a cross-sectional area.

In some embodiments, a shape of the opening of the receiving unit is approximately the same as an outer contour of the container to be returned to the system.

In some embodiments, the receiving unit comprises a receiving platform.

In some embodiments, the method further comprises, in (c), measuring a number of the unused medication(s).

In some embodiments, the method further comprises, in (c), measuring a weight of the unused medication(s).

In some embodiments, the system in (a) further comprises a storage unit configured to collect the container and/or the unused medication(s) from the receiving platform.

In some embodiments, the method further comprises, in (c), scanning a label on a surface of the container to obtain an original amount of medication(s) dispensed in the container. In some embodiments, the method further comprises, in (d), determining the score indicative of the utilization of the unused medication(s) by the user, based at least in part on (ii) the original amount of medication(s). In some embodiments, the label comprises texts, symbols, numbers, and/or a machine readable code.

In some embodiments, the sensor(s) are not part of the receiving platform.

In some embodiments, the sensor(s) are part of the receiving platform.

In some embodiments, the method further comprises, in (c), detecting the unused medication(s) while the unused medication(s) are contained within the container.

In some embodiments, the method further comprises, in (c), detecting the unused medication(s) received after the unused medication(s) are removed from the container. In some embodiments, the method further comprises, in (c), using one or more actuators to open a cap of the container and remove the unused medication(s) from the container.

In some embodiments, the unused medication(s) are provided in one or more of tablets, capsules, pills, powders, granules, dragees, gels, slurries, ointments, solutions suppositories, injections, inhalants, aerosols, transdermal patches, modifications thereof, or combinations thereof.

In some embodiments, the unused medication(s) are provided in one or more of the tablets, capsules, or pills. In some embodiments, the unused medication(s) are provided in one or more of the transdermal patches. In some embodiments, the container is further configured to contain one or more patch removers capable of selectively removing the transdermal patches from the user's skin.

Another aspect of the present disclosure provides a nontransitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 3C illustrates an example flowchart of a process of receiving a medication for medication wasting;

FIGS. 4A and 4B schematically illustrate an exemplary medication management system for inpatient medical institutions;

FIG. 4C schematically illustrates example types of medications that can be deposited to a medication management system for inpatient medical institutions;

FIG. 5A illustrates an example flowchart of a process of depositing a medication to a medication management system for inpatient medical institutions;

FIG. 5B illustrates an example flowchart of a process of receiving a medication for medication wasting;

FIG. 6A schematically illustrates another exemplary medication management system for inpatient medical institutions;

FIG. 6B schematically illustrates example types of medication handling units that can be deposited to a medication management system for inpatient medical institutions;

FIG. 7B illustrates an example flowchart of a process of receiving a medication handling unit for medication wasting;

FIG. 18 illustrates an exemplary flowchart of methods of prescribing one or more medications;

FIG. 19 illustrates an exemplary flowchart of methods of prescribing one or more transdermal patches;

FIG. 22 illustrates an exemplary flowchart of methods of returning one or more medications to a smart medication collection system.

DETAILED DESCRIPTION

Figure 1A:
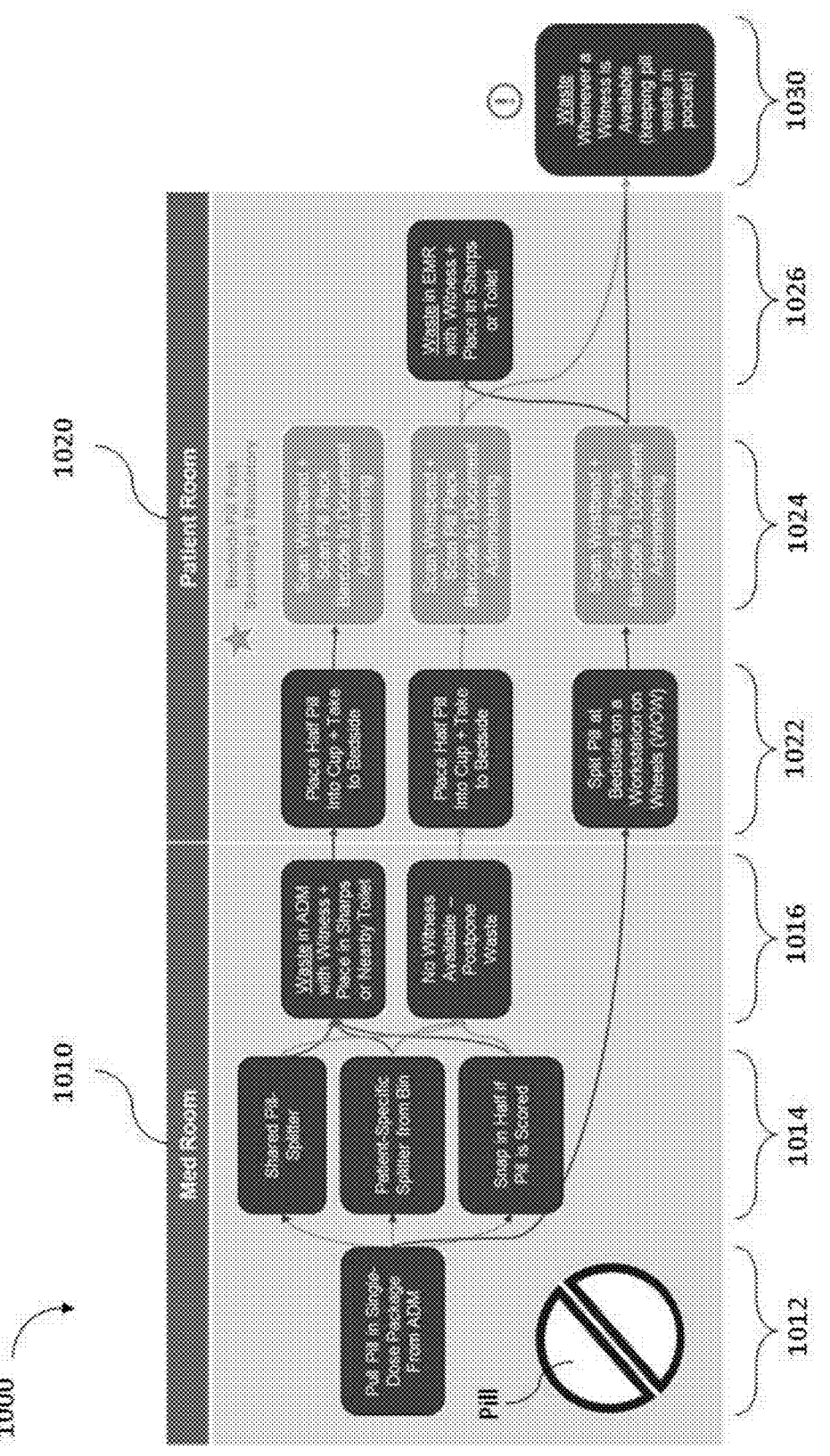
FIG. 1A illustrates an exemplary flowchart of conventional methods of wasting unused or leftover pills.

Reference will now be made in detail to some exemplary embodiments of the disclosure, examples of which are illustrated in the accompanying drawings. Wherever possible, the same reference numbers will be used throughout the drawings and disclosure to refer to the same or like parts.

I. Institutional Medication Management

A. Introduction

In medical institutions (e.g., hospitals), currently available systems and methods to (1) obtain and prepare medications (e.g., controlled or non-controlled medications) for a patient and/or (2) handle (e.g., return and/or waste) any unused or leftover medications can expose healthcare providers to opportunities for mismanaging some of the medications. For example, some of the medications prescribed to the patient can be diverted (e.g., intentionally for misuses by either the healthcare providers or a third party, or unintentionally lost or neglected to return/waste) for misuses, yet there is no effective oversight available for such mismanagement.

In some cases, the medication management systems and methods thereof, as provided herein, can achieve one or more of the following: (1) replacing the need for the self-reporting system by the healthcare provider and/or the witness, (2) reducing time wasted for the healthcare provider to look for or wait for a witness to waste unused/leftover medications, (3) prevent or reduce the chance of medication diversion by the healthcare provider and/or the witness, (4) prevent or reduce the chance of losing or reflecting to return unused/leftover medications, (5) prevent or reduce unnecessary and unproductive distractions for the healthcare provider and/or the witness, (6) providing automatic and continuous monitoring (or surveillance) of the behavior of the healthcare provider and/or the witness during medication retrieval and/or wasting, (7) reduce negative impact on the environment by preventing or reducing the placement of medications into plumbing (e.g., via the drains or toilets), (8) capturing and recording wasting of sharps or other tools that are used during medication preparation and can contain portions of prescribed medications, (9) capturing preparation of medications to ensure a correct medicant and/or a correct dosage is utilized, (10) identify and confirm the medications being returned, and/or (11) analyze an individual healthcare provider's behaviors to generate alerts for potential medication diversion. The medication management systems and methods herein can capture (e.g., in real-time and in the absence of any human witness) the fact of medication wasting by healthcare providers, and also capture (e.g., record by a camera) the act of medication wasting.

In some cases, healthcare providers are required to document the return/waste of any unused or leftover medications (e.g., to a designated collection site) in the presence of a witness, such as another employee of the medical institution. However, even in the presence of the witness, and the "honor" system by the healthcare provider and the witness can provide opportunities for mismanagement of the unused or leftover medications. In some cases, there may be a lack of available human witnesses, and the healthcare provider may be required to carry any unused or leftover medications in his or her pockets for a prolonged period of time, which may lead to undocumented drug wasting or accidental exposure to the medications by the healthcare provider.

FIG. 1A illustrates an exemplary flowchart 1000 of conventional processes to waste any unused or leftover pills. At a medication room (i.e., a med room) 1010, a nurse can obtain a prescription pill package in a desired dosage (e.g., a single dose) from an automated dispensing cabinet (ADC), such as an automated dispensing machine (ADM) (e.g., the medDispense® system, the Omnicell XT Automated Dispensing Cabinets, the McLaughlin dispensing system, the Baxter ATC-212 dispensing system, and the Pyxis MedStation) (process 1012). In an alternative, the nurse may not or need not obtain the prescription pill package from the ADC. For example, some medical facilities may not have ADCs (e.g., ADMs). In a different alternative, certain medication or medication packages may not fit within an ADC and thus may be stored elsewhere, e.g., in a shelf. Following, the nurse can place the retrieved pill in a shared pill-splitter, a patient specific pill splitter, or manually snap the pill in half if the pill is pre-scored (process 1014). The nurse can discard or waste any excess portion of the pill or the tools used for splitting to a collection site (e.g., back to a collection bin within the ADC) or a nearby toilet in the presence of a witness, or, alternatively, delay such discarding/wasting process in absence of an available witness (process 1016).

Referring to FIG. 1A, the nurse can transport the pill or a portion thereof from the med room 1010 to a patient room 1020. At the patient room 1020, the nurse (or a different nurse) can place the split portion of the pill into a cup and take the pill/cup to the bedside (process 1022). In some cases, the nurse can split a whole pill into portions at bedside on a workstation (e.g., a medical workstation on wheels (WOW)). Following, the nurse can scan (1) an identifier of the patient (e.g., on the patient's wristband) and (2) an identifier of the pill (e.g., provided on the prescription pill package) to confirm the prescription and document administration of the medication to the patient (process 1024). Afterwards, the nurse can discard or waste any excess portion of the pill (e.g., in the toilet) and record such wasting in a system (e.g., electronic medication administration record (eMAR), computerized provider order entry (CPOE), etc.) in the presence of a witness (process 1026). The witness can observe at least a portion of the pill before discarding the pill. At this process, if not regulated properly, the nurse and/or the witness can divert the unused or leftover pill, while recording otherwise in the eMAR. Alternatively, without any available witness, the nurse may need to wait until a witness is available to discard/waste the unused or leftover pill (e.g., until the end of the nurse's work shift), which could potentially lead to mismanagement of the pill (process 1030).

Figure 1B:
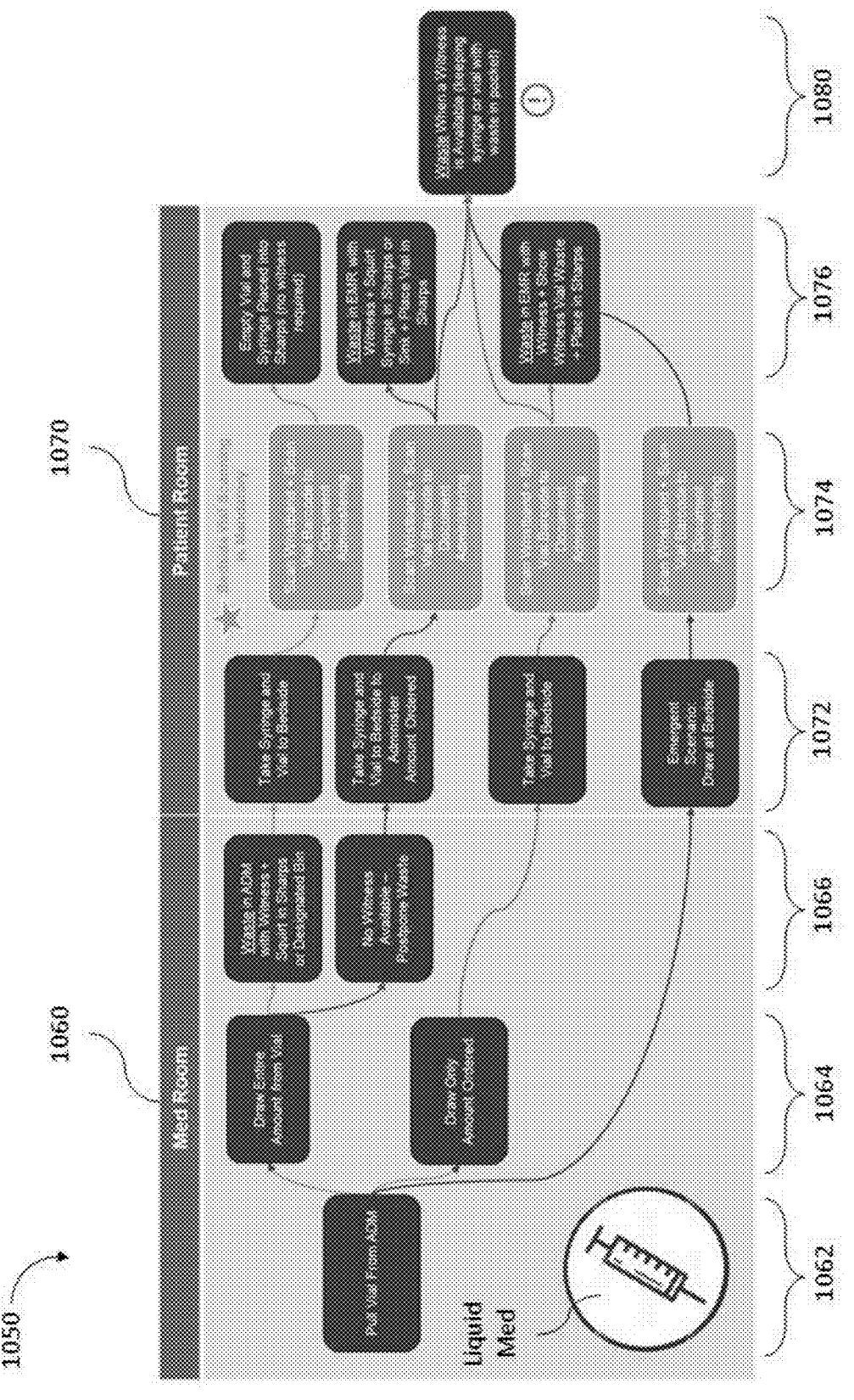
FIG. 1B illustrates an exemplary flowchart of conventional methods of wasting unused or leftover liquid medications.

FIG. 1B illustrates an exemplary flowchart 1050 of conventional processes to waste any unused or leftover liquid medication (e.g., injectable medication) or a vial containing the unused/leftover liquid medication. At a medication room (i.e., a med room) 1060, a nurse can obtain a vial containing the prescription liquid medication from an ADC, e.g., an ADM (process 1062). Following, the nurse can draw the entirety of the liquid medication into a syringe, or draw only about the amount of the liquid medication that is ordered or prescribed into the syringe (process 1064). The nurse can discard or waste the vial and/or squirt any excess liquid medication into a sharps container or a designated bin in the presence of a witness, or, alternatively, delay such discarding/wasting process in the absence of an available witness (process 1066).

Referring to FIG. 1B, the nurse can transport the pill or a portion thereof from the med room 1060 to a patient room 1070. At the patient room 1070, the nurse (or a different nurse) can take the syringe and the vial to bedside, or, alternatively, draw an appropriate amount of the liquid medication at bedside, e.g., at a workstation nearby (e.g., a medical WOW) (process 1072).

Following, the nurse can scan (1) an identifier of the patient (e.g., on the patient's wristband) and (2) an identifier of the pill (e.g., provided on the prescription pill package) to confirm the prescription and document administration of the medication to the patient (process 1074). Afterwards, the nurse can discard or waste the vial and/or the syringe comprising any excess liquid medication into a sharps container, either in the presence or absence of a witness (process 1076). In some cases, the nurses record such wasting in a system (e.g., eMAR) in the presence of the witness (process 1076). At this process, if not regulated properly, the nurse and/or the witness can divert the unused or leftover liquid medication, while recording otherwise in the eMAR. Alternatively, without any available witness, the nurse may need to wait until a witness is available to discard/waste the unused or leftover liquid medication (e.g., until the end of the nurse's work shift), which could potentially lead to mismanagement of the liquid medication (process 1080).

In some embodiments, an anesthesiologist can document use and wasting of medications (e.g., controlled or non-controlled substances) manually on a paper document in operating rooms, procedure rooms, interventional radiology rooms, or intensive care units (ICUs). The anesthesiologist or another healthcare provider can return the paper to a pharmacy located at an operation suite, surgery wing, or floor. On the paper document, the anesthesiologist can list how much (e.g., volume) of which drug (e.g., Propofol, Midazolam, Fentanyl, Morphine, Ketamine, Hydromorphone, Preservative-free (PF) Morphine, Sufentanil, etc.) was used and wasted for each patient, along with a signature (or initials) of the individual returning the paper document and another signature (or initials) of a witness. In some cases, the signature (or initials) of the witness can be provided in an absence of the witness, e.g., for intentional mismanagement of the medications. In other cases, the individual returning the paper document and the witness can corroborate to document an incorrect amount of the medications used for medication diversion. An authorized personnel (e.g., a supervisor) can be alerted in absence of the signature (or initials) of the witness, but no other systems and methods exist to identify or determine other means of medication mismanagement.

In view of the foregoing, there exists a considerable need for alternative systems and methods to encourage and promote healthcare providers (e.g., nurses, advance practice nurses, nurse anesthetists, physicians (e.g., anesthesiologists, surgeons, etc.), physicians assistants, etc.) to manage medications properly during retrieval of the medications and/or return of any unused or leftover medications after use (e.g., administration to the patients).

B. Medication Management Systems and Methods of Use

Medication management systems, as provided herein, can be capable of addressing the above shortcomings of conventional systems and practices for medication management in medical institutions, such as, for example, hospitals, medical offices (e.g., physician clinics, dental clinics, ambulatory surgery centers, same-day or other non-hospital surgery facilities, etc.), emergency response units (e.g., paramedic transportations, emergency medical service (EMS)

transportations, etc.) for transporting patients, veterinary hospitals, veterinary clinics, veterinary laboratories, medical research facilities, hospice, long-term acute care (LTAC) facility, nursing home, assisted living facility, pharmacy, in-pharmacy clinic, etc. In some cases, a medication management system can be a mobile device that can be movable between (or among) multiple locations, e.g., between a medication room (i.e., med room) and a patient room, or between a med room and a surgery room.

In alternative cases, the medication management device can be permanently disposed at a predetermined location during its use.

Medication management systems, as provided herein, can comprise or be configured to utilize any aspect of the smart medication systems and methods, as described elsewhere in the present disclosure (e.g., in Section II, Part B of the Specification). In some embodiments, the medication management systems can be referred to as Verified Institutional Environment for Wasting (VIEW).

Users of the medication management systems can include healthcare providers as provided herein, and employees of the medical institutions, pharmaceutical companies, or pharmaceutical distributors that are responsible for managing medication inventory. For examples, such employees may be responsible for re-stocking medications in one or more ADCs, collecting used sharps containers, collecting returned unused/leftover medications (e.g., emptying the collection bins for ultimate destruction of the medications), etc. In some examples, the users can comprise nurses or nurse practitioners. In some examples, the users can comprise personnel (e.g., employees and/or contractors) responsible for servicing the medication management systems (e.g., routine and/or emergency maintenance). Unused medications can be returned to the medication management systems for various reasons, e.g., overprescription, refused by the patients, or accidentally dropped by the patients or healthcare providers. In some embodiments, users of the medication management systems can include pharmaceutical manufacturers, providers of raw materials and/or ingredients of medications, and the medication management systems and methods can be utilized to monitor such users for proper handling and/or wasting of substances to eliminate diversion thereof.

The medication management systems can be positioned and used in one or more locations within a medical institution, such as, for example, medication rooms (i.e., med rooms), nursing stations, hospital ward hallways, patient rooms, and/or patient care centers (e.g., a surgery room, ambulatory surgical center (ASC), post anesthesia care unit (PACU) or recovery room, intensive care unit (ICU), intermediate ICU or step-down unit, interventional radiology suites, operating rooms, skilled nursing facilities, long term acute care facilities, etc.).

In some cases, the medication management systems provided herein can be positioned and used in ambulances, and/or paramedic areas (e.g., transportation vehicles). The ambulances/paramedic areas can routinely stock medications (e.g., controlled and/or non-controlled medications) to treat subjects being transported to a medical facility (e.g., transportation between two medical facilities, transportation to an emergency room, etc.). In some cases, stocking and use of the medications can be unsupervised (e.g., due to the urgent nature of the ambulance/paramedic areas), and thus there may be various opportunities by a personnel of the ambulance/paramedic areas to divert and unintentionally lose such medications.

In some cases, the medication management systems can be positioned in a retail pharmacy or a hospital pharmacy.

In an example, a medical institution can have a single medication management system. In another example, a medical institution can have a plurality of medication management systems (or devices) in different locations within the medical institution, and the plurality of medication management systems can be in digital communication with each other (e.g., via Bluetooth, NFC, WiFi, etc.). The plurality of medication management systems (or devices) can share one or more common databases to store and analyze information on usage of the plurality of medication management systems by the users.

In some cases, the medication management systems and methods disclosed herein can be utilized to monitor (e.g., survey, scrutinize, etc.) healthcare providers during medication wasting processes across multiple systems in one or more different/disparate areas (e.g., within the same facility or in a different remote facility). A plurality of the medication management systems can be monitored at once. The monitoring can be useful in capturing, detecting, and/or predicting medication diversion activities or other medication mismanagements by the healthcare providers.

The medication management systems can be configured to identify healthcare providers via their identifier (e.g., a key or an employment identification (ID) badge) and/or biometrics for identification and/or verification, tracking, confirmation, and/or supervision of medication management by the healthcare providers. For example, the medication management system can comprise one or more identification readers (e.g., scanner(s)) for user identification. The medication management systems can be utilized as a "virtual" witness to supplement and/or replace the need of a third-party witness during, for example, (i) dosing or portioning of prescribed medications, and/or (ii) wasting of any unused or leftover medications. For example, the medication management systems can comprise one or more identification devices (e.g., camera(s)) to capture photos or videos of the user and/or medications to be dispensed and/or returned. As such, a user (e.g., a nurse) may not have to wait or look for a witness (e.g., a designated witness) for wasting unused or leftover medications, thereby preventing or reducing, for example, the change of accidental exposure to the medications by the user while carrying the unused/leftover medications for an extended period of time. The one or more sensors can be configured to record voice and/or time stamp for additional security and verification purposes.

In some cases, a biometric (e.g., temperature, heart rate, etc.) of the user of the medication management systems (e.g., healthcare providers) can be detected by one or more sensors of the medication management systems to determine a health condition of the user. For example, determining the health condition can ensure that the user is not presenting a risk (e.g., a contagious or infectious risk) to patients and/or other staff of the same medical facility.

The medication management system, as provided herein, can comprise or be operatively coupled to a patient/medication tracking system, such as eMAR or CPOE, to retrieve and update patient data with respect to a patient's prescribed medications (e.g., types and doses of prescribed drugs). In some cases, the medication management system can allow the user to update information (e.g., amount of unused or leftover medications being returned) to the patient/medication tracking system. In some cases, the medication management system can require user to return unused/leftover medications (or empty medication containers or packages) within a predetermined time window (e.g., about 30 minutes to several hours) from the time the user retrieves the medications for patient administration. In an example, a failure by the user to accomplish certain tasks (e.g., returning the unused/leftover medications) within a predetermined time window can trigger generation of an indicator (e.g., a log, report, signal, flag, message, alert, etc.) to the user's supervisor, pharmacist, nurse manager, diversion control official, and/or other personnel of the medical facility. Alternatively, there may be no such predetermined time window (e.g., depending on the type of user or the type of medications), and the user may be allowed to document dosing and amount of unused/leftover medications at a convenient time (e.g., before the end of the shift).

In some cases, once the user retrieves medications from the medication management system, the user can be required to scan an identifier of the medication at bedside (e.g., via using one or more scanners in a patient room or surgery room that is communicatively coupled to eMAR or CPOE) prior to returning any unused/leftover medications or empty medication containers/packages. In doing so, changes of drug mismanagement (e.g., diversion or mistakes) may be reduced or avoided by the medication management system and methods disclosed herein.

The medication management system can be a device that is operatively coupled to one or more ADCs. In some cases, the medication management system can be a separate device from an ADC, disposed adjacent to the ADC (e.g., an ADM), or integrated (e.g., in hardware and/or software) in combination with the ADC (e.g., the subject medication management system may be part of the ADC, or the ADC may be part of the subject medication management system). In some cases, the medication management system and the ADC can be controlled by the same controller, and a user (e.g., a nurse) can gain access to both the medication management system and the ADC via a single user interface (e.g., a graphical user interface (GUI) on a single display).

The medication management system can be a single unit device. Alternatively, the medication management system can be a modular system comprising at least 2, 3, 4, 5, 6, 7, 8, 9, 10, or more modules (or subassemblies) that are operatively coupled to each other. The medication management system can be a modular system comprising at most 10, 9, 8, 7, 6, 5, 4, 3, or 2 modules that are operatively coupled to each other. In an example, the medication management system can be dual system comprising: a first device for dispensing of the medications (e.g., an ADM or a functional variant thereof) and a second device for returning of any unused or leftover medications. The plurality of modules can be fabricated as a single unit. Alternatively, the plurality of modules can be operatively or releasably assembled into a single medication management system. An individual module can be a replaceable unit. In an example, after one or more uses of a module, such module may be replaced with a new module, and the medication management system may be operable with little or no additional hardware or software updates. An individual module can be configured for a single use. Alternatively, an individual module can be reusable for at least 1, 2, 3, 4, 5, 6, 7, 8, 9, 10 or more uses. In some examples, an individual module of the medication management system can be configured for medication storage, medication dispensing, unused or leftover medication collection, sharps collection, trash collection, one or more displays for providing information or GUI to the user, etc.

The medication management system and methods provided herein can be implemented to manage various types of medication retrieval, dosing, return, and/or wasting. The term "medication(s)" or drug(s)" as used interchangeably herein can refer to any forms of medications, e.g., tablets, capsules, pills, powders, granules, dragees, gels, slurries, ointments, solutions suppositories, injections, inhalants, aerosols, coverings (e.g. transdermal delivery systems, such as transdermal patches), other forms of medications, modifications thereof, or combinations thereof. Medications can be controlled or non-controlled. The term "pill medication," as used herein, can generally refer to any form of oral medication. As such, the terms "pills," "powders," "granules," "dragees," "gels," etc. can be used interchangeably herein to refer to an oral medication. For example, the term "pill collectors" can generally refer to a collector for any form of oral medications.

Figure 2:
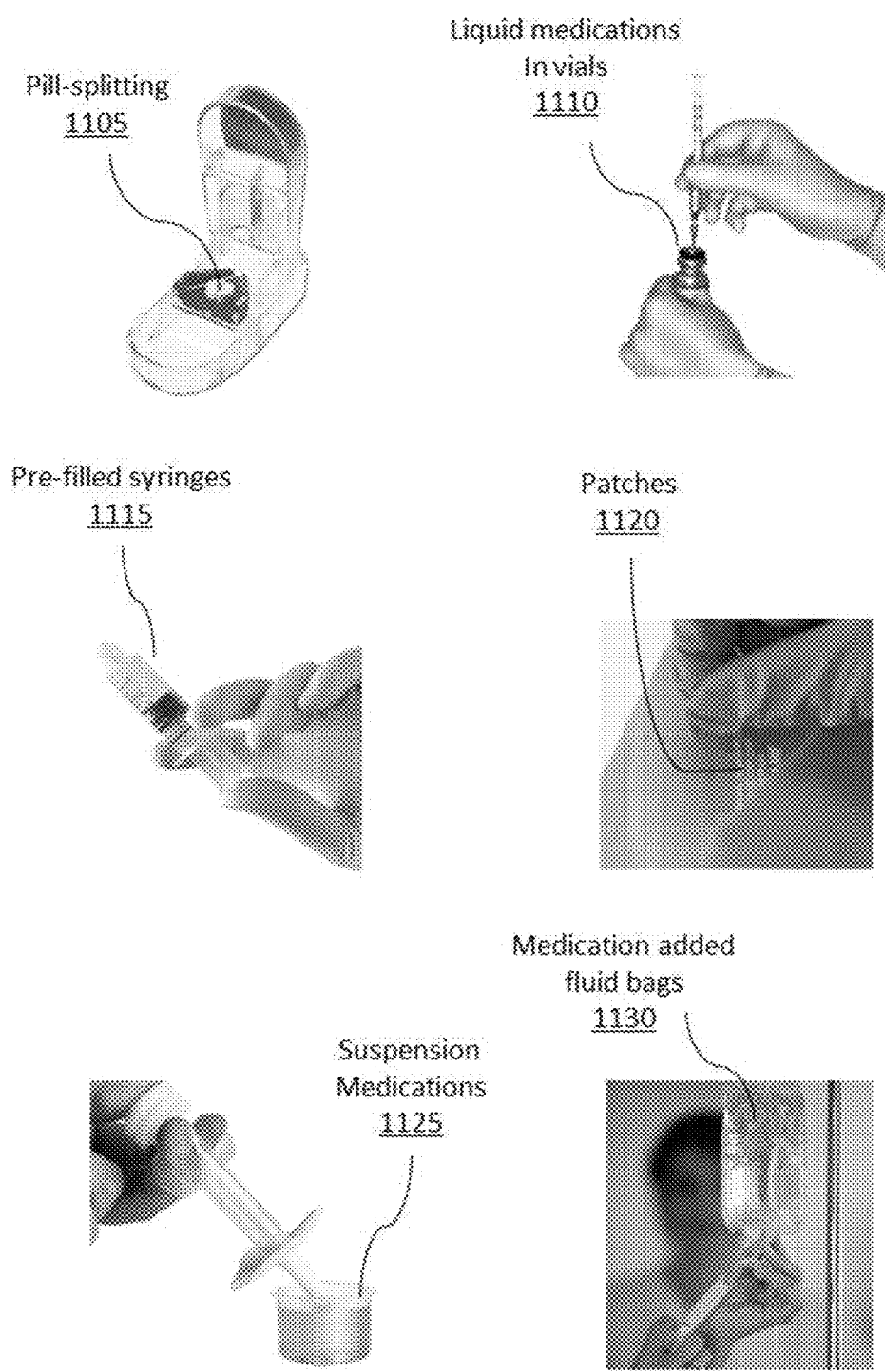
FIG. 2 illustrates examples of medications or medication devices that can be deposited to a medication management system.

As illustrated in FIG. 2, examples of medications or medication devices that can be returned by a user to the medication management system can include: pills, pill-cutter or splitter 1005, liquid medications, liquid medications in vials 1110 (or other form of containments, such as bottles), syringes that are pre-filled with liquid or semi-liquid medications 1115, patches 1120 (e.g., transdermal patches), gel medications, powder medications, suspension medications 1125 (e.g., for oral or nasal administrations), and/or medications added to fluid bags 1130 (e.g., intravenous (IV) bags dosed with drugs, such as fentanyl).

The medications, as provided herein, may or may not require prescription (e.g., by healthcare professionals, such as physicians). In some examples, prescriptions are not needed for over-the-counter medications, such as, for example, Robitussin, Tylenol, and Sudafed. The medications, as provided here, may or may not be controlled. Examples of non-controlled prescription substances include antibiotics, cholesterol medication, and Viagra.

Examples of controlled substances can comprise opiate and opioids, as well as central nervous system (CNS) depressants and stimulants. Examples of opioids can include morphine, codeine, thebaine, oripavine, morphine dipropionate, morphine dinicotinate, dihydrocodeine, buprenorphine, etorphine, hydrocodone, hydromorphone, oxycodone, oxymorphone, fentanyl, alpha-methylfentanyl, alfentanil, trefantinil, brifentanil, remifentanil, octfentanil, sufentanil, carfentanyl, meperidine, prodine, promedol, propoxyphene, dextropropoxyphene, methadone, diphenoxylate, dezocine, pentazocine, phenazocine, butorphanol, nalbuphine, levorphanol, levomethorphan, tramadol, tapentadol, anileridine, any functional variant thereof, or any functional combinations thereof. Examples of CNS depressants and stimulants can include methylphenobarbital, pentobarbital, diazepam, clonazepam, chlordiazepoxide, alprazolam, triazolam, estazolam, any functional variant thereof, or any functional combinations thereof.

Additional examples of the medications and the relevant therapeutic applications include scopolamine for motion sickness, nitroglycerin for angina, clonidine for hypertension, and estradiol for female hormone replacement therapy. Other examples of the drugs include, but are not limited to, methylphenidate, selegiline, rivastigmine, rotigotine, granisteron, buprenorphine, estradiol, fentanyl, nicotine, testosterone, propofol, etc.

The terms "medication bottle," "drug bottle," "medication container," "drug container," "medication package," and "drug package," as used interchangeable herein, generally refer to a package, bottle, or container that is sized and shaped to hold one or more medications (e.g., prescription medications), such as tablets, capsules, pills, powders, granules, dragees, gels, slurries, ointments, solutions suppositories, injections (e.g., liquids), inhalants, aerosols, coverings (e.g. transdermal delivery systems, such as transdermal patches), other forms of medications, modifications thereof, or combinations thereof.

The medication container/package can comprise a label to display information, such as, for example, drug name and/or dosage, drug warnings, expiration date, etc. The label can comprise an identifier (e.g., a machine readable code (MRC) or an identification device) (e.g., at least 1, 2, 3, 4, 5, or more identifiers; at most 5, 4, 3, 2, or 1 identifier(s)) to identify the medication container. In some cases, the identifier can be used for tracking of the medication container, user (e.g., healthcare providers) linking, institution tracking (e.g., hospital that is distributing the prescription medicine of interest), tracking a location of the medication management system, etc. In some cases, the identifier can be a unique patch identifier (UPI) that is specific to the medication container and/or the medication. The MRC may be a barcode (e.g., a linear barcode, a matrix barcode, etc.). The identification device may be a communications device, such as a radio frequency device (e.g., a radio-frequency identification (RFID) system, a near-field communication (NFC) system, improvements thereof, etc.) or other internal integrated circuits. The identification device may be an electronic chip. In some cases, the medication container may include the identifier, which can be scanned during (i) retrieval or dosing/preparation of the medication (e.g., the medication alone, in conjunction with another medication, in the medication container to a patient, etc.), and/or (ii) returning of any unused or leftover medication to the medication management system. In some examples, such identifier may be scanned, recorded, and tracked by patient/medication tracking system (e.g., eMAR or CPOE). In some cases, the identifier of the medication container may be disposed on a surface of the container. In some cases, the medication container may comprise a cap, and the identifier of the medication container may be disposed on a surface of the cap. In some cases, the label can comprise a reconstructable visual code (RVC). The RVC can be a dynamic visual code that is divided into a plurality of portions configured to be combined (e.g., upon activation) to form a functional visual code that is readable. The RVC can comprise a physical code (PHC) and/or an augmented reality code (ARC). Examples of the RVC and methods of use thereof are provided in, for example, International Patent Application No. PCT/US2020/019122, which is entirely incorporated herein by reference.

An identifier as disclosed herein (e.g., identifier of the healthcare providers, identifier of the patients, identifier of the medications or medication containers, etc.) can be scanned by an identifier reader, such as a scanner, a barcode reader, RFID reader, a NFC reader, etc. In some cases, the identifier reader can be a device in digital communication with a machine (e.g., a computer with a processor) configured to read and identify the identifier. In some cases, the identifier reader may be a user device (e.g., a smart phone with a camera) that is in digital communication (e.g., a wireless communication) with the machine. In some cases, the identifier reader may be adjacent to or part of (e.g., on the outside or inside) the smart medication collection system. In an example, the identifier reader can be a part of the medication management system. Alternatively or in addition to, the identifier reader can be operatively coupled to (e.g., communicatively coupled to) the medication management system. The identifier reader can be communicatively coupled to one or more databases, e.g., one or more databases of the medication management system or other databases, such as hospital employee database(s), eMAR or CPOE database(s), pharmacy database(s), etc. In some cases, the identifier can be a sound wave. The sound wave can be from a voice of the user (i.e., voice transmission). The sound wave can be from an identifier device of the user, medication, medication packaging, and/or a medication handling unit, as disclosed herein. For example, voiceprint identification can be used to match the user's voice to an existing voice profile in a database of the system as provided herein. The identifier can utilize one or more algorithms (e.g., machine learning algorithms) to learn the voice(s) of the user(s), for example, to ensure that only legitimate users are granted access to the system.

The terms "covering" and "layer," as used interchangeably herein, can refer to an article that is adhered on or adjacent to a bodily surface (e.g., skin) of the patients. The covering can comprise an adhesive material to connect (e.g., adhere, attach, bind) to the bodily surface of the patients. The covering may not be pre-medicated. The covering may be pre-mediated (e.g., a transdermal patch comprising a drug). The covering can comprise patches, pads, films, dressings, plasters, bandages, wrappers, strips, patches, gauzes, tapes, and the like that adheres to the bodily surface (e.g., healthy and/or wounded skin) of a subject. In some cases, the covering can be disposed over an additional covering that is adhered to the bodily surface (e.g., a pre-medicated patch) or an object (e.g., a needle assembly, such as an intravenous needle), thereby to protect the additional covering or the object (e.g., from damage, unintentional removal, etc.). The covering can be flexible and/or stretchable. The covering can be transparent, semi-transparent, opaque, or not transparent. A thickness of the covering can range between about 0.01 millimeters (mm) to 5 mm. The thickness of the covering may be at least about 0.01 mm, 0.02 mm, 0.03 mm, 0.04 mm, 0.05 mm, 0.05 mm, 0.07 mm, 0.08 mm, 0.09 mm, 0.1 mm, 0.2 mm, 0.3 mm, 0.4 mm, 0.5 mm, 0.6 mm, 0.7 mm, 0.8 mm, 0.9 mm, 1 mm, 2 mm, 3 mm, 4 mm, 5 mm, or more. The thickness of the covering may be at most about 5 mm, 4 mm, 3 mm, 2 mm, 1 mm, 0.9 mm, 0.8 mm, 0.7 mm, 0.6 mm, 0.5 mm, 0.4 mm, 0.3 mm, 0.2 mm, 0.1 mm, 0.09 mm, 0.08 mm, 0.07 mm, 0.06 mm, 0.05 mm, 0.04 mm, 0.03 mm, 0.02 mm, 0.01 mm, or less.

Examples of the covering can include BAND AID®, TEGADERM™ TRANSPARENT DRESSING, NEX-CARE™, ADVANCED CURAD™, AQUA-PROTECT™, and modifications thereof. In some embodiments, examples of the covering include transdermal patches, such as Duo-Film®, Durageisc®, Butrans®, Evra®, etc.

Examples of the coverings and one or more tools to remove such coverings are provided in, for example, International Patent Publication No. 2020/018577, which is entirely incorporated herein by reference.

The medication management system can be free standing, e.g., on a floor or on top of a table or counter. The medication management system can be wall-, floor-, or counter top-mounted. The wall-, floor-, or counter top-mounted medication management system can be operatively coupled to at least one joint mechanisms (e.g., a swivel) to permit the medication management system to move in at least one degree of freedom, thereby to provide access to different components of the medication management system to its users.

In some embodiments, the medication management system can be configured to receive a plurality of forms (e.g., pills, liquids, patches, etc.) of medications for wasting. In some embodiments, the medication management system can be configured to receive only a single form of medications for wasting. In some embodiments, the medication management system can be configured to receive only a single specific type of medication (e.g., only propofol emulsions, only fentanyl liquids, etc.) for wasting.

Figure 3A:
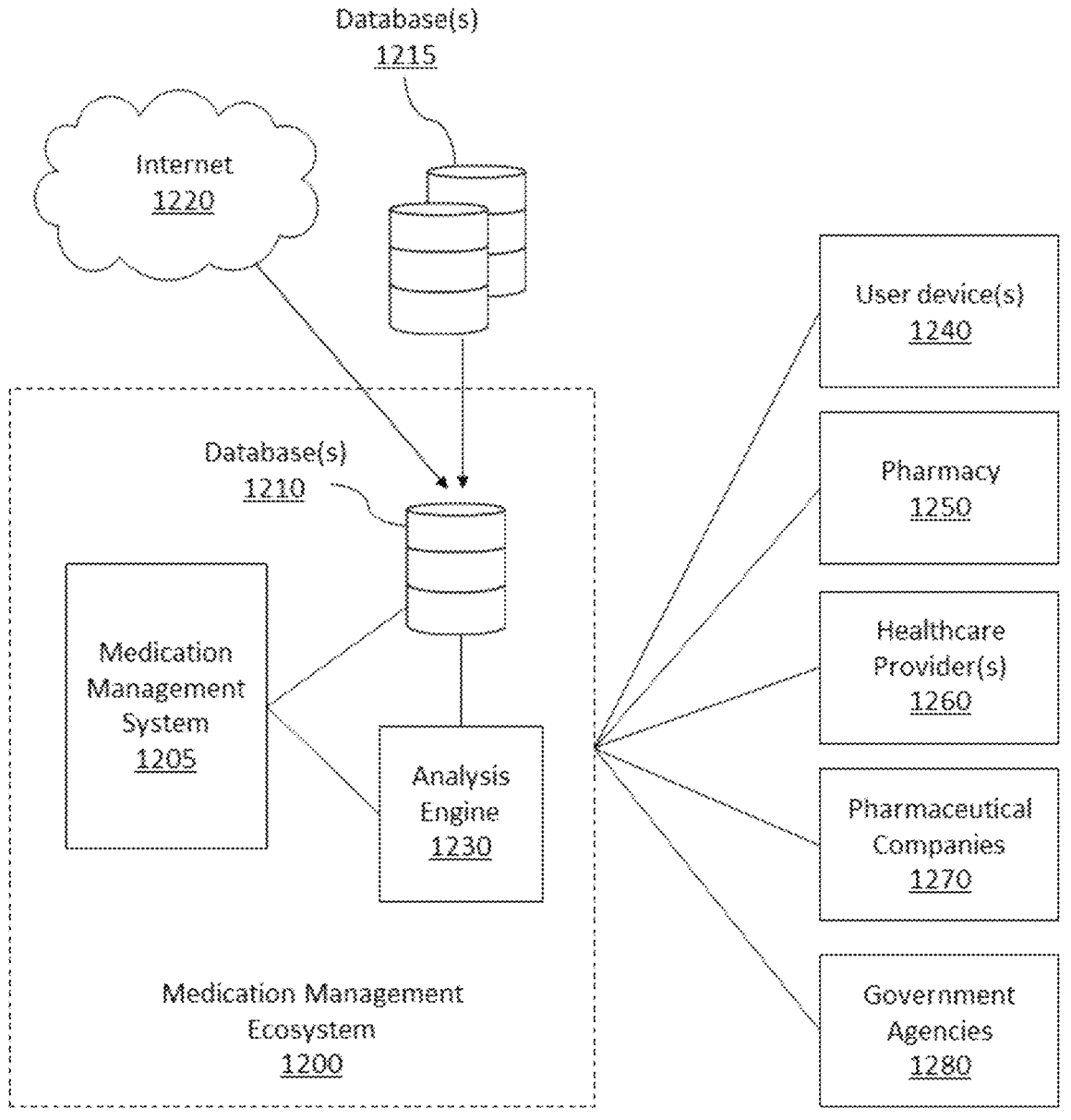
FIG. 3A schematically illustrates an exemplary ecosystem comprising a medication management system.

FIG. 3A schematically illustrates an exemplary medication management system 1205 and its ecosystem 1200. The ecosystem 1200 comprises the medication management system 1205, one or more databases 1210, and an analysis engine 1230. One or more components of the ecosystem 1200 can be in digital communication with one another. The medication management system 1205 can be in digital communication with the database(s) 1210. The medication management system 1205 can be in digital communication with the analysis engine 1230. The database(s) 1210 can be in digital communication with the analysis engine 1230. One or more components of the ecosystem 1200 can be part of a same unit or different units. In some examples, the database(s) 1210 and the analysis engine 1230 can be part of the medication management system 1205, or separate from the medication management system 1205.

The analysis engine 1230 can be operatively coupled to one or more sensors of the medication management system 1205, which sensor(s) can be configured to measure properties of wasted medications (e.g., brand color, size, shape, weight, density, and/or chemical content). Based on one or more measurements by the sensor(s), the analysis engine 1230 can determine a probability or likelihood that the medication wasted is what was reported by a user (e.g., a nurse) who wasted the medication. The analysis engine 1230 can determine that the probability that the medication wasted matches what is reported by the user is at least about 10%, 15%, 20%, 25%, 30%, 35%, 40%, 45%, 50%, 55%, 60%, 65%, 70%, 75%, 80%, 85%, 90%, 95%, 99%, or more. The analysis engine 1230 can determine that the probability that the medication wasted matches what is reported by the user is at most about 100%, 95%, 90%, 85%, 80%, 75%, 70%, 65%, 60%, 55%, 50%, 45%, 40%, 35%, 30%, 25%, 20%, 15%, 10%, or less.

Based on one or more measurements by the sensor(s), the analysis engine 1230 can determine a probability or likelihood that an amount (e.g., a number of pills, a number of patches, a volume of liquid medications, etc.) of the medication wasted matches what is reported by the user. The analysis engine 1230 can determine that the probability that the amount of the medication wasted matches what is reported by the user is at least about 10%, 15%, 20%, 25%, 30%, 35%, 40%, 45%, 50%, 55%, 60%, 65%, 70%, 75%, 80%, 85%, 90%, 95%, 99%, or more. The analysis engine 1230 can determine that the probability that the amount of the medication wasted matches what is reported by the user is at most about 100%, 95%, 90%, 85%, 80%, 75%, 70%, 65%, 60%, 55%, 50%, 45%, 40%, 35%, 30%, 25%, 20%, 15%, 10%, or less.

Based on one or more measurements by the sensor(s), the analysis engine 1230 can determine a probability or likelihood that an amount (e.g., a number of pills, a number of patches, a volume of liquid medications, etc.) of the medication wasted matches an amount that is supposed to be returned by the user. The analysis engine 1230 can determine that the probability that the amount of the medication wasted matches the amount that is supposed to be returned by the user is at least about 10%, 15%, 20%, 25%, 30%, 35%, 40%, 45%, 50%, 55%, 60%, 65%, 70%, 75%, 80%, 85%, 90%, 95%, 99%, or more. The analysis engine 1230 can determine that the probability that the amount of the medication wasted matches the amount that is supposed to be returned by the user is at most about 100%, 95%, 90%, 85%, 80%, 75%, 70%, 65%, 60%, 55%, 50%, 45%, 40%, 35%, 30%, 25%, 20%, 15%, 10%, or less.

Based on one or more measurements by the sensor(s), the analysis engine 1230 can determine a probability or likelihood that the user has mismanaged (e.g., lost or diverted) the medication. The analysis engine 1230 can determine that the probability that the user has mismanaged the medication is at least about 10%, 15%, 20%, 25%, 30%, 35%, 40%, 45%, 50%, 55%, 60%, 65%, 70%, 75%, 80%, 85%, 90%, 95%, 99%, or more. The analysis engine 1230 can determine that the probability that the user has mismanaged the medication is at most about 100%, 95%, 90%, 85%, 80%, 75%, 70%, 65%, 60%, 55%, 50%, 45%, 40%, 35%, 30%, 25%, 20%, 15%, 10%, or less.

For any probability or likelihood, as described herein, the analysis engine 1230 can be configured to alert one or more personnel when the determined probability/likelihood is above a predetermined threshold. Alternatively, the analysis engine 1230 can be configured to alert the one or more personnel when the user has previously been flagged for medication mismanagement for a predetermined number of previous incidences. Examples of the personnel can include the user, as supervisor of the user and/or the medication management system 1205, and/or an administrator of the medical facility. The predetermined threshold for the probability/likelihood can be at least about 50%, 55%, 60%, 65%, 70%, 75%, 80%, 85%, 90%, 95%, 99%, or more. The predetermined threshold for the probability/likelihood can be at most about 100%, 95%, 90%, 85%, 80%, 75%, 70%, 65%, 60%, 55%, 50%, or less. The predetermined number of previous incidences can be at least 1 time, 2 times, 3 times, 4 times, 5 times, 6 times, 7 times, 8 times, 9 times, 10 times, or more. The predetermined number of previous incidences can be at most 10 times, 9 times, 8 times, 7 times, 6 times, 5 times, 4 times, 3 times, 2 times, or 1 time.

The analysis engine 1230 can report any probability or likelihood, as described herein, as a score based on, for example, an alphabetical range (e.g., A through E), a numerical range (e.g., 1 through 10, 0% to 100%, etc.), a color range (e.g., green to red), symbols (e.g., thumbs up and thumbs down), etc.

In some cases, upon determining that the user has mismanaged medications, the medication management ecosystem 1200 can direct an ADC (e.g., ADM) to block the user's access to the ADC, thereby to prevent any further medication mismanagement by the user.

One or more components (e.g., the medication management system 1205, the database(s) 1210, and/or the analysis engine 1230) of the ecosystem 1200 can be in digital communication with (1) one or more user devices 1240 (e.g., a mobile device, smart watch, personal computer, etc.) of the healthcare provider, (2) one or more pharmacies 1250 or drug distributors as sources of the medications, (3) one or more healthcare providers (e.g., physicians, nurse practitioners, nurses, healthcare insurance providers, etc.) 1260 that recommend or prescribe the medications, (4) one or more pharmaceutical companies 1270, and/or (5) government agencies 1280 (e.g., Drug Enforcement Administration (DEA), National Library of Medicine (NLM), Food and Drug Administration (FDA), Centers for Disease Control and Prevention (CDC), etc.).

In some cases, the healthcare providers 1260 (e.g., nursing supervisors or administrators) can have access (e.g., remote access) to the medication management ecosystem 1200 via one or more user devices 1240 to access live, recorded, and/or archived images/videos of a user of the medication management system 1205. The nursing supervisors or administrators can also have direct access to the medication management system 1205 (e.g., on site) to access such images/videos. The analysis engine 1230 can be configured to extract selected images or selected fragments of the recorded videos to be reviewed by the nursing supervisors or administrators. The selection of the images or video fragments can be automated, e.g., by one or more machine learning algorithms of the analysis engine 1230 based on, e.g., history of the user of the medication management system 1205, date, types of medications, any institutional or government directives, age of the recorded pictures/videos, etc.

In some cases, the healthcare providers 1260 (e.g., nursing supervisors, diversion control officials, or administrators) can be alerted via the one or more user devices 1240 depending on the employment history of the user of the medication management system 1205. For example, the user may be a nurse that is (i) onboarding or a recent hire, (ii) on probation, and/or (iii) suspected of medication mismanagement (e.g., diversion activities), and upon logging into the medication management system 1205 by the nurse, the medication management system 1205 can trigger an advisory alert on the user devices 1240 of the nursing supervisors or administrators of the institution. As such, the nursing supervisors, diversion control officials, or administrators can be preemptively encouraged to review the medication wasting by the nurse, e.g., in real-time, near real-time, or at a later time point.

The term "real-time" or "real time," as used interchangeably herein, generally refers to an event (e.g., an operation, a process, a computation, a calculation, an analysis, a visualization, movement of a component of a system, etc.) that is performed using recently obtained (e.g., collected or received) data. In some cases, a real time event may be performed almost immediately or within a short enough time span, such as within at least 0.0001 millisecond (ms), 0.0005 ms, 0.001 ms, 0.005 ms, 0.01 ms, 0.05 ms, 0.1 ms, 0.5 ms, 1 ms, 5 ms, 0.01 seconds, 0.05 seconds, 0.1 seconds, 0.5 seconds, 1 second, or more. In some cases, a real time event may be performed almost immediately or within a short enough time span, such as within at most 1 second, 0.5 seconds, 0.1 seconds, 0.05 seconds, 0.01 seconds, 5 ms, 1 ms, 0.5 ms, 0.1 ms, 0.05 ms, 0.01 ms, 0.005 ms, 0.001 ms, 0.0005 ms, 0.0001 ms, or less.

The database(s) 1210 can be configured to store any data obtained by the medication management system 1205 or any data generated by the analysis engine 1230. For example, the analysis engine 1230 can determine an indication of medication mismanagement (e.g., unreported medication loss, diversion) of a healthcare provider (e.g., a nurse responsible for retrieval and/or return of the medications to the medication management system 1205). Such determined data can be stored in the database(s) 1210 and/or transmitted (e.g., in real-time) to the user device(s) 1240, healthcare provider(s) 1260, and/or government agencies 1280. Any analysis by the analysis engine 1230 can be performed in real-time (e.g., as the user is recording retrieval of medications and/or return of unused or leftover medications), near real-time, at predetermined time points, or periodically. Alternatively or in addition to, the database(s) 1210 can be in digital communication with one or more additional databases 215 (e.g., one or more patient/medication tracking system, such as eMAR and/or CPOE) to retrieve any information regarding patients (e.g., name, address, medical records) and/or medications (e.g., prescription history, prescription medication details, such as, for example, name, active/inactive ingredients, forms/types, color, shape, weight, prescription period, etc.).

The database(s) 1215 can comprise external database(s) from pharmacies, pharmaceutical companies, government agencies, hospitals, etc. The database(s) 1210 of the ecosystem 1200 can be in digital communication with the internet 1220, to obtain any additional data regarding a plurality of medications.

The analysis engine 1230 of the ecosystem 1200 can be communicatively coupled to the user devices(s) 1240, to, for example, determine or track location of the user (e.g., healthcare provider). In some cases, such location data can be used by the analysis engine 1230 in determining an indication of medication mismanagement by the user.

Alternatively or in addition to, the database(s) 1210 of the ecosystem 1200 can comprise or utilize a block chain (or "blockchain") database. The term "blockchain," as used herein, can refer to a suite of distributed ledger technologies that can be programmed to record and track anything of value (e.g., financial transactions, land titles, medical records, etc.). The blockchain can be a peer-to-peer (P2P) decentralized open ledger (or computer architecture thereof) that relies on a distributed network shared among its users. Each of the users can hold a public ledger of every transaction carried out using the architecture, and each public ledger can be checked against one another to ensure accuracy and accountability. Thus, a blockchain-based database (or blockchain database) can be used in place of a physical, centralized database, to record and handle one or more transactions of digital objects (e.g., data). Maintenance of the blockchain can be performed by a P2P network of communicating nodes (or computer systems) that are running a software. The software can be programmed with a specific application (e.g., cryptocurrency software, financial services software, supply chain software, smart contracts software, etc.). Transactions such as "party X transfers an object (e.g., a digital object, such as, for example, cryptocurrency, prescriptions, etc.) Y to party Z" can be broadcasted to the P2P network (e.g., by using one or more software applications). The network nodes can validate the transactions, add them to their copy of the ledger, and then broadcast these ledger additions to other nodes. Thus, the blockchain can be a distributed database, wherein, in order to independently verify the chain of ownership or validity of any and every transferred object, each network node stores its own copy of the blockchain. In some cases, a new group of transactions (i.e., a block) is created (e.g., at a predetermined frequency, such as, for example, 6 times per hour), added to the blockchain, and quickly published to all nodes in the P2P network. Thus, each block can contain a cryptographic hash of the previous block to keep the previous block "accountable."

Tampering with transactions on the blockchain can become exponentially harder as time progresses, and can require extreme quantities of computing power to attempt, let alone succeed. In some cases, data stored in the blockchain can be included in integrity checks, in which transactions are assembled into a transaction merkle tree and hashed to produce a block header. Any alterations to transactions in a blockchain database can become apparent as the block would be invalid when indexed. As such, the blockchain's consensus mechanism can allow a data's hash to be published to the blockchain as irrefutable proof that the data existed at a given time in the past. Both the timestamp and the hash may be unalterable.

The blockchain database that is operatively coupled to the medication management system 1205 can store data (e.g., scanned identification of the healthcare providers, patients, dispensed medications, returned medications, etc.) collected by the medication management system 1205 and/or analysis data generated by the analysis engine 1230 (e.g., indication or chance of medication mismanagement by an individual user or institution). The blockchain database, as provided herein, can be an alterable and secured P2P network among patients, prescribers, pharmacy, government agencies (e.g., FDA, DEA, etc.) to record and transfer data (e.g., medical history, prescription history, medication utilization and/or compliance analysis of a patient, date of prescription, date or return of unused medications, etc.). In comparison to a conventional, centralized database, the blockchain database can provide one or more advantages including, for example, transparency, safety, auditability, resistant to tampering, and accountability for (1) users of the medication management system 1205, (2) physicians, (3) pharmacies, (4) government agencies, (5) registered reverse distributors for destruction of unused medications, (6) and/or pharmaceutical companies that provide the medications to the market.

The analysis engine 1230 can obtain (directly or indirectly) data comprising information about (1) the user (e.g., the nurse), (2) the medication being dispensed from the medication management system 1205, (3) any unused or leftover medication returned to the medication management system 1205. Examples of such data can include images/ videos of the user during the dispensing of the medications and/or the returning of the unused/leftover medications. Additionally, an exemplary data can include the time it takes the nurse to retrieve the medications and return the unused/ leftover medications or medication packages. Yet different examples of such data can include one or more electromagnetic spectroscopies (e.g., absorbance and/or reflectance of light), images, videos, and/or weight of any returned unused/ leftover medications or medication packages. The analysis engine 1230 can be configured to use one or more algorithms to analyze the data to (i) track the user's (e.g., each nurse's) management of the medications, and/or (ii) provide a medication management history of the user to the user's supervisor or a central. The analysis engine 1230 can be configured to provide progress or results of the analysis to a central database of the institution or the patient/medication tracking system(s) (e.g., eMAR or CPOE).

The one or more algorithms utilized by the analysis engine 1230 can include a natural language processing (NLP), a computer vision system, or a statistical model. The computer vision system can include artificial intelligence (AI), deep learning, or optical character recognition (OCR) capabilities.

Figure 3B:
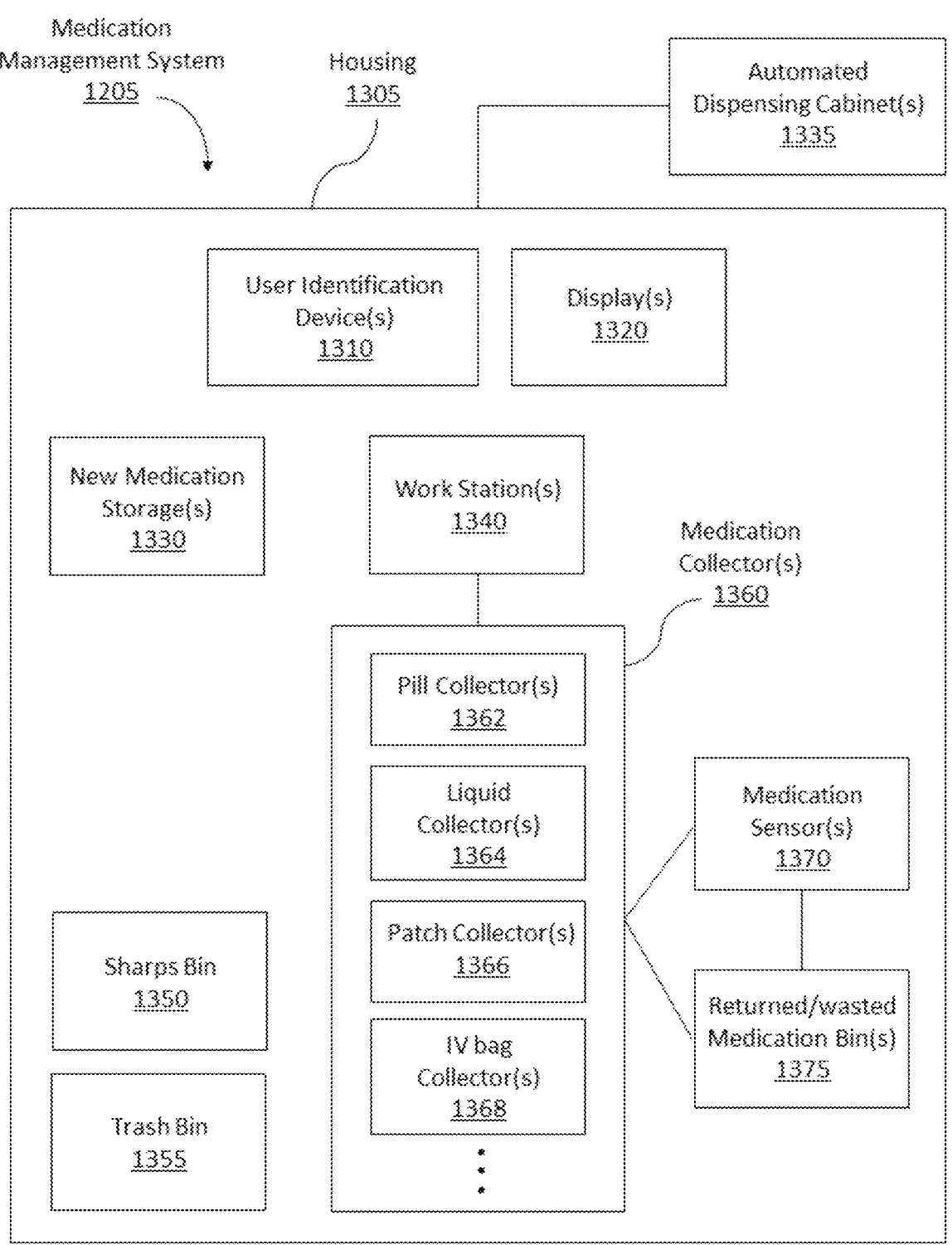
FIG. 3B schematically illustrates an exemplary medication management system.

FIG. 3B schematically illustrates an example of the medication management system 1205. The medication management system 1205 can comprise a housing 1305. The housing 1305 can house one or more components of the medication management system 1205 as described herein. Examples of such component(s) can include user identification device(s) 1310, display(s) 1320, medication storage(s) 1330, work station(s) 1340, sharps bin(s) 1350, trash bin(s) 1355, medication collector(s) 1360, medication sensor(s) 1370, and/or returned/wasted medication bin(s) 1375, as further described herein.

The medication management system 1205 can comprise at least 1, 2, 3, 4, 5, 6, 7, 8, 9, 10, 11, 12, 13, 14, 15, 16, 17, 18, 19, 20, or more components. The medication management system 1205 can comprise at most 20, 19, 18, 17, 16, 15, 14, 13, 12, 11, 10, 9, 8, 7, 6, 5, 4, 3, 2, or 1 component.

The medication management system 1205 can comprise a user identification device 1310 (e.g., a camera, a scanner, a sensor, a magnetic stripe reader, etc.). The user identification device 1310 can be configured to identify the user (e.g., healthcare provider, such as a nurse) who is retrieving the medications and/or returning the unused/leftover medications (or used medication containers). The user identification device 1310 can be configured to scan an identifier (e.g., a key, an employment ID badge, and/or biometric data) of the user of the medication management system 1205. Examples of the biometric data can include fingerprint, palm print, hand geometry, finger and/or palm vein pattern, facial pattern, iris, retina, heart rate, and/or pattern of behavior of the user (e.g., typing rhythm, voice, etc.). In some cases, the user identification device 1310 can comprise a physical user interface (PUI), such as a keyboard and/or a mouse, to type in a password or a pin number to gain access to the medication management system 1205 for use. Alternatively, the user identification device 1310 may not and need not comprise any PUI, and only rely on display(s) and the GUI for interacting with the users.

The user identification device 1310 can be in operative and digital communication with the housing 1305. Alternatively or in addition to, the user identification device 1310 can be part of the housing 1305. The user identification device 1310 can be on a surface (e.g., an outer surface) of the housing 1305. The user identification device 1310 can be fixed at a permanent position relative to the housing 1305, or be movable (e.g., extendable via a stretchable or coiled chord, etc.) relative to the housing 1305.

As such, examples of the user identification device 1310 can comprise one or more scanners configured to scan and/or analyze any of the biometric data, such as a facial recognition scanner, iris scanner, fingerprint scanner, voice recognition device, etc. Alternatively or in addition to, the user identifier can comprise at least one identifier reader, as above-mentioned, configured to scan an identifier specific to the user. The identifier of the user may comprise a MRC (e.g., a barcode) and/or an identification device (e.g., a RFID system) that is recognizable by the at least one identifier reader.

The medication management system 1205 can comprise at least 1, 2, 3, 4, 5, 6, 7, 8, 9, 10, or more of the user identification device 130 configured to operate individually and/or in unison. The medication management system 1205 can comprise at most 10, 9, 8, 7, 6, 5, 4, 3, 2, or 1 of the user identification device 1310 configured to operate individually and/or in unison.

In some cases, the user identification device 1310 can be configured to scan a plurality of users, and identify each user based on the scanning. The identifying can comprise retrieving (e.g., automatically retrieving) a profile of each of the plurality of users from the database(s) 1210 in operative and digital communication with the user identification device 1310 (and one or more additional components of the medication management system 1205, as provided herein).

In some cases, the user identification device 1310 (e.g., a camera) can be configured to take and save one or more images and/or videos of the user while using the medication management system 1205 for security and accountability purposes. In some examples, the medication management system 1205 can have a separate user identification device 1310 for each of a plurality of components of the medication management system 1205. For example a user identification device 1310a can be disposed adjacent to a display 1320 to capture images/videos of the user while using the GUI shown on the display 1320. In addition, a user identification device 1310b can be disposed adjacent to the new medication storage(s) 1330 and/or the work station(s) 1340 to capture images/videos of the user while preparing or dosing the medications for the patients. Furthermore, a user identification device 1310c can be disposed adjacent to the medication collector(s) 1360 to capture images/videos of the user while (i) wasting any unused/leftover medications or (ii) retrieving any wasted unused/leftover medications.

In some cases, the camera(s) of the user identification device 1310 can have a fixed field of view (FOV). In some cases, the camera(s) can be operatively coupled to one or more actuators (e.g., linear, pneumatic, hydraulic, etc.) to permit the camera(s) to move along a single axis or multiple axes, thereby to change the FOV of the camera(s). For example, the camera(s) can be multi-axial camera(s). In some cases, the camera(s) can be operatively coupled to one or more joint mechanisms to permit the camera(s) to move in one or more degrees of freedom, thereby to change the FOV of the camera(s). The camera(s) can be configured to move in at least 1, 2, 3, 4, 5, 6, or more degrees of freedom. Examples of the joint mechanisms can include a pivot joint, hinge joint, saddle joint, condyloid joint, and ball and socket joint. In some cases, the positioning of the camera(s) can be fixed, and the FOV of the camera(s) can be modified digitally, e.g., by zooming in and out of particular regions of interest within the FOV.

In some cases the camera(s) of the user identification device 1310 can be configured to identify a user and change the FOV to track the user while the user is dosing and/or wasting medications at the medication management system 1205.

The user identification device 1310 can comprise at least 1, 2, 3, 4, 5, 6, 7, 8, 9, 10, or more cameras. The user identification device 1310 can comprise at most 10, 9, 8, 7, 6, 5, 4, 3, 2, or 1 camera. The user identification device 1310 can comprise a plurality of cameras on a same side of the medication management system 1205. The user identification device 1310 can comprise a plurality of cameras on different sides (e.g., top, front, back, left, right, etc.) of the medication management system 1205. The user identification device 1310 can comprise a plurality of cameras configured to monitor a user from a plurality of different angles (e.g., a top view of the user, a front facial view of the user, a side view of the user, etc.). The user identification device 1310 can comprise a plurality of cameras configured to monitor different parts of the user's body (e.g., head, face, torso, arms, hands, fingers, legs, etc.). In some examples, the user identification device 1310 can comprise a forward facing camera (e.g., to capture images/videos of the use during the dosing or wasting process) and one or more downward facing cameras (e.g., to capture images/videos of the medication dosing or wasting process, the work station(s) 1340, the sharps bin 1350, and/or the trash bin 1355).

In some cases, the medication management system 1205 can comprise one or more displays 1320 to allow the user to interact with the medication management system 1205 via a GUI. The GUI can display confirmed identity of the user. The GUI of the display 1320 can, at least, (i) allow the user to select a patient whom the retrieved and/or returned medications are for. (ii) allow the user to select which of a list of medications associated with the patient is being retrieved and/or returned, (iii) allow the user to provide a signature for accountability (e.g., a touch screen GUI), (iv) provide instructions on how to use the medication management system 1205, (v) provide one or more results from the analyses of the returned medications by the medication management system 1205 and/or the analysis engine 1230 of the ecosystem 1200, and/or (vi) alert the user when the information designated by the user does not match the identified medication being returned or wasted.

Generally, the GUI can be a type of interface that allows users to interact with electronic devices through graphical icons and visual indicators such as secondary notation, in addition to text-based interfaces, typed command labels, or text navigation. The GUI can be rendered on a display screen on a user device (e.g., the display 1320). Actions in the GUI can be performed through direct manipulation of the graphical elements. The GUI can be provided in a software, software application, web browser, etc. Alternatively or in addition to, the GUI may be displayed on a display of a user device (e.g., a mobile device, a smart watch, etc.). The GUI can be provided through a mobile application. Additional features of the GUI for operation of the medication management system (e.g., the system 1205) is described herein, e.g., Section I, Part C of the Specification.

In some cases, the display(s) 1320 can be configured to display messages pre-programmed by the institution when the medication management system 1205 is not in use. Examples of the messages can include weather, medication dosing and wasting instructions, patient safety reminders (e.g., patient call-button activation, security messages, etc.), best practice reminders, etc.

The housing 1305 can comprise one or more doors to control access to one or more components of the medication management system 1205. The door(s) can comprise a lock that is configured to open only upon confirming identification of the user by the user identification device. Alternatively, the door(s) may not and need not comprise a lock. The door(s) can be configured to expose and hide the component(s) of the medication management system 1205. The door(s) may comprise one or more handles. A position of the component(s) of the medication management system 1205 can be fixed relative to the door(s). Alternatively, the position of the component(s) of the medication management system 1205 can be movable relative to the door(s). In some examples, a door may be opened, and a component of the medication management system 1205 (e.g., the work station(s) 1340) can be moved for the user to provide access to the component. Such component can be integrated into a drawer that is configured to slide in and out of the housing 1305. The door can be configured to open and/or close (1) automatically via one or more actuators (e.g., linear, pneumatic, hydraulic, etc.) that are controlled via the GUI (e.g., on the display(s) 1320) or (2) manually by the user. The drawer can be configured to slide in and/or out of the housing 1305 (1) automatically via one or more actuators (e.g., linear, pneumatic, hydraulic, etc.) that are controlled via the GUI (e.g., on the display(s) 1320) or (2) manually by the user. The door(s) and/or drawer(s) can be communicatively coupled to the database(s) 1210 and the analysis engine 1230 to record and analyze the time of access to the component(s) by the user.

The medication management system 1205 can comprise at least 1, 2, 3, 4, 5, 6, 7, 8, 9, 10, 11, 12, 13, 14, 15, 16, 17, 18, 19, 20, or more doors. The medication management system 1205 can comprise at most 20, 19, 18, 17, 16, 15, 14, 13, 12, 11, 10, 9, 8, 7, 6, 5, 4, 3, 2, or 1 door. The medication management system 1205 can comprise at least 1, 2, 3, 4, 5, 6, 7, 8, 9, 10, 11, 12, 13, 14, 15, 16, 17, 18, 19, 20, or more drawers. The medication management system 1205 can comprise at most 20, 19, 18, 17, 16, 15, 14, 13, 12, 11, 10, 9, 8, 7, 6, 5, 4, 3, 2, or 1 drawer The medication management system 1205 can comprise one or more new medication storages 1330. The new medication storage(s) 1330 can be a holder or container that stores new medications. In some cases, the new medication storage(s) 1330 can be temperature regulated (e.g., can be operatively coupled to one or more temperature regulators, such as refrigerator(s), freezer(s), or thermoelectric module(s)) for proper storage of the medications. The new medication storage(s) 1330 can operate in place of an ADC, such as an ADM. For example, the medication management system 1205 can comprise an ADM or components of the ADM as the new medication storage(s) 1330. Alternatively, the medication management system 1205 can be operatively coupled to an existing ADC 1335 (e.g., an ADM). The medication management system 1205 can be operatively coupled to at least 1, 2, 3, 4, 5, or more ADCs. The medication management system 1205 can be operatively coupled to at most 5, 4, 3, 2, or 1 ADC. The medication management system 1205 can comprise at least 1, 2, 3, 4, 5, or more new medication storages. The medication management system 1205 can comprise at most 5, 4, 3, 2, or 1 new medication storage. A plurality of new medication storages may be set at the same storage temperature (or temperature ranges). Alternatively, the plurality of new medication storages may be set at different temperatures (or temperature ranges).

The medication management system 1205 can comprise at least 1, 2, 3, 4, 5, 6, 7, 8, 9, 10, or more new medication storages. The medication management system 1205 can comprise at most 10, 9, 8, 7, 6, 5, 4, 3, 2, or 1 new medication storage.

The housing 1305 can comprise one or more transparent or semi-transparent window for the user to visualize at least a portion of the medications inside the new medication storage(s) 1330. Alternatively, the new medication storage(s) 1330 can be hidden without any access of visualization until the user is properly logged into the medication management system 1205 and one or more door(s) to the new medication storage(s) 1330 are opened.

The medication management system 1205 can comprise one or more work station(s) 1340. The work station(s) 1340 can provide a space or area for the user to (1) place the medications retrieved from the new medication storage(s) 1330 and/or one or more tools required for medication dosing (e.g., a pill splitter, syringe, patch remover, etc.), (2) perform medication dosing, (3) place used/leftover medications and/or tools, and/or (4) perform unused/leftover medication wasting. The work station(s) 1340 can be operatively coupled to (e.g., provide access to) the one or more medication collectors 1360. Alternatively, the work station(s) 1340 can be disposed separately from the medication collector(s) 1360. The work station(s) 1340 and the medication collector(s) 1360 can be disposed adjacent to each other for ease of medication wasting.

The medication management system 1205 can comprise at least 1, 2, 3, 4, 5, 6, 7, 8, 9, 10, or more work stations. The medication management system 1205 can comprise at most 10, 9, 8, 7, 6, 5, 4, 3, 2, or 1 work station. In an example, the medication management system 1206 can comprise a single work station.

An area of a work station can be at least about 100 centimeter squared (cm²), 200 cm², 300 cm², 400 cm², 500 cm², 600 cm², 700 cm², 800 cm², 900 cm², 1000 cm², 1500 cm², 2000 cm², 3000 cm², 4000 cm², 5000 cm², 6000 cm², 7000 cm², 8000 cm², 9000 cm², 10000 cm², or more. The area of the work station can be at most about 10000 cm², 9000 cm², 8000 cm², 7000 cm², 6000 cm², 5000 cm², 4000 cm², 3000 cm², 2000 cm², 1500 cm², 1000 cm², 900 cm², 800 cm², 700 cm², 600 cm², 500 cm², 400 cm², 300 cm², 200 cm², 100 cm², or less.

In some embodiments, the work station(s) 1340 can be integrated into a drawer that is configured to slide in and out of the housing 1305. A film cartridge can be operatively coupled to the work station(s) 1340 and the drawer. In some cases, upon closing and/or opening of the drawer, the film cartridge can be triggered to apply a new film (or wrap) on a surface of the work station(s) 1340. In some cases, upon closing and/or opening of the drawer, the film cartridge can be triggered to remove an outermost film to expose a new film on the surface of the work station(s) 1340. In some cases, the user may be required to manually direct the film cartridge to either apply a new film to the work station(s) 1340 or remove a used film from the work station(s) 1340. The use of the film cartridge can provide a clean working environment and reduce the chance of medication contamination, thereby to promote better patient health. In some embodiments, the work station(s) 1340 can be operatively coupled to one or more cleaners configured to apply cleaning agents to at least a portion of the work station(s) 1340. Examples of the cleaner(s) can include, but are not limited to, wipers (e.g., disinfectant wipes), solution spraying devices (e.g., bleach spray bottles), gas (e.g., ethylene oxide, vaporized hydrogen peroxides, and beta-propiolactone (BPL), etc.) spraying devices, and/or a light sanitizing device, such as an ultraviolet (UV) sanitizing device. The cleaner(s) can be integrated as part of the work station(s) 1340. Alternatively, the cleaner(s) can be disposed adjacent to the work station(s) 1340. The cleaner(s) can be triggered (e.g., automatically by the system 1205 or manually by the user) to clean or sanitize the surface of the work station(s) 1340 prior to and/or subsequent to its use. For example, the cleaner(s) can be triggered to clean/sanitize the work station(s) 1340 when the drawer (which comprises the work station(s) 1340) is opened and/or closed. In some cases, the new film and/or cleaning agents can be applied to the work station(s) 1340 in a targeted manner (e.g., only to a selected region within the work station(s) 1340), e.g., to prevent exposure of the wasted medications to the new film and/or cleaning agents.

A film can cover at least about 5 percent (%), 10%, 15%, 20%, 30%, 40%, 50%, 60%, 70%, 80%, 90%, 95%, 99%, or more of a surface of a work station. The film can cover at most about 100%, 95%, 90%, 80%, 70%, 60%, 50%, 40%, 30%, 20%, 15% 10%, 5%, or less of the surface of the work station.

The work station(s) 1340 can be configured to hold one or more medications and/or medication packages (e.g., at least 1, 2, 3, 4, 5, 6, 7, 8, 9, 10, or more medication medications and/or medication packages, at most 10, 9, 8, 7, 6, 5, 4, 3, 2, or 1 medication medications and/or medication package).

The medication management system 1205 can comprise one or more medication collectors 1360. The medication collector(s) 1360 can be one or more compartments for disposal, wasting, and/or collection of any unused/leftover medications. The medication collector(s) 1360 can be operatively coupled to the work station(s) 1340. The medication collector(s) 1360 can be a part of the work station(s) 1340. Alternatively, the medication collector(s) 1360 can be coupled to the work station(s) 1340 via one or more channels, and the channel(s) can allow passage of unused/leftover medications or empty medication packages from the work station(s) 1340 to the medication collector(s) 1360. In some cases, the medication management system 1205 can comprise a single medication collector configured to collect different types of medications. Such different types of medications can be collected within the single medication collector and/or into a single returned/wasted medication bin 1375. Alternatively, the different types of medications can be collected via the single medication collector, and then be sorted (e.g., via one or more sensors and sorting units) into separate returned/wasted medication bins 1375 depending on their types (e.g., forms or medication composition types).

In some cases, the medication management system 1205 can comprise a plurality of medication collectors. Each of the plurality of medication collectors can be configured to collect different types (e.g., forms) of medications. For example, the medication management system 1205 can comprise one or more pill collectors 1362, one or more liquid collectors 1364, one or more patch collectors 1366, and/or one or more intravenous (IV) bag collectors 1368. The plurality of medication collectors can be operatively coupled to (e.g., in fluid communication with) the same returned/wasted medication bin 1375. Alternatively, each of the plurality of medication collectors can be operatively coupled to (e.g., in fluid communication with) a respective returned/wasted medication bin 1375 based on the medication types (e.g., forms). In some cases, one or more medication collectors of the plurality of medication collectors can be marked (e.g., permanently or transiently) with an indicator. In an example, different medication collectors can be marked with different colors and/or signs for the user to distinguish one medication collector from another medication collector. In another example, a selected medication collector can be marked with a lighting (e.g., via a light emitting diode or a collection thereof) to indicate to the user which medication collector to utilize for medication wasting. Such lighting can be a solid light or a flickering light.

A returned/wasted medication bin can be a part of a medication collector. Alternatively, the returned/wasted medication bin can be in fluid communication (e.g., via one or more channels or ducts) with the medication collector to receive and collect any wasted medications.

The pill collector(s) 1362 can be configured to receive a plurality of pills. The pill collector(s) 1362 can be configured to receive a plurality of types of pills and sort the plurality of types based on, for example, brand color, size, shape, weight, density, and/or chemical content (e.g., via the medication sensor(s) 1370). The pill collector(s) 1362 can comprise a platform onto which the user can place unused/leftover medications, and the platform can open (e.g., manually by the user via the GUI on the display(s) 1320, or automatically by a controller) to direct the unused/leftover medications towards a respective returned/wasted medication bin 1375. For example, the platform can be configured to tilt, rotate, or slide to "drop" the pill medications into the open space within the pill collector(s) 1362 or into the returned/wasted medication bin(s) 1375. In some cases, the medication management system 1205 can comprise a plurality of pill collectors (e.g., at least 1, 2, 3, 4, 5, or more pill collectors) configured to receive different types and/or sizes of pill medications. In some cases, the pill collector(s) 1362 can be configured to (e.g., comprise one or more robotic arms) to open a pill medication container to retrieve and waste any unused/leftover pill medications.

The pill collector(s) 1362 can be configured to collect at least 1, 2, 3, 4, 5, 10, 20, 30, 40, 50, 100, 200, 300, 400, 500, 1000, 2000, 3000, 4000, 5000, 10000, or more pill medications for wasting. The pill collector(s) 1362 can be configured to collect at most 10000, 5000, 4000, 3000, 2000, 1000, 500, 400, 300, 200, 100, 50, 40, 30, 20, 10, 5, 4, 3, 2, or 1 pill medication for wasting.

The liquid collector(s) 1364 can be a receptacle configured to receive liquid medications. The liquid collector(s) 1364 can be a reservoir, box, container, cup, vat, pan, etc. The liquid collector(s) 1364 can comprise a surface with one or more perforations configured to allow passage of any wasted liquid medications into the receptable of the liquid collector(s) 1364 and/or into a respective returned/wasted medication bin 1375. In some cases, the perforation(s) can also serve to prevent splashing of the liquid medications being wasted. Alternatively or in addition to, the surface can have a shape (e.g., U- or V-shaped) to reduce or prevent the splashing. The surface can comprise one or more grooves to direct flow of the wasted liquid medications. The user can waste the liquid medications during dosing of the liquid medications (e.g., squirting excess liquid medications to remove air bubbles from a syringe, pour any excess medications such as excess liquid comprising acetaminophen, codeine, valproic acid, etc.) liquid collector(s) 1364. The user can also waste any unused/leftover medications (e.g., remaining in the syringe or the original liquid medication vial) into the liquid collector(s) 1364. In some cases, the liquid collector(s) 1364 can be configured to (e.g., comprise one or more robotic arms) to open the syringe and/or the original liquid medication vial to retrieve and waste any unused/leftover liquid medications.

In some embodiments, the liquid collector(s) 1364 can comprise a storage unit for the user to place the medication containers comprising the leftover liquid medications (e.g., propofol) for wasting. In an example, the medication container can be a liquid medication vial. In another example, the medication container can be a pre-manufactured unit dose cups or large bottles that contain the medications. In some cases, the user may be required to fill the void of the medication containers with a neutralizer or a filler (e.g., liquid, gel, solid, etc.). By "capping off" the medication containers, any further entry into the medication containers or access to the leftover medications can be prevented. Capping off the medication containers can additionally prevent accidental leakage of the liquid medications from the medication containers. In an example, the user may be required to inject (e.g., via a syringe with or without a needle) the neutralizer/filler towards the void of the medication containers. In some cases, the medication management system can be configured to cap off the medication container, e.g., during and/or prior to collection of the medication container. In some cases, a unique identifier can be generated for a medication container that is capped off. The unique identifier can be specific for the medication container, a patient to whom the medication container was prescribed to, and/or the healthcare provider responsible for handing the medication container. Following, the capped off medication containers can be collected in a medication collector, e.g., the storage unit of the liquid collector(s) 1364. In alternative embodiments, the medication container may not or need not be capped off, either by the user or the medication management system.

The liquid collector(s) 1364 can be configured to collect at least 0.1 microliter (μL), 0.5 μL, 1 μL, 5 μL, 10 μL, 50 μL, 100 μL, 500 μL, 1 milliliter (mL), 5 mL, 10 mL, 50 mL, 100 mL, 500 mL, 1 liter (L), 5 L, 10 L, 50 L, 100 L, or more of liquid medications for wasting. The liquid collector(s) 1364 can be configured to collect at most 100 L, 50 L, 10 L, 5 L, 1 L, 500 mL, 100 mL, 50 mL, 10 mL, 5 mL, 1 mL, 500 μL, 100 μL, 50 μL, 10 μL, 5 μL, 1 μL, 0.5 μL, 0.1 μL, or less of liquid medications for wasting.

The patch collector(s) 1366 can be configured to receive unused/leftover patches and/or used patches. The patch collector(s) 1366 can receive the unused/leftover patches either with or without their original protective coverings (e.g., a patch card that protects the active side of the medication patches). The patch collector(s) 1366 can comprise one or more containers for the user to place any unused/leftover patches and/or used patches. Alternatively or in addition to, the patch collector(s) 1366 can comprise one or more perforations for the user to insert the unused/leftover patches and/or used patches. The patch collector(s) 1366 can comprise a single perforation for both the unused/leftover patches and used patches. Alternatively, the patch collector(s) 1366 can separate perforations for the unused/leftover patches and used patches. In some cases, the patch collector(s) 1366 can comprise one or more pushing unit (e.g., a plate or stick) that the user can use to push the patches into the perforation(s) of the patch collector(s) 1366.

In some cases, a healthcare provider can use a covering removal device (e.g., a roller device or a flat device) to remove one or more used patches from a patient's skin. In such cases, the patch collector(s) 1366 can be configured to receive at least a portion of the covering removal device, which portion comprises the removed patch(es). In an example, the perforation of the patch collector(s) 1366 can have a cross-sectional dimension that is sufficient to allow passage of the at least the portion of the covering removal device. In another example, the patch collector(s) 1366 can comprise a container (e.g., with a door) for the user to place the covering removal device comprising the removed patch(es) from the patient. Various aspects of the covering removal device and methods thereof are further described in International Patent Publication No. 2020/018577, which is entirely incorporated herein by reference.

The patch collector(s) 1366 can be configured to collect at least 1, 5, 10, 50, 100, 500, 1000, or more unused and/or used patches. The patch collector(s) 1366 can be configured to collect at most 1000, 500, 100, 50, 10, 5, or less unused and/or used patches. The patch collector(s) 1366 can be configured to collect at least 1, 5, 10, 50, 100, 500, 1000, or more covering removal devices. The patch collector(s) 1366 can be configured to collect at most 1000, 500, 100, 50, 10, 5, or less covering removal devices.

The IV bag collector(s) 1368 can comprise one or more receptacles to accept IV bags of various shapes and sizes. The use of the IV bag collector(s) 1368 can prevent the user (e.g., healthcare provider) from draining any remainder of the IV bag into the sink, thereby reducing the chance of unintended exposure to medications inside the IV bags and/or mismanagement (e.g., diversion) of the medications inside the IV bags. In an example, an IV bag may comprise medications such as fentanyl for intravenous administration of the medications to a patient. The IV bag collector(s) 1368 can be configured to accept/collect any components coupled to the IV bags, e.g., needles or tubing. In some cases, when wasting an IV bag, the user can hang one or more IV bags to a hanger or hook of the IV bag collector(s) 1368. In some cases, when wasting an IV bag, the user can place one or more IV bags on top of a platform of the IV bag collector(s) 1368. In some cases, the one or more IV bags can be capped off prior to wasting, as above-mentioned for the process of liquid medication wasting. A unique identifier can be generated for a medication container that is capped off. The unique identifier can be specific for the medication container, a patient to whom the medication container was prescribed to, and/or the healthcare provider responsible for handing the medication container.

The IV bag collector(s) 1368 can be configured to collect at least 1, 5, 10, 50, 100, 500, 1000, or more IV bags. The IV bag collector(s) 1368 can be configured to collect 1000, 500, 100, 50, 10, 5, or less IV bags.

The user may be required to log in to the medication management system 1205 (e.g., via the GUI on the display(s) 1320) in order to gain access to the medication collector(s) 1360 for medications wasting. Subsequent to medications wasting, the medication collector(s) 1360 can be configured to be retrieved back into the housing 1305 within a predetermined time frame (e.g., about 30 seconds to several minutes). Alternatively, the user may be required to (1) manually insert (or push) the medication collectors(s) 1360 back into the housing 1305, or (2) use the GUI on the display(s) 1320 to direct the medication collector(s) 1360 to be retrieved back into the housing 1305.

The medication collector(s) 1360 can comprise a lock that is configured to open only upon confirming identification of the user (e.g., one who is responsible for collecting returned unused/leftover medications from the medication management system 1205) by the user identification device(s) 1310. Alternatively, because the medication collector(s) 1360 can only be accessible upon logging into the medication management system 1205, the medication collector(s) 1360 may not and need not require any lock.

The medication management system 1205 can comprise at least 1, 2, 3, 4, 5, 6, 7, 8, 9, 10, or more medication collectors. The medication management system 1205 can comprise at most 10, 9, 8, 7, 6, 5, 4, 3, 2, or 1 medication collector. The medication management system 1205 can comprise at least 1, 2, 3, 4, 5, 6, 7, 8, 9, 10, or more pill medication collectors. The medication management system 1205 can comprise at most 10, 9, 8, 7, 6, 5, 4, 3, 2, or 1 pill medication collector. The medication management system 1205 can comprise at least 1, 2, 3, 4, 5, 6, 7, 8, 9, 10, or more liquid medication collectors. The medication management system 1205 can comprise at most 10, 9, 8, 7, 6, 5, 4, 3, 2, or 1 liquid medication collector. The medication management system 1205 can comprise at least 1, 2, 3, 4, 5, 6, 7, 8, 9, 10, or patch medication collectors. The medication management system 1205 can comprise at most 10, 9, 8, 7, 6, 5, 4, 3, 2, or 1 patch medication collector. The medication management system 1205 can comprise at least 1, 2, 3, 4, 5, 6, 7, 8, 9, 10, or more IV bag collectors. The medication management system 1205 can comprise at most 10, 9, 8, 7, 6, 5, 4, 3, 2, or 1 IV bag collector.

The returned/wasted medication bin(s) 1375 can be a receptacle (e.g., reservoir, box, container, cup, vat, etc.) configured to hold and collect the wasted medications. A returned/wasted medication bin can comprise a covering (e.g., a cap, lid, top, etc.) to seal the returned/wasted medication bin and protect the collected medications. In some cases, the wasted/medication bin can be a part of the housing 1305 and configured to move in and out (e.g., swivel in and out) of the housing 1305 by an authorized personnel. In some cases, the covering of the wasted/medication bin can be configured to automatically close and seal the wasted/medication bin upon removal of the wasted/medication bin out of the housing 1305 (e.g., out of the work station(s) 1340). The covering can close the wasted/medication bin by one or more movements, e.g., moving (e.g., sliding) laterally relative to an opening of the wasted/medication bin and/or moving vertically relative to the opening of the wasted/medication bin. In some cases, closure of the wasted/medication bin by the covering and/or the removal of the wasted/medication bin from the medication management system 1205 can trigger a signal (e.g., a digital code) to the database(s) 1210 and/or the analysis engine 1230 to record and indicate: (i) an identity (or lack thereof) of the authorized personnel, (ii) when the wasted/medication bin was removed for collection, and/or (iii) the particular medication management system 1205 that the wasted/medication bin was removed from.

The medication collector(s) 1360 and/or the returned/wasted medication bin(s) 1375 can be configured to detect when a predetermined amount of the medications has been collected inside. For example, the medication collector(s) 1360 or the returned/wasted medication bin(s) 1375 can comprise (i) a weight sensor to measure the weight of the wasted medications being collected, and/or (ii) an optical sensor to measure a height of the collected medications within the medication collector(s) 1360 or the returned/wasted medication bin(s) 1375. Detection of the predetermined amount of medications can trigger a signal (e.g., a digital code) to maintenance services or authorized medications removal personnel (e.g., Stericycle) to remove and replace the medication collector(s) 1360 or the returned/wasted medication bin(s) 1375. The maintenance services or authorized medications removal personnel can be required to login to the medication management system 1205 (e.g., via the GUI).

In some cases, the medication collector(s) 1360 can have separate storage units to separately store unused medications (e.g., "returned" medications that have not been opened) and leftover medications.

The medication collector(s) 1360 can comprise or be operatively coupled to one or more medication sensor(s) 1370. The medication sensor(s) 1370 can be configured to scan the unused/leftover medications and/or medication packages for, e.g., confirming the types or amounts of the medications being wasted, sorting of the wasted medications into a respective medication collector (e.g., into one of the medication collector(s) 1360), and/or sorting the wasted medications from the medication collector(s) 1360 to a respective returned/wasted medication bin(s) 1375.

The medication sensor(s) 1370 can be disposed on or adjacent to an outer surface of the medication collector(s) 1360. As such, the user can scan the medications and/or medication packages prior to wasting them into the medication collector(s) 1360. Alternatively or in addition to, the medication sensor(s) 1370 can be disposed inside the medication collector(s) 1360. The medication sensor(s) 1370 that is disposed inside the medication collector(s) 1360 can be visible or invisible to the user. The medication sensor(s) 1370 can be operatively coupled to work station(s) 1340. In some cases, the user may gain access to the work station(s) 1340, use the medication sensor(s) 1370 to scan the medications or medication packages, and waste the medications and/or medication packages to the medication collector(s) 1360. In some cases, the user may gain access to the work station(s) 1340, waste the medications and/or medication packages into the medication collector(s) 1360, and subsequently, the medication sensor(s) 1370 may scan (e.g., automatically scan) the medications and/or medication packages.

The medication sensor(s) 1370 (e.g., a camera, infrared light sensor, etc.) can be configured to visualize contents (e.g., one or more unused/leftover medications) inside the medication packages (e.g., bottles). The medication sensor(s) 1370 can be configured to: (i) determine presence or absence of any unused/leftover medication inside the medication packages; (ii) validate the unused/leftover medication; (iii) obtain one or more electromagnetic spectroscopies, images, and/or videos of the unused/leftover medications and/or the medication packages, (iv) determine the amount (e.g., by weight or volume) of the wasted medications, and (v) send any resulting data to the database(s) 1210 and/or the analysis engine 1230 of the ecosystem 1200. As the medication sensor(s) 1370 can be configured to identify any unused/leftover medication, the medication sensor(s)

1370 can thus be configured to identify falsified medications types or amounts, e.g., (i) medications that may exhibit the same appearance as the real prescribed medication, but having different chemical contents, (ii) medications that may exhibit the same chemical contents as the real prescribed medications, but having different appearances, (iii) having less amount of medications than expected from what was actually prescribed to the patient, etc. Examples of such medication sensor(s) 1370 can comprise an electromagnetic radiation sensor (e.g., IR sensor, colorimetric sensor, etc.), chemical sensor, mass spectrometer (e.g., ion trap, quadru-pole, time of flight, sector, Fourier-transform ion cyclotron resonance mass spectrometer, etc.), etc. Additional examples of such sensor can comprise a detector, vision system, computer vision, machine vision, imager, camera, proximity sensor, densitometer (e.g., optical densitometer), profilome-ter, spectrometer, pyrometer, force sensor (e.g., piezo sensor for pressure, acceleration, temperature, strain, force), motion sensor, magnetic field sensor (e.g., microelectromechanical systems), electric field sensor, etc. In some cases, the medi-cation sensor(s) 1370 can be configured to compare an image of the wasted medication (e.g., a pill) to one or more authentic images of the medication (e.g., retrieved from the database(s) 1210, database(s) 1215, and/or internet 1220 as shown in FIG. 3A) to confirm or authenticate the wasted medication or contents thereof.

In an example, one or more light beams (e.g., one or more laser beams) may be directed towards a target material (e.g., the unused/leftover medications), and Raman scattering from the target material may be detected by any of the subject sensor or detector disclosed herein. As the photons from the laser beam(s) interact with the target material, the energy from some of the photons may be partially absorbed and the remaining energy (from the non-absorbed photons) may be re-emitted by the target material as scattered light at a different frequency than the initial laser beam(s). The shift in frequency (or wavelength) between the scattered light and the original laser beam(s) may depend on the energy absorbed by the molecular bonds. The molecular bonds associated with Raman scattering may be non-polar. Thus, the Raman scattering detection may provide information about the carbon-carbon bonds along the backbone of organic raw contents in the target material. Alternatively or in addition to, near-infrared (NTR) detection may be used to analyze the target material. The NIR detection may be configured to analyze polar molecular bonds within the target material, and thus, in some cases, the NIR detection and Raman scattering detection may complement each other.

In some cases, the medication sensor(s) 1370 can com-prise a light source (e.g., at least 1, 2, 3, 4, 5, or more light sources) and a detector (e.g., at least 1, 2, 3, 4, 5, or more detectors) that is operatively coupled to the light source. The light source of the medication sensor(s) 1370 can be con-figured to provide an electromagnetic radiation to the medi-cations and/or medication packages. The detector of the medication sensor(s) 1370 can be configured to detect at least a portion of the electromagnetic radiation as it is transmitted through the medications and/or medication packages. Alternatively or in addition to, the detector of the medication sensor(s) 1370 can be configured to detect at least a portion of the electromagnetic radiation that is reflected upon contacting the medications and/or medication packages. In some examples, the medication packages can comprise a colored (e.g., orange) medication containers (e.g., colored bottles for pills, colored vials for liquid medications, syringes for liquid medications, etc.). In such cases, the medication sensor(s) 1370 (e.g., one or more cameras) can be configured to visualize through the colored medication packages in order to reach and detect any unused/leftover medications inside the colored medication packages. In some cases, the wavelength, intensity, and/or exposure time of the electromagnetic radiation emitted by the medication sensor(s) 1370 can be selected such that the selected electromagnetic radiation does not break down or alter the chemical nature of the medications.

The electromagnetic radiation can comprise one or more wavelengths from the electromagnetic spectrum including, but not limited to x-rays (about 0.1 nanometers (nm) to about 10.0 nm; or about $10^{18}$ hertz (Hz) to about $10^{16}$ Hz), ultraviolet (UV) rays (about 10.0 nm to about 380 nm; or about $8 \times 10^{16}$ Hz to about $10^{15}$ Hz), visible light (about 380 nm to about 750 nm; or about $8 \times 10^{14}$ Hz to about $4 \times 10^{14}$ Hz), infrared light (about 750 nm to about 0.1 centimeters (cm); or about $4 \times 10^{14}$ Hz to about $5 \times 10^{11}$ Hz), and micro-waves (about 0.1 cm to about 100 cm; or about $10^8$ Hz to about $5 \times 10^{11}$ Hz). Within the wavelength range of the UV rays, wavelengths of about 300 nm to about 380 nm may be referred to as "near" ultraviolet, wavelengths of about 200 nm to about 300 nm as "far" ultraviolet, and 10 about to about 200 nm as "extreme" ultraviolet. In some cases, within the wavelength range of the visible light, wavelengths of about 380 nm to about 490 nm may be referred to as "blue" light. The infrared light may comprise one or more ranges selected from the group consisting of: (i) near-infrared (NIR; from about 750 nm to about 1.4 micrometer (µm)), (ii) short-wavelength infrared (SWIR; from about 1.4 µm to about 3 µm), (iii) mid-wavelength infrared (MWIR; from about 3 µm to about 8 µm), (iv) long-wavelength infrared (LWIR; from about 8 µm to about 15 µm), and (v) far infrared (FIR; from about 15 µm to about 1,000 µm).

In some cases, the medication sensor(s) 1370 can be top facing, side facing, and/or bottom facing with respect to the wasted medications or medication packages. As such, the medication sensor(s) 1370 can be configured to scan from top, side(s), and/or bottom of the medications or medication packages. In some cases, the medication sensor(s) 1370 can be operatively coupled to a platform. The platform can be a separate component of the medication management system 1205. Alternatively, the platform can be a part of the work station(s) 1340 or the medication collector(s) 1360). The platform can comprise a rotating carousel that is configured to spin the wasted medications or medication packages about 360 degrees (counterclockwise and/or clockwise). The rotating carousel may be coupled to an actuator (e.g., a rotary actuator) that is configured to direct the rotating carousel to rotate. The user can deposit the unused/leftover medications or medication packages on the rotating carou-sel. In some examples, as the rotating carousel spins, the medications (e.g., pills) inside the medication packages can move and spread out (e.g., due to centrifugal force from the spinning), thus revealing medications that were hidden by or between other medications to be detected by the medication sensor(s) 1370. Alternatively or in addition to, the medica-tion sensor(s) 1370 can be configured to visualize the contents of the medication packages as the medication packages are rotated by the rotating carousel, thereby to obtaining a more accurate representation (e.g., a three-dimensional representation) of the contents inside relative to without such spinning.

The rotating carousel may be configured to rotate at least about 10 degrees, 20 degrees, 30 degrees, 60 degrees, 90 degrees, 120 degrees, 150 degrees, 180 degrees, 210 degrees, 240 degrees, 270 degrees, 300 degrees, 330 degrees, 360 degrees, 540 degrees, 720 degrees, or more.

The rotating carousel may be configured to rotate at most about 720 degrees, 540 degrees, 360 degrees, 330 degrees, 300 degrees, 270 degrees, 240 degrees, 210 degrees, 180 degrees, 150 degrees, 120 degrees, 90 degrees, 60 degrees, 30 degrees, 20 degrees, 10 degrees, or less.

In some cases, the medication sensor(s) 1370 can comprise a scale (e.g., a digital scale) configured to measure weight of (i) the unused/leftover medications, (ii) the unused/leftover medications inside the medication packages, (iii) the medication packages without any unused/leftover medications (e.g., when the user reports that all of the medications was administered to the patient), and/or (iv) the medication packages with the medications prior to administration to a patient. The scale can be configured to send any data generated to the database(s) 1210 and/or the analysis engine 1230 of the ecosystem 1200.

In some cases, the scale can measure a weight of the medication packages and send the data to the database(s) 1210 and the analysis engine 1230. The analysis engine 1230 can obtain a weight of the medication packages when empty based on the identified prescription details (e.g., from scanning the identifier of the medication packages and retrieving the necessary information from the internet 1220, the database(s) 1215, the database(s) 1210, etc.). By comparing the weight of the empty medication packages and the weight of the medication packages measured by the scale, the analysis engine 1230 can determine a presence (and approximately exact amount thereof) or absence of unused/leftover medications deposited and wasted to the medication management system 1205. Additionally, the analysis engine 1230 can further determine how much unused/leftover medication is supposed to be returned/wasted based on information from the eMAR and/or CPOE, and compare the theoretical amount to the actual amount that is being returned/wasted by the user. In doing so, the analysis engine 1230 can detect potential mismanagement (e.g., diversion) of the medications by the user.

The medication management system 1205 can comprise at least one sharps bin 1350. The sharps bin 1350 can be a part of the housing 1305 (e.g., partially or fully integrated within the housing 1305). In such a case, the user can be required to log into the medication management system 1205 to discard any sharps into the sharps bin 1350. For example, an opening of the sharps bin 1350 can be disposed on a side of the housing 1305. In another example, the opening of the sharps bin 1350 can be a part of the work station(s) 1340, such that the sharps bin 1350 is only accessible during a proper wasting process. One or more cameras of the user identification device(s) 1310 can be configured to capture user activities by the sharps bin 1350. Alternatively, the sharps bin 1305 can be disposed outside of the housing 1305 to allow depositing or wasting of sharps into the sharps bin 1305 by any user, regardless of whether such user is logged into the medication management system 1205 or not. In some cases, the user can discard used IV sets into the sharps bin 1350.

The medication management system 1205 can comprise at least 1, 2, 3, 4, 5, or more sharps bins. The medication management system 1205 can comprise at most 5, 4, 3, 2, or 1 sharps bin. In alternatively embodiments, the medication management system 1205 may not or need not include a sharps bin.

The medication management system 1205 can comprise at least one trash bin 1355. The trash bin 1355 can be a part of the housing 1305 (e.g., partially or fully integrated within the housing 1305). In such a case, the user can be required to log into the medication management system 1205 to discard any trash into the trash bin 1355. For example, an opening of the trash bin 1355 can be disposed on a side of the housing 1305. In another example, the opening of the trash bin 1355 can be a part of the work station(s) 1340. One or more cameras of the user identification device(s) 1310 can be configured to capture user activities by the trash bin 1355. When the medication management system 1205 comprises the trash bin 1355, the digital supervision of the camera(s) can reduce or prevent the user from wasting any medications or sharps into the trash bin 1355. Alternatively, the trash bin 1355 can be disposed outside of the housing 1305 to allow depositing or wasting of trash into the trash bin 1355 by any user, regardless of whether such user is logged into the medication management system 1205 or not.

The medication management system 1205 can comprise at least 1, 2, 3, 4, 5, or more trash bins. The medication management system 1205 can comprise at most 5, 4, 3, 2, or 1 trash bin.

The sharps bin 1350 and/or the trash bin 1355 can be configured to detect when a predetermined amount of the sharps and/or trash has been collected inside. For example, the sharps bin 1350 or the trash bin 1355 can comprise (i) a weight sensor to measure the weight of the waste being collected, and/or (ii) an optical sensor to measure a height of the collected wastes within the sharps bin 1350 or the trash bin 1355. Detection of the predetermined amount of wastes can trigger a signal (e.g., a digital code) to maintenance services or authorized medications removal personnel (e.g., Stericycle) to remove and replace the sharps bin 1350 or the trash bin 1355. The maintenance services or authorized medications removal personnel can be required to login to the medication management system 1205 (e.g., via the GUI as provided herein).

The medication management ecosystem 1200 can be operatively coupled to one or more backup power generators. The backup power generator(s) can ensure a continual use of the medication management system 1205 in the event of power loss (e.g., due to natural disasters or accidents) to at least a portion of the medication management ecosystem 1200.

In some embodiments, the medication collector(s) 1360 and/or the returned/wasted medication bin(s) 1375 can comprise a neutralizer (e.g., chemical decontaminants, drug antagonists, mechanical encapsulant, etc.) to deactivate the wasted medications. The neutralizer can be released and/or activated automatically (e.g., upon wasting of the medications to the medication collector(s) 1360 by the user, upon collection of the wasted medications into the returned/wasted medication bin(s) 1375, etc.), or manually by the user (e.g., via the GUI as provided herein). In some cases, the neutralizer can be activated upon the analysis of the wasted medications by the medication sensor(s) 1370. The neutralizer can be stored in a neutralizer compartment prior to its use. The neutralizer compartment can be a separate compartment within the housing 1305. Alternatively, the neutralizer compartment can be a part of the medication collector(s) 1360 or the returned/wasted medication bin(s) 1375. The neutralizer can be applied to the wasted medications by way of a solid, liquid, gel, vapor and/or gas medium.

In some embodiments, the medication sensor(s) 1370 as provided herein can be utilized by the medication management system 1205 to analyze the medications to be wasted prior to the actual wasting of the medications into the medication collector(s) 1360 by the user.

In some cases, the neutralizer can be a chemical decontaminant for the controlled substance (e.g., fentanyl and its derivatives such as carfentanil). For example, the neutralizer for fentanyl and its derivatives can be a mixture of peracetyl borate, its functional variant thereof, and a solvent (e.g., water). In some cases, the neutralizer can be a molecular antagonist to the controlled substance (e.g., naloxone as an antagonist of opioids including fentanyl). In some cases, the neutralizer can be a mechanical encapsulant. The mechanical encapsulant can solidify prior to, upon, or subsequent to being in contact with the wasted medications. The wasted medications can be inside or outside the medication packages when deactivated by the neutralizer. In some cases, the neutralizer can comprise activated charcoal, layers of special cloths or tissues, etc. In an example, the neutralizer can be NarcX®.

The medication management system 1205 can comprise at least 1, 2, 3, 4, 5, or more medication neutralizers. The medication management system 1205 can comprise at most 5, 4, 3, 2, or 1 medication neutralizer. The medication management system 1205 can have a plurality of medication neutralizers that are the same. Alternatively, the plurality of neutralizers can comprise different types of medication neutralizers.

In some embodiments, the medication management system 1205 can comprise one or more medication sample storage units. The medication sample storage unit(s) can be a part of the work station(s) 1340, the medication collector(s) 1360, and/or the returned/wasted medication bin(s) 1375. Alternatively, the medication sample storage unit(s) can be a separate component of the medication management system 1205 and operatively coupled (e.g., in fluid communication via one or more channels, ducts, etc.) to the work station(s) 1340, the medication collector(s) 1360, and/or the returned/wasted medication bin(s) 1375.

Upon wasting of the medications by the user to the medication management system 1205, at least a portion of the wasted medications may be directed to the medication storage unit(s). In some cases, one or more transfer units (e.g., a vacuum system, a robotic arm, a roller, a belt, a chain, a chute, a pulley, etc.) can be configured to capture and store at least a portion of the wasted medications (e.g., from the work station(s) 1340, the medication collector(s) 1360, and/or the returned/wasted medication bin(s) 1375) into the medication sample storage unit(s) before their deactivation by one or more neutralizers, as described herein. Transfer of the medication sample into the medication sample storage unit(s) can be triggered randomly (e.g., for irregular or routine quality control) or selectively, e.g., by one or more machine learning algorithms of the analysis engine 1230 based on, e.g., history of the user of the medication management system 1205, date, types of medications, any institutional or government directives, age of the recorded pictures/videos, etc. In some cases, the users of the medication management system 1205 may not know when and whose wasted medications is being captured and stored in the medication storage unit(s) to enhance threat deterrence. The captured and stored medication samples can be retrieved by an authorized personnel, e.g., a pharmacy employee, nursing supervisor, or administrators of the medication management ecosystem 1200, for analysis of the captured medication samples. The analysis (e.g., a spectroscopic analysis, chemical analysis, etc.) can be used to confirm proper medication management or a potential medication mismanagement by the user during the medication wasting process.

In some embodiments, the medication management system 1205 can be configured to be controlled remotely by nursing supervisors or administrators, e.g., to intervene (e.g., override) the wasting procedure of a physical user (e.g., a nurse) of the medication management system 1205. The remote intervention by the supervisors/administrators can occur, for example, when the nurse is having a problem with the medication management system 1205, or when the analysis engine 1230 triggers an alert of a possible mismanagement (e.g., diversion) of medications by the nurse. In some cases, the supervisors/administrators can control operations of the medication management system 1205 via the user device(s) 1240. In some cases, the display(s) 1320 and the user identification device(s) 1310 (e.g., cameras) can be used for the nurse and the supervisors/administrators to communication (e.g., via tele-conference or video-conference) to resolve any issues. As such, the nurse may not and need not waste time to look for the supervisors/administrators. In some embodiments, the user can utilize the medication management system 1205 to remotely connect with one or more other healthcare providers (e.g., a different nurse or supervisor), such that the other healthcare provider(s) can remotely view and witness the user's medication wasting process. The medication management systems and methods disclosed herein can be utilized to separate healthcare providers while still allowing them to work in collaboration (e.g., remotely) to prevent, for example, disease cross-contamination between the healthcare providers and disease spreading to the patients.

FIG. 3C illustrates an example flowchart 2000 of a process of determining a risk or probability of medication diversion, e.g., using the medication management ecosystem as disclosed herein. The medication management ecosystem (e.g., the medication management system 1205, the database(s) 1210, and/or the analysis engine 1230 as shown in FIG. 3A) can authenticate a user of the medication management system (process 2010). The medication management ecosystem can permit the user to access the medication management system (process 2015). The medication management ecosystem can receive a medication from the user (process 2020). The medication can be (or can be reported by the user to be) an unused or leftover portion of a prescribed medication for a subject in need thereof. The medication management ecosystem can detect the medication to generate detection data (process 2025). For example, one or more sensors (e.g., the user identification device(s) 1310 and/or the medication collector(s) 1360 as shown in FIG. 3B) can be used to detect (e.g., analyze) the medication. The medication management ecosystem can determine a risk or probability of diversion of the prescribed medication (e.g., by the user or a third party) based at least in part on the detection data (process 2030). The medication management ecosystem can create a log (e.g., a digital log data) of the wasted medication.

FIGS. 4A and 4B schematically illustrate an example medication management system 1400. The medication management system 1400 may be disposed at an inpatient care facility (e.g., a hospital). A plurality of the medication management system 1400 can be positioned in a plurality of locations within the inpatient care facility to decentralize the medication wasting procedure, e.g., as opposed to requiring all healthcare providers (e.g., nurses) to return unused/leftover medications to a centralized, single location. The medication management system 1400 can be a modular device, as disclosed herein, such that the medication management system 1400 can be configurable or upgradable for different functions (e.g., modified to receive different types of medications) or repair. The medication management system 1400 can comprise a plurality of cameras for visual accountability of the users (e.g., nurses) during unused/ leftover disposal and wasting. FIG. 4C schematically illustrates example types of medications that can be disposed/wasted by the medication management system 1400: pill medications; liquid medications; and patch medications.

Referring to FIG. 4A, the medication management system 1400 can conceal any medication collection units when it is not in use (e.g., when a user has not logged in to the system). Referring to FIG. 4B, the medication management system 1400 can comprise a user identification camera 1410 that is configured to identify and track a user 1405 (e.g., a nurse) during the user's medication wasting process. The user identification camera 1410 can record images and/or videos of the user. The user identification camera 1410 can display the recorded images and/or videos in real-time on the display 1420. The medication management system 1400 can comprise a medication wasting camera 1415 that is configured to track the actual medication disposal/wasting process. For example, while the user identification camera 1410 can be configured for facial tracking of the user 1405, the medication wasting camera 1415 can be configured with a field of view of a work station 1440 to record images/videos of the user's hands and the medications or medication containers to be wasted. The work station 1440 can be hidden when the medication management system 1400 is not in use. When in use, the work station 1440 can be opened (e.g., manually or automatically) along a direction shown by the arrow 1430, to allow access to the work station 1440. The work station can comprise a plurality of medication collectors comprising: a pill collector 1462, a liquid collector 1464, and a patch collector 1466. Each of the plurality of medication collectors can individually collect and store the respective medications. Alternatively, each of the plurality of medication collectors can be in fluid communication with a separate wasting bin to transfer and store the wasted medications. In another alternative, the plurality of medication collectors can be in fluid communication with a single wasting bin to transfer and store the wasted medications.

FIG. 5A shows an example flowchart 1500*a* of the process for a user (e.g., a nurse) to dispose a medication to the medication management system (e.g., the medication management system 1400 as shown in FIG. 4B). The user can log into the medication management system via a user interface (e.g., a GUI) provided on a display of the medication management system (process 1510). The user can provide, on the user interface, a type, name, and/or amount of medication to be disposed and the reason for wasting the medication (process 1515). The user can open a work station of the medication management system (process 1520). In the alternative, the user can wait for the work station to open automatically, e.g., via a controller operatively coupled to the medication management system. The user can dispose and waste the medication to a medication collector (e.g., the pill collector 1462, the liquid collector 1366, the patch collector 1366, or the IV bag collector 1368 as shown in FIG. 3B) (process 1525). The user can close the work station (process 1530). In the alternative, the user can wait for the work station to close automatically, e.g., via a controller operatively coupled to the medication management system.

FIG. 5B illustrates an example flowchart 1500*b* of a process of determining a risk or probability of medication diversion, e.g., using a medication management ecosystem comprising the medication management system 1400 as shown in FIG. 4B. The medication management ecosystem can further comprise the database(s) 1210 and/or the analysis engine 1230 as shown in FIG. 3A. The medication management ecosystem can authenticate a user of the medication management system (process 1550). The medication management ecosystem can permit the user to access the medication management system (process 1555). The medication management ecosystem can open a work station of the medication management system (process 1560). In an alternative, the medication management ecosystem can permit the user to instruct the work station to be opened via a user interface of the medication management system. The medication management ecosystem can wait for the user to dispose and waste a medication to a medication collector on the work station (process 1565). The medication can be (or can be reported by the user to be) an unused or leftover portion of a prescribed medication for a subject in need thereof. The medication management ecosystem can detect the medication to generate detection data. For example, one or more sensors (e.g., the user identification device(s) 1310 and/or the medication collector(s) 1360 as shown in FIG. 3B) can be used to detect (e.g., analyze) the medication to generate the detection data. The medication management ecosystem can close the work station of the medication management system (process 1570). In an alternative, the medication management ecosystem can permit the user to instruct the work station to be closed via the user interface of the medication management system.

The medication management ecosystem can determine a risk or probability of diversion of the prescribed medication, e.g., by the user or a third party (process 1575). For example, the risk or probability of diversion can be determined based at least in part on the detection data generated by the one or more sensors. The medication management ecosystem can create a log (e.g., a digital log data) of the wasted medication.

FIG. 6A schematically illustrates an example medication management system 1600. The medication management system 1600 can be disposed at an inpatient care facility (e.g., a hospital) to centralize the medication wasting procedure. The medication management system 1600 can be configured to take-back medications only. As such, the medication management system 1600 may not and need not contain any new medications to be dispensed. The medication management system 1600 can be a modular device, as disclosed herein, such that the medication management system 1600 can be configurable or upgradable for different functions (e.g., modified to receive different types of medication handling units) or repair. The medication management system 1600 can comprise one or more cameras for visual accountability of the users (e.g., nurses) during disposal and wasting of one or more medication handling units. FIG. 6B schematically illustrates example medication handling units: a medication carrier 1652 configured to carry unused medications 1654 (e.g., patches, pill packages, etc.); a patch removal device 1662 configured to remove a used patch 1664 from a patient; and an injectable (e.g., liquid medication) security device 1672 configured to control access to a liquid medication vial 1674.

The term "medication handling unit" generally refers to any unit (e.g., a device) that can contain at least a portion of a medication. The medication handling unit can be a carrier device (e.g., for protecting the medication or prevent tampering) to carry the medication from one place to another (e.g., from an ADC to a patient). For example, the medication handling unit can be a device to seal off a liquid medication (i.e., an injectable medication) vial. In another example, the medication handling unit can be a transport system (e.g., a container) to carry medication packages (e.g., pill medication packages) or patches. The transport system can comprise an enclosure to contain the medication packages and/or patches. The transport system can comprise one or more lock devices configured to grant a healthcare provider access to the medication packages and/or patches within the transport system only in the presence of a corresponding key (e.g., a key device within a patient's wristband). Examples of such transport systems and methods of use thereof are provided in, for example, U.S. Provisional Application No. 62/872,176 and U.S. Provisional Application No. 62/873,614, each of which is entirely incorporated herein by reference. The medication handling unit can be a medication package/container, as described herein. The medication handling unit can be a device configured to aid in removing a covering (e.g., a patch) from a patient, which is further described as a "covering removal device" elsewhere in the present disclosure. The medication handling unit can be a casing configured to enclose at least a portion of a medication container/package. For example, a casing can enclose at least a portion of a vial containing an injectable drug (e.g., enclose the opening portion of the vial). The casing can be activated (e.g., manually or automatically) to expose the opening to grant the user access to the medications contained within the vial. The casing can be locked to prevent further access to the medications contained within the vial. The casing can comprise the RVC. Examples of the casing and methods of use thereof are provided in, for example, U.S. Provisional Application No. 62/839,361 and U.S. Provisional Application No. 62/873,617, each of which is entirely incorporated herein by reference.

Referring to FIG. 6A, the medication management system 1600 can conceal any medication collection units when it is not in use (e.g., when a user has not logged in to the system). A medication collection unit can be opened (e.g., manually by the user, or automatically by a controller operatively coupled to the medication management system 1600) during the medication wasting process. The medication management system 1600 can comprise one or more cameras 1610 that is configured to identify and track a user 1605 (e.g., a nurse) during the user's medication wasting process. The camera(s) 1610 can record images and/or videos of the user, e.g., via facial tracking. The camera(s) 1610 can display the recorded images and/or videos in real-time on the display 1620. The camera(s) 1610 can be configured to track the actual medication disposal/wasting process, e.g., record images/videos of the user's hands and the medication handling unit being disposed for wasting. The medication management system 1600 can comprise a single medication collector configured to receive different types of medication handling units. In the alternative, the medication management system 1600 can comprise a plurality of medication collectors, each configured to receive a unique type of medication handling unit. For example, the medication management system 1600 can comprise: a medication carrier collector 1650; a patch removal device collector 1660, and an injectable security device collector 1670.

Figure 7A:
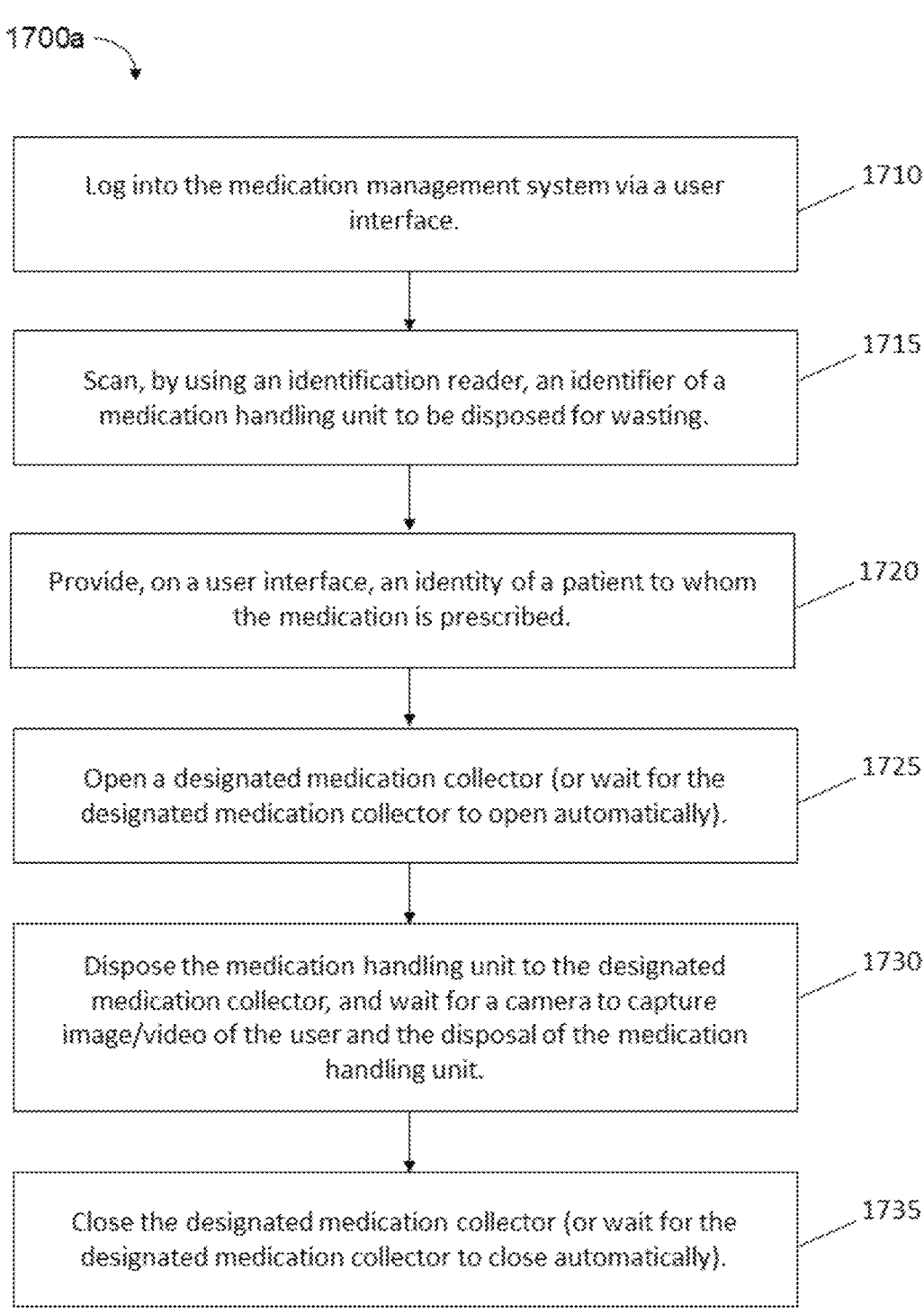
FIG. 7A illustrates an example flowchart of a process of depositing a medication handling unit to a medication management system for inpatient medical institutions.

FIG. 7 shows an example flowchart 1700a of the process for a user (e.g., a nurse) to dispose a medication handling unit to the medication management system (e.g., the medication management system 1600 as shown in FIG. 6A). The user can log into the medication management system via a user interface (e.g., a GUI) provided on a display of the medication management system (process 1710). The user can scan, by using an identification reader, an identifier of a medication handling unit to be disposed for wasting (process 1715). The user can provide, on the user interface, an identity of a patient to whom the medication is prescribed (process 1720). The user can open (e.g., pivot, turn, or rotate) a designated medication collector of the medication management system (process 1725). In the alternative, the user can wait for the designated medication collector to open automatically, e.g., via a controller operatively coupled to the medication management system. The user can dispose and waste the medication handling unit to the designated medication collector (e.g., the medication carrier collector 1650; the patch removal device collector 1660, and the injectable security device collector 1670 as shown in FIG. 6A) (process 1730). The user can additionally wait for a camera to capture image/video of the user and the disposal of the medication handling unit. The user can close the designated medication collector (process 1735). In the alternative, the user can wait for the designated medication collector to close automatically, e.g., via a controller operatively coupled to the medication management system.

FIG. 7B illustrates an example flowchart 1700b of a process of determining a risk or probability of medication diversion, e.g., using a medication management ecosystem comprising the medication management system 1600 as shown in FIG. 6A. The medication management ecosystem can further comprise the database(s) 1210 and/or the analysis engine 1230 as shown in FIG. 3A. The medication management ecosystem can authenticate a user of the medication management system (process 1750). Upon the authentication, the medication management ecosystem can permit the user to access the medication management system. The medication management ecosystem can scan an identifier of a medication handling unit comprising a medication to be disposed for wasting (process 1755). For example, the user can hold the medication handling unit to one or more sensors (e.g., cameras) of the medication management system. The medication management ecosystem can receive data from a user, via a user interface or a keyboard of the medication management system, the data comprising an identity of a patient to whom the medication is prescribed (process 1760). The medication management ecosystem can open a designated medication collector of the medication management system (process 1765). In an alternative, the medication management ecosystem can permit the user to instruct the designated medication collector to be opened via the user interface of the medication management system. The medication management ecosystem can wait for the user to dispose the medication handling unit via the designated medication collector (process 1770). The medication can be (or can be reported by the user to be) an unused or leftover portion of a prescribed medication for a subject in need thereof. The medication management ecosystem can close the designated medication collector of the medication management system (process 1775). In an alternative, the medication management ecosystem can permit the user to instruct the designated medication collector to be closed via the user interface of the medication management system. The medication management ecosystem can determine a risk or probability of diversion of the prescribed medication, e.g., by the user or a third party (process 1780). The medication management ecosystem can create a log (e.g., a digital log data) of the deposited medication handling unit. The medication management ecosystem can create a log (e.g., a digital log data) of the wasted medication.

C. User Interface

A user can interact with the medication management system 1205 via a user interface (e.g., GUI) provide on one or more displays (e.g., the display(s) 1320 as shown in FIG. 3B), such as a touchscreen display. The user can perform data entry via the touchscreen (e.g., via an on-screen keyboard) or a physical keyboard operatively coupled to the GUI. In some cases, data entry can be activated by selecting (or touching) one of the choices provided on the GUI. The choices can be numbers, letters, and/or symbols provided inside distinguishable shapes (e.g., a square, oval, triangle, square, etc.).

In some embodiments, the GUI of the medication management system 1205 can be configured to be paused, locked out, deactivated, or turned-off after (i) a predetermined duration of time without any interaction with a user and/or (ii) a predetermined duration of time without any visual recognition of a user (or a user and a witness to waste any unused/leftover medications) via the one or more cameras of the medication management system 1205 (e.g., via the one or more cameras of the user identification device(s) 1310 as shown in FIG. 3B).

In some embodiments, the user can be required to hold the liquid medication vial or the syringe comprising the leftover liquid medications to one or more cameras of the medication management system 1205, in order to visually record the amount (e.g., volume) of the liquid medications to be wasted into the liquid collector(s) 1364. In some examples, the liquid medication vial or the syringe can have markings for volumetric measurement of the liquid medications within. In some examples, the user interface (e.g., GUI) can display a capture image/video of the liquid medication vial or syringe and superimpose a virtual markings (e.g., volumetric markings) on the displayed image/video of the liquid medication vial or syringe. In some examples, the user can be required to transfer the liquid medications to another liquid container comprising such markings prior to visual recordation of the unused/leftover medications in the other liquid container by the camera(s).

In some embodiments, a user who intends to waste a medication (e.g., a covering removal device comprising a removed patch, a medication container comprising leftover pills or liquid medications, etc.) can be required to show the medication to one or more cameras of the medication management system 1205, in order to visually record the amount (e.g., volume) of the liquid medications (e.g., propofol) to be wasted into the liquid collector(s) 1364. In some cases, a liquid medication vial or the syringe can have markings for volumetric measurement of the liquid medications within. In some cases, the user can be required to transfer the liquid medications to another liquid container comprising such markings prior to visual recordation of the unused/leftover medications in the other liquid container by the camera(s). When the user is showing the medication to the camera(s), the GUI on the displays of the medication management system 1205 (e.g., the display(s) 1320 as shown in FIG. 3B) can show the image or video of the medication to the user in real-time. Additionally, the GUI can show a digital frame in virtual space (e.g., two-dimensional or three-dimensional virtual space) to guide the user to correctly position and/or orient the medication in real space. In some cases, correctly orienting the medication in real space and virtual space can ensure proper identification of the medication, medication containers, or covering removal devices (e.g., for a scanner of the medication management system 1205 scan an identifier of the medication, medication containers, or covering removal devices). In some cases, the GUI can alert the user (e.g., by changing the color of the digital frame from red to green, by displaying messages, etc.) to indicate that the medication is now in the correct position in real space and virtual space.

Figure 8A:
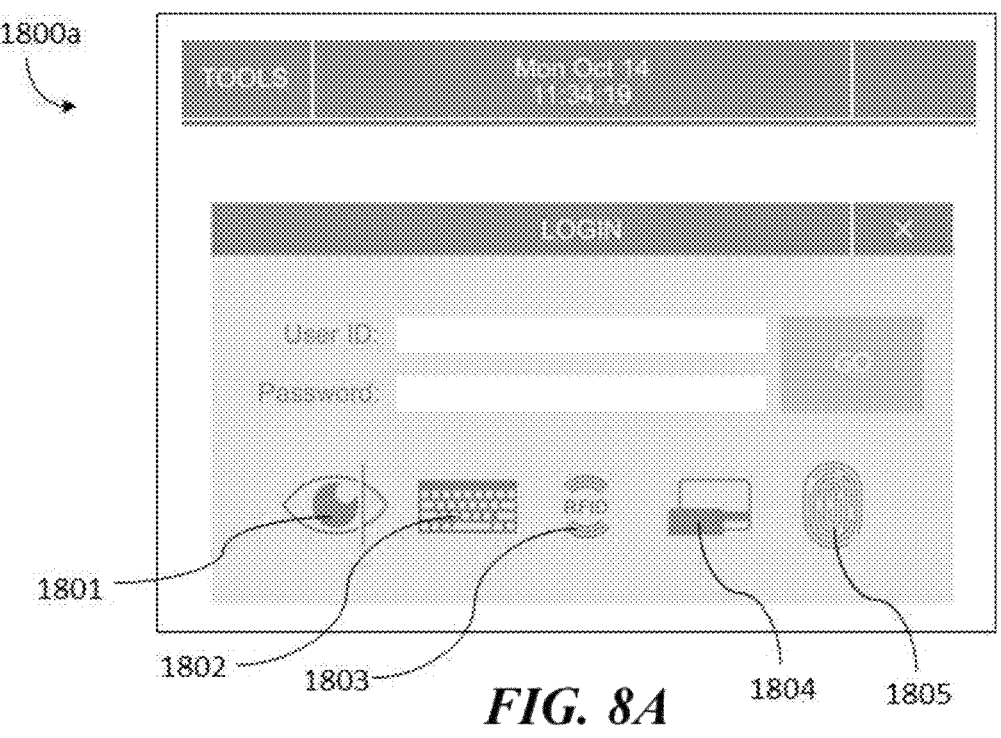
FIGS. 8A-8E schematically illustrate exemplary graphical user interfaces for the user to interact with a medication management system for medication wasting.

FIGS. 8A-8E shows examples of the GUI of the medication management system as disclosed herein. Referring to FIG. 8A, the GUI 1800*a* can allow a user (e.g., a nurse) to log in by one or more of various options. The user can log in via: (i) iris and/or retinal scanning 1801, (ii) typing in the user's identification (ID) and password 1802 (e.g., using a mechanical keyboard, a virtual keyboard on the GUI, or via voice activation); (iii) scanning the user's identifier tag comprising an RFID chip 1803; (iv) reading the user's identifier card 1804, and/or (v) fingerprint scanning 1805. In some cases, the user can log into the medication management system remotely from one or more user devices. The GUI of the medication management system can be provided on the user device(s) using one or more applications.

Figure 8B:
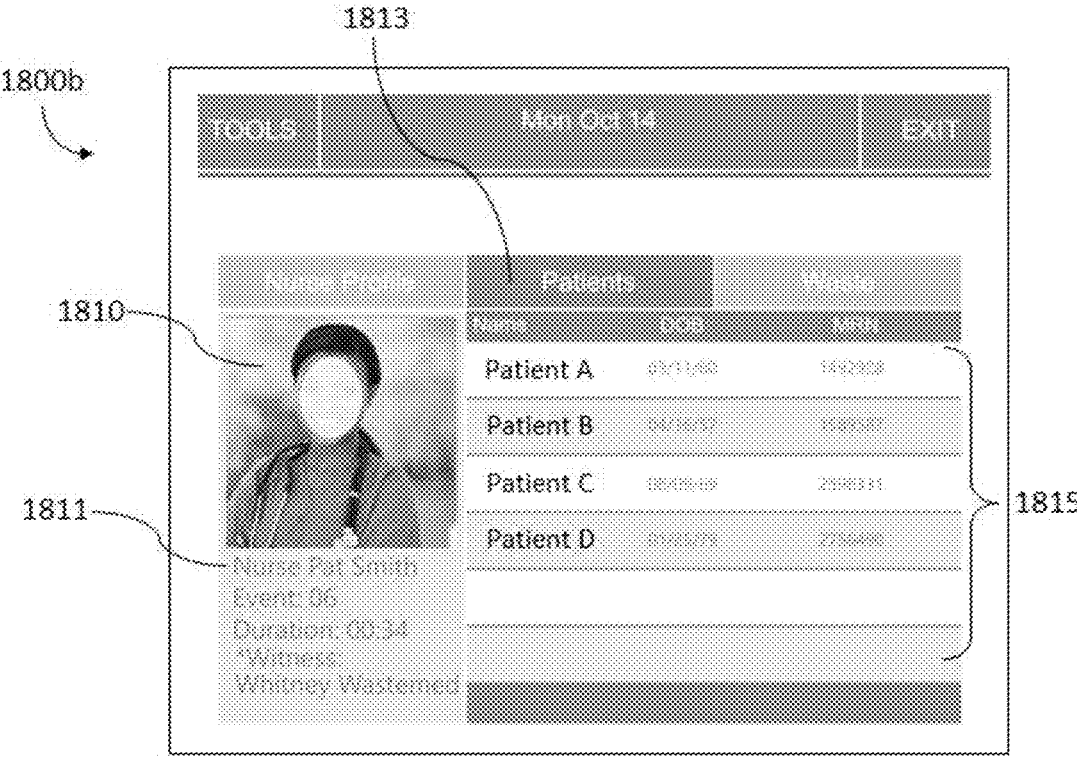

Referring to FIG. 8B, logging into the medication management system can direct the user to the GUI 1800*b*. The GUI 1800*b* can show the user's identity, such as the user's picture 1810 and the user's name 1811. The GUI 1800*b* can also show the duration of time the user has been logged into the system. Optionally, when a witness is still required for medication wasting, the GUI 1800*b* can show a designated witness for the user's medication wasting activities. The GUI 1800*b* can have a "Patients" panel for the user to select (e.g., by pressing on the GUI 1800*b*) in order to reveal a list of patients 1815 that the user is responsible for, along with patient information (e.g., date of birth (DOB), medical record number (URN), room number, bed number, unit or floor number, health conditions, known allergies, etc.). In the alternative, the patient list 1815 can include all the patients in the user's unit (or floor) in case healthcare providers on the user's unit help each other or work in collaboration to care for patients in the unit. In some cases, the GUI 1800*b* can allow the user to select a subset of patients as a personalized patient list.

Figure 8C:
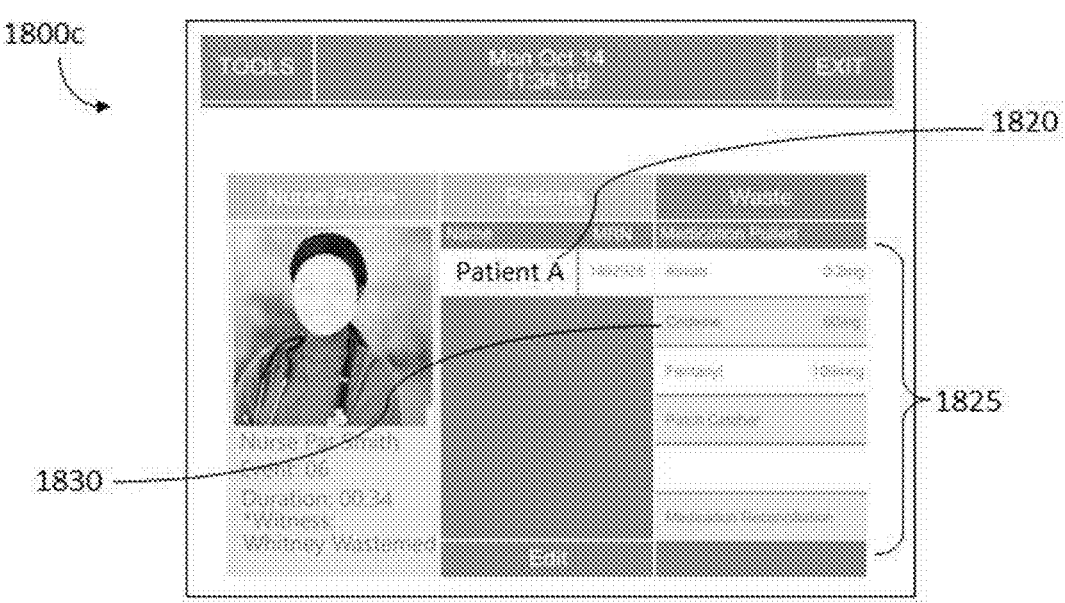

Referring to FIG. 8C, when the user selects a patient 1820 (e.g., by selecting the patient's name on the GUI 1800*b* as shown in FIG. 8B), the GUI 1800*c* can show a list of medications prescribed to the user 1825 (e.g., Ativan®, Codeine 1830, Fentanyl, etc.) and/or medication handling units (e.g., a covering removal device or a "Patch Catcher"). The list of medications can comprise the names and doses of the prescribed medications.

Figure 8D:
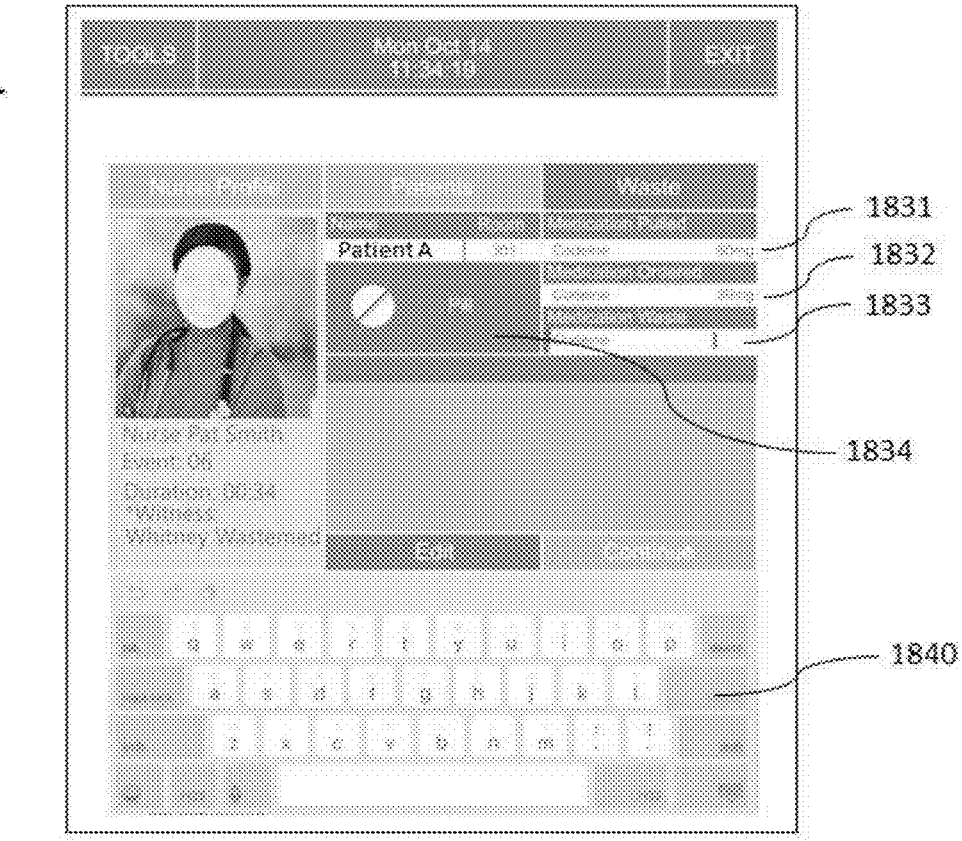

Referring to FIG. 8D, when the user selects a particular medication (e.g., Codeine 1830) from the list of medications 1825 on the GUI 1800*c*, the GUI 1800*d* can show additional details with regards to the selected medication. For example, when the user selects Codeine 1830, the GUI 1800*d* can show the form of medication (e.g., pill) 1834, a dose of Codeine that has been previously prescribed and retrieved 1831 for the patient ("pulled"), a dose of Codeine that has is now prescribed 1832 ("ordered"), and a total amount of Codeine that has been wasted thus far 1833 ("wasted"). In some cases, the GUI 1800*d* can show a virtual keyboard 1840 to allow the user to provide additional medication information about the patient to the patient's electronic profile. In some cases, voice recognition can be used by the user to provide additional medication information about the patient to the patient's electronic profile.

Figure 8E:
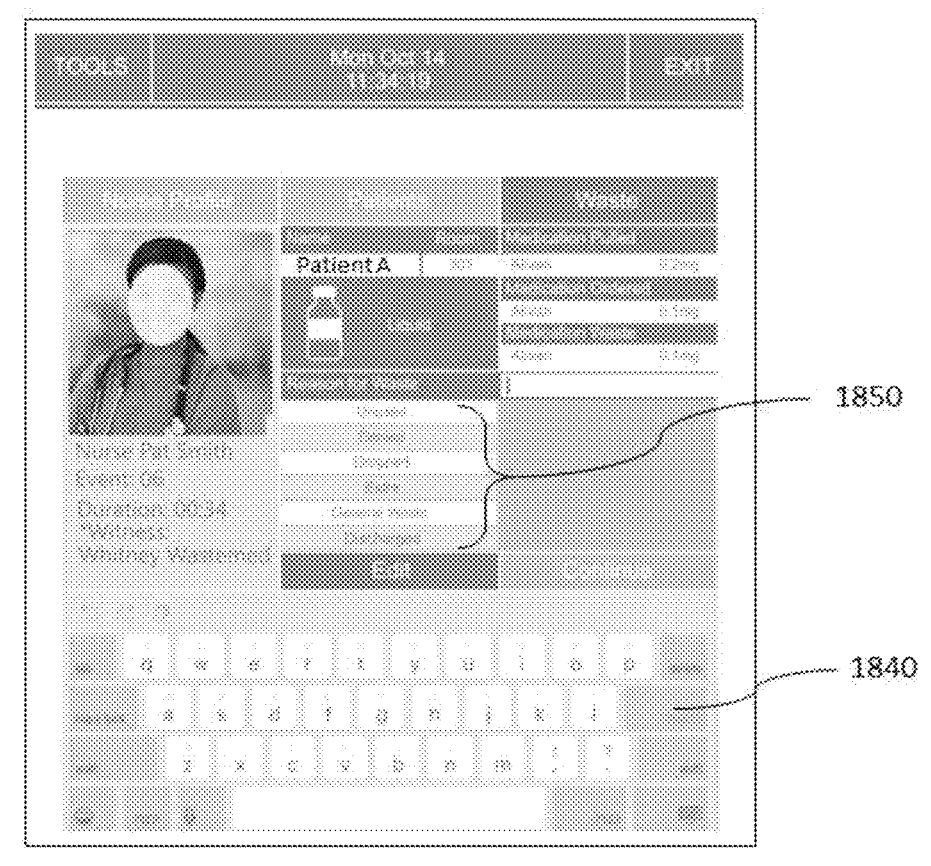

Referring to FIG. 8E, the GUI 1800*d* can show a list of reasons for medication wasting 1850 when the user is depositing unused/leftover medications for wasting. Examples of the reasons can include Unused, Denied, Dropped, Extra or Excess, General Waste, Discharged, Partial dose, Patient Refused, Changed Order, Removed Used Patch, Missing Patch, and Other (Enter Comment). The user can select (e.g., by pressing directly on the screen displaying the GUI 1800*d*) the reason from the list 1850. Alternatively, the user can use the virtual keyboard 1840 to manually type in the reason for wasting if the list 1850 is not sufficient.

II. Retail Medication Management
A. Introduction

Currently available disposal methods of medications (e.g., controlled substances, over-the-counter drugs, etc.) can include flushing down the toilet (e.g., for both pills and transdermal patches), discarding as trash (e.g., after mixing medicines with an unpalatable substance such as dirt, used coffee grounds, kitty litter, etc. and placing such mixture in a sealed container), depositing the medications and/or the medication containers in disposal bottles of designated take-back systems, and/or mailing back the unused medications to a designated collection address (e.g., in a designated mail-back envelope). However, such currently available disposal methods are marked by several shortcomings, such as, for example, safety issues, environmental issues, a lack of accountability, a lack of security, a lack of proof of non-diversion, a lack of control over the size and/or volume of material being deposited, and a lack of the ability to provide any feedback (e.g., medication utilization of a patient) to healthcare providers, pharmacies, and/or pharmaceutical companies.

Currently available, conventional medication take-back systems (e.g., MedReturn, MedSafe, etc.) are collection receptacles comprising a one-way medication drop chute that is connected to a secured (e.g., locked) internal storage unit. In some cases, a medication take-back system can receive partially administered and/or unused controlled substances and render them non-retrievable and unusable by applying a mechanical encapsulant (e.g., Cactus Smart Sink). The collection receptacles are typically made of high-strength materials (e.g., steel) to prevent unauthorized access, and is secured to a permanent structure and/or in a secure location (e.g., retail pharmacies, police and fire stations, and other supervised public locations) for additional safe-guard. When appropriate (e.g., periodically or when the storage unit is full, etc.), authorized personnel can safely remove the internal storage unit from the collection receptacles such that any collected medications in the internal storage unit may be disposed (e.g., incinerated in accordance with DEA regulations). The collected medications can be controlled, non-controlled, over-the-counter, etc.

The conventional medication take-back systems are limited to collection of unused and/or expired medications (e.g., in a medication bottle) alone, and lack the ability to validate the collected medications or quantify/estimate amounts of the collected medications. Existing medication take-back systems may have other deficiencies as well. For example, existing medication take-back systems are unable to determine (e.g., automatically without human intervention) who used the medications (e.g., whom the medications have been prescribed to) and/or who discarded the medications. As a result, in the cases for prescribed medications, existing medication take-back systems are incapable of determining a patient's medication compliance and/or utilization based on the amount of the unused or leftover medications that is returned to the collection receptacles. Additionally, existing medication take-back systems lack tangible incentives to encourage/promote users (patients) to return unused and/or expired medications. Furthermore, existing medication take-back systems can lack the ability to ensure on-site destruction of the returned medications, e.g., a closed-end disposal system.

In view of the foregoing, there exists a considerable need for alternative systems and methods to aid and/or encourage user (e.g., patients) to return any unused medications or empty bottles that have been used to prescribe the medications (e.g., by themselves for via proxy).

B. Smart Medication Collection Systems and Methods of Use

Smart medication collection systems for medication take-back, as provided herein, can be capable of addressing the above shortcomings of existing medication take-back systems. The smart medication collection systems can be capable of retrieving unused or leftover medications (or empty bottles), and one or more of the following: (i) tracking an identity of the user (e.g., the patient or proxy) who is dropping off the unused medications; (ii) tracking the time of medications drop-off, (iii) validating the returned medications; (iv) tracking a quantity of the returned medications for each patient; and (v) generating and/or updating a profile of the identified person with data generated from (i) through (iv). In some embodiments, the smart medication collection systems can ensure on-site destruction of the returned medications to allow retail stores (e.g., pharmacies) to dispose of the returned medications as garbage to be picked up by medication collection and disposal entities, e.g., Stericycle.

Medications that can be retrieved and/or analyzed by the smart medication collection systems can be any of the medications described herein. The smart medication collection systems and methods thereof may be compatible with any medication containers/packages described herein. The smart medication collection systems can comprise or be configured to utilize any aspect of the medication management systems and methods, as described herein (e.g., in Section I, Parts B and C of the Specification).

Such profile and data can be made available to a selected group of individuals and/or parties. In some cases, the selected group of individuals and/or entities (e.g., patients, prescribing healthcare providers, pharmacies, etc.) can be required to have authorization under Health Insurance Portability and Accountability Act of 1996 (HIPAA). Examples of the selected individuals and/or particles can include, but are not limited to, DEA, FDA, Institute for Safe Medication Practices (ISMP), insurance companies, etc.

The smart medication collection systems, as provided herein, can be located at a hospital, hospice, long-term acute care (LTAC) facility, nursing home, assisted living facility, pharmacy, in-pharmacy clinic, a healthcare provider's office (e.g., a doctor's office), clinic, post office, etc.

The smart medication collection systems, as provided herein, can help (i) prevent diversion of unused medications (e.g., oral medications, drug patches, etc.), (ii) prevent unintended and/or accidental exposure of unused medications to third parties (thus improve medication security), (iii) reward responsible medication usage and compliance (thus increase user accountability), and/or (iv) improve prescribing of medications by healthcare providers (e.g., physicians). Examples of an unused or leftover medications can include pills, tablets, powders, etc. that have not been taken (e.g., consumed, injected, etc.) by a subject, as well as any leftover medications that remain as part of in vivo devices or transdermal patches after their medical use.

In some cases, data generated by the smart medication collection system's tracking and/or validation can help generate a personalized medication utilization history that can be used (e.g., by the prescribing physicians) to improve and personalize future medication therapies for each user (e.g., for each patient). The data can be shared with each patient's physician, whereby a subsequent medication prescription can be adjusted based on the data of the patient's medication compliance and/or utilization. For example, when the data indicates leftover medications, the physician may prescribe less (e.g., a lower dosage) of the medication. In another example, when the data indicates no leftover medication, the physician may discuss with the patient to confirm that all of the previous prescription was taken by the patient alone and if more (e.g., a higher dosage) of the medication may be prescribed. In such cases, the physician may no longer need to rely on the patient's recollection of medication utilization (e.g., a number of pills taken, number of pills leftover, how often, and over what period of time) when prescribing the subsequent medication. Thus, the smart medication collection systems can help reduce or avoid a chance of overprescription and/or underprescription of medications.

A historical data from at least 1, 2, 3, 4, 5, 6, 7, 8, 9, 10, or more returns of the medications to the smart medication collection system may be used (e.g., by the physician(s)) to determine an appropriate dosage for a subsequent medication prescription. A historical data from at most 10, 9, 8, 7, 6, 5, 4, 3, 2, or return(s) of the medications to the smart medication collection system may be used (e.g., by the physician(s)) to determine an appropriate dosage for a subsequent medication prescription. In some cases, the historical data may comprise returns of the medications to the smart medication collection system during at least the past 1 day, 2 days, 3 days, 4 days, 5 days, 6 days, 1 weeks, 2 weeks, 3 weeks, 1 month, 2 months, 3 months, 4 months, 5 months, 6 months, 7 months, 8 months, 9 months, 10 months, 11 months, 1 year, 2 years, 3 years, 4 years, 5 years, 10 years, or more. In some cases, the historical data may comprise returns of the medications to the smart medication collection system during at most the past, 10 years, 5 years, 4 years, 3 years, 2 years, 1 year, 11 months, 10 months, 9 months, 8 months, 7 months, 6 months, 5 months, 4 months, 3 months, 2 months, 1 month, 3 weeks, 2 weeks, 1 week, 6 days, 5 days, 4 days, 3 days, 2 days, or 1 day.

The smart medication collection systems, as provided herein, can help reduce overprescription and/or underprescription on (i) a micro level and/or (ii) a macro level. On the micro level, as above-mentioned, the smart medication collection systems can collect and share a patient's historical data of medication utilization/compliance to a physician to help validate or update a subsequent medication prescription for the patient with respect to one or more previous medication prescriptions to the patient. On the macro level, the historical data of medication utilization/compliance collected by the smart medication collection systems may be that of a plurality of users (e.g., a plurality of patients using the same or different medications). The plurality of users may be characterized by one or more groups, including, for example, medication types, diseases, hospitals, geolocations (e.g., cities, states, countries, continents, etc.), gender, age, ethnicity, occupations, etc. The historical data on the macro level can be analyzed and applied to achieve one or more of the following: (i) determining a degree (e.g., percentage) of users that have been overprescribed and/or underprescribed in each group; (ii) determining an average degree (e.g., rate) of medication utilization and/or compliance of for the general population in each group; (iii) identifying one or more outliers (e.g., one or more users whose degree of medication utilization/compliance differs from other users of the same group); (iv) identifying a potential addiction or overdose crisis in each group; and (v) update a general (e.g., national) prescription guideline/recommendation for a medication, and generate tailored prescription guidelines/recommendations for the medication for one or more specific subgroups (e.g., age, gender, geolocation, etc.).

In an example, the smart medication collection systems may collect a historical data of utilization/compliance for a controlled pain medication (e.g., codeine, fentanyl, hydrocodone, morphine, etc.) from a plurality of users having a plurality of health conditions. Such historical data on the macro level may be analyzed to help identify (i) a first recommended dosage of the controlled pain medication specific for users having a first health condition, and (ii) a second recommended dosage for the controlled pain medication specific for users having a second health condition, wherein the first and second recommended dosages may be the same or different depending on the analysis.

The smart medication collection systems, as provided herein, can encourage the user (e.g., the patient) to comply with medication prescription (e.g., recommended dosage), which can in turn improve medication treatment outcomes, reduce overprescription, reduce healthcare costs, etc. In an example, the smart medication collection system can help determine that medication prescription should be reduced from 30 pills to 10 pills, given the same medication period. Thus, a co-pay for 30 pills, which the patient would be responsible for, would be reduced down to a co-pay of 10 pills. In another example, by reducing a probability of overprescription of controlled drugs, potential addictions and hospitalization due to improper third-party exposure can be reduced, thereby reducing the overall healthcare cost of the society.

The terms, "smart medication collection system," "smart collection system", "smart medication return system", or "smart return system" can be used interchangeably herein. In some cases, the smart medication collection system can be an improved version or incorporated into existing medication take-back systems (e.g., MedReturn, MedSafe, etc.), such as those found in pharmacies in North America (e.g., Canada, U.S.A.). The smart medication collection system can comprise one or more components that are lacking in the existing medication take-back systems, wherein the one or more components are configured to provide one or more additional functionalities that are lacking in the existing medication take-back systems, as above-mentioned. Examples of the one or more additional functionalities may include (i) tracking an identity of the user (e.g., the patient or proxy) who is dropping off the unused medications to the smart medication collection system; (ii) tracking the time of medications drop-off; (iii) validating the returned medications; (iv) tracking a quantity of the returned medications for each patient; and (v) generating and/or updating a profile of the identified person with data generated from (i) through (iv).

The smart medication collection system can be configured to execute one or more of the above-mentioned functionalities automatically without human intervention. The smart medication collection system can be configured to execute one or more of the above-mentioned functionalities when one or more medication containers (containing the same or different medications) are returned to the smart medication collection system. The smart medication collection system can be configured to execute one or more of the above-mentioned functionalities when one or more types of medications (e.g., at least 1, 2, 3, 4, 5, or more types of medications, at most 5, 4, 3, 2, or 1 type(s) of medications) are returned in a single medication container.

The smart medication collection system can be configured to collect and analyze medications for chronic and/or non-chronic health conditions (or diseases).

The smart medication collection system can be compatible with any medication bottle or container, as described herein. In some cases, the medication container can comprise a container and at least one cap (e.g., at least 1, 2, 3, 4, 5, or more caps; at most 5, 4, 3, 2, or 1 cap(s)). In some cases, the smart medication collection system can be configured to receive a unit dose packages (e.g., unit dose cups) or pill packages (i.e., pill packs).

In some cases, the term "unused medication" or "unused medications," can refer to one or more medications that is not used by a user. In an example, the unused medication can be a tablet, capsule, or pill that is not orally administered to a user (e.g., a patient). In some cases, the term "unused medication" or "unused medications," can refer to one or more medications that remains in one or more carriers of the medications after (or without) one or more uses of the carriers. In some examples, the carriers can comprise an inhaler, spray, or transdermal patch, and the unused medication can be any medication that remains in the carrier(s) when the carrier(s) are returned to the smart medication collection system, as provided herein. In an example, a transdermal patch may be applied to a patient and subsequently removed after a prescribed medication period (e.g., after three days on the skin of a patient). In such a case, any medications remaining inside the transdermal patch may be referred to as unused medications. Thus, the transdermal patch can be returned to the smart medication collection system to analyze presence and/or amount of unused medications within.

In some cases, the medication container can comprise a container and a single, individual cap. The container may be opened and sealed by the single, individual cap throughout the medication period and when returning the medication container (e.g., with or without any leftover medication) to the smart medication collection system. In some cases, the medication container can comprise a container and two caps, wherein the two caps are the same or different. In an example, a first cap may be used to open and seal the medication container during the medication period, and a second cap may be used in place of the first cap to seal (e.g., irreversibly seal) the medication container when returning the medication container to the smart medication collection system.

Figure 13:
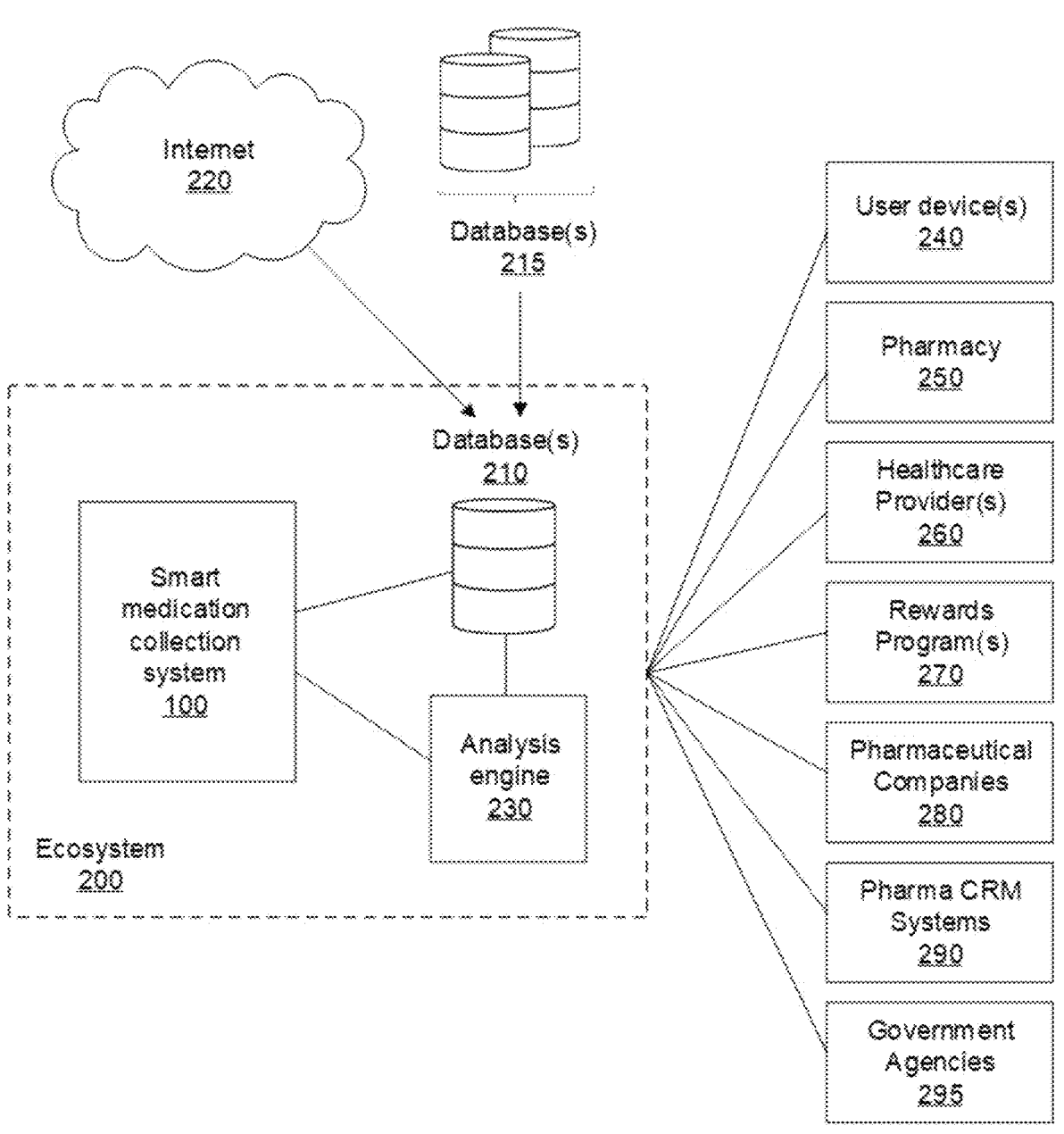
FIG. 13 schematically illustrates an exemplary ecosystem comprising a smart medication collection system.

The container can comprise one or more labels to display information (e.g., patient name, physician name and/or address, pharmacy name and/or address, drug name and/or dosage, drug warnings, date of prescription, etc.). The label can comprise one or more identifiers (e.g., MRC, such as a barcode or a communications device, as described herein. In some cases, the medication container may include the identifier, which can be scanned during (i) dispensing of the prescription medicine in the medication container to the user (e.g., the patient), and/or (ii) returning of the medication container to the smart medication collection system. In some examples, such identifier may be scanned, recorded, and tracked by a system (e.g., eMAR and/or CPOE). In some cases, the identifier of the medication container may be disposed on a surface of the container, the cap (e.g., one or more caps), or both FIG. 13 schematically illustrates an exemplary smart medication collection system 100 and its ecosystem 200. The ecosystem 200 comprises the smart medication collection system 100, one or more databases 210, and an analysis engine 230. One or more components of the ecosystem 200 can be in digital communication with one another. The smart medication collection system 100 can be in digital communication with the database(s) 210. The smart medication collection system 100 can be in digital communication with the analysis engine 230. The database(s) 210 can be in digital communication with the analysis engine 230. One or more components of the ecosystem 200 can be part of a same unit or different units. In some examples, the database(s) 210 and the analysis engine 230 can be part of the smart medication collection system 100, or separate from the smart medication collection system 100.

One or more components (e.g., the smart medication collection system 100, the database(s) 210, and/or the analysis engine 230) of the ecosystem 200 can be in digital communication with (1) one or more user devices 240 (e.g., a mobile device, smart watch, personal computer, etc.), (2) one or more pharmacies 250 or drug stores as sources of the medications, (3) one or more healthcare providers (e.g., physicians, nurse practitioners, nurses, healthcare insurance providers, etc.) 260 that recommend or prescribe the medications, (4) one or more reward programs 270 that would award the user of the smart medication collection system, (5) one or more pharmaceutical companies 280, (6) one or more pharmaceutical customer relationship management (CRM) systems 290 (e.g., IQVIA, Veeva, etc.), and/or (7) government agencies 295 (e.g., DEA, NLM, FDA, CDC, etc.).

In some cases, one or more existing CRM systems 290 can have real-time access to one or more pharmacies to track how often a drug by a pharmaceutical company is used to fill a patient's prescription. By using data from such tracking, the CRM systems 290 can provide analysis of how well the pharmaceutical company's drug is utilized within a hospital, region, county, city, state, etc., such that, for example, the pharmaceutical company can strategize how to maintain, alter, or improve marking of their product (the drug) to one or more healthcare systems or regions. However, the CRM systems 290 have limited data, as they fail to provide information on how much of the prescribed drug is actually used by the patient and/or how much of the prescribed drug is being returned (e.g., to the smart medication collection system) without being used.

The database(s) 210 can be configured to store any data obtained by the smart medication collection system 100 or any data generated by the analysis engine 230. Alternatively or in addition to, the data base(s) 210 can be in digital communication with one or more additional databases 215 (e.g., eMAR and/or CPOE, pharmacy databases, etc.) to retrieve any information regarding patients (e.g., name, address, medical records) and/or medications (e.g., prescription history, prescription medication details, such as, for example, name, active/inactive ingredients, forms/types, color, shape, weight, prescription period, etc.). The database(s) 215 can comprise external database(s) from pharmacies, pharmaceutical companies, government agencies, hospitals, etc. The database(s) 210 of the ecosystem 200 can be in digital communication with the internet 220, to obtain any additional data regarding a plurality of medications.

Alternatively or in addition to, the database(s) 210 of the ecosystem 200 can comprise or utilize a blockchain database, as provided herein. The blockchain database of the smart medication collection system, as provided herein, can store at least one or more measurements or analysis data generated by the smart medication collection system. The blockchain database, as provided herein, can be an alterable and secured P2P network among patients, prescribers, pharmacy, government agencies (e.g., FDA, DEA, etc.) to record and transfer data (e.g., medical history, prescription history, medication utilization and/or compliance analysis of a patient, date of prescription, date or return of unused medications, etc.). In comparison to a conventional, centralized database, the blockchain database can provide one or more advantages including, for example, transparency, safety, auditability, resistant to tampering, and accountability for (1) users (e.g., patients) and their proxies for returning medication containers with or without unused medications, (2)

physicians, (3) pharmacies, (4) government agencies, (5) registered reverse distributors for destruction of unused medications, (6) pharmaceutical companies that provide the medications to the market, and/or (7) CRM companies.

The analysis engine 230 can obtain (directly or indirectly) data comprising information about the user (e.g., the patient) and the medication being deposited in the medication container(s) 150. Examples of such data can include one or more electromagnetic spectroscopies (e.g., absorbance and/or reflectance of light), images, videos, and/or weight of the medication container(s) and/or any returned unused medications. The analysis engine 230 can be configured to use one or more algorithms to analyze the data to (i) track the user's (e.g., each patient's) utilization of and/or compliance to the medication (e.g., to the medication prescription), and/or (ii) provide a medication utilization history of the patient to the patient's physician to help personalize any future medication prescription for the user. The analysis engine 230 can be configured to provide progress or results of the analysis to the user via the user device 240 and/or the pharmacy 250. The analysis engine 230 can be configured to approve one or more rewards programs 270 for the user based on analysis of the returned medication container(s) 150.

The one or more algorithms utilized by the analysis engine 230 can NLP, a computer vision system, or a statistical model. The computer vision system can include AI, deep learning, or OCR capabilities.

Upon proper returning the medication container(s), with or without any unused medication, the user (e.g., customer, patient, proxy, etc.) can be provided with one or more rewards. The user may be notified of (i) progress and results on processing of the returned medication container(s), and/or (ii) the reward(s) provided to the user via a pharmacist, one or more devices at the pharmacy 250, and/or one or more user devices 240. In the alternative, when tampered (or damaged) medication container(s) or medications that are not associated with the returned medication container(s) are identified by the smart medication collection system 100, the user may be notified of the "incompliance" and remind/instruct them of proper process in returning the medication container(s). Thus, the smart medication collection system may encourage compliance to drug utilization and return of the medication container(s) (with or without unused medications) in order to get the rewards.

Figure 14A:
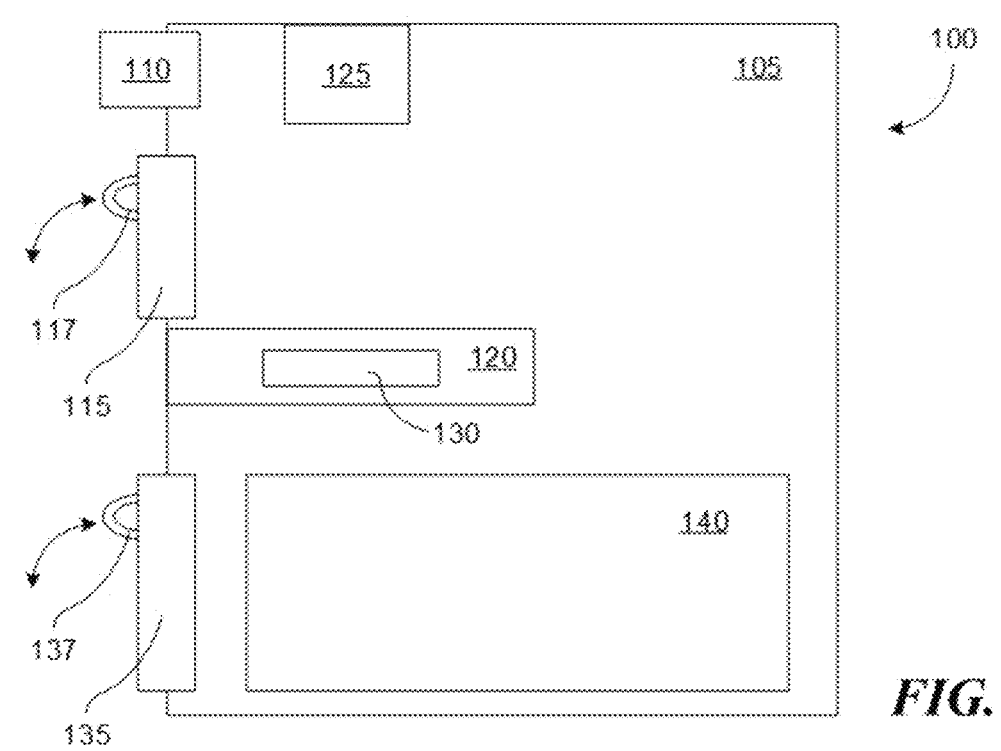
FIGS. 14A through 14E schematically illustrate cross-sectional side views of an exemplary smart medication collection system.

FIGS. 14A through 14E schematically illustrate cross-sectional side views of an exemplary smart medication collection system 100. Referring to FIG. 14A, the smart medication collection system 100 can comprise a housing 105. The housing 105 can comprise a user identification device 110 (e.g., a camera, a scanner, a sensor, etc.). The user identification device 110 can be configured to identify the user (e.g., the patient or the patient's proxy) who is dropping off one or more medication containers 150. The user identification device 110 can be in operative and digital communication with the housing 105. Alternatively or in addition to, the user identification device 110 can be part of the housing 105. The user identification device 110 can be on a surface (e.g., an outer surface) of the housing 105. The user identification device 110 can be fixed at a permanent position relative to the housing 105, or be movable (e.g., extendable via a stretchable or coiled chord, etc.) relative to the housing 105.

Examples of the user identification device 110 can comprise a facial recognition scanner, iris scanner, fingerprint scanner, voice recognition device, etc. Alternatively or in addition to, the user identifier can comprise at least one identifier reader, as above-mentioned, configured to scan an identifier tag specific to the user. The identifier tag of the user may comprise a MRC (e.g., a barcode) and/or an identification device (e.g., a RFID system) that is recognizable by the at least one identifier reader. Examples of the identifier tag can comprise the user's (e.g., the patient's) driver's license, passport, insurance card, retail store card, pharmacy card, keychain tag, key fob, wristband, etc.

The housing 105 of the smart medication collection system 100 can comprise at least 1, 2, 3, 4, 5, 6, 7, 8, 9, 10, or more of the user identification device 110 configured to operate individually and/or in unison. The housing of the smart medication collection system 100 can comprise at most 10, 9, 8, 7, 6, 5, 4, 3, 2, or 1 of the user identification device 110 configured to operate individually and/or in unison.

In some cases, the user identification device 110 can be configured to scan a plurality of users, and identify each user based on the scanning. The identifying can comprise retrieving (e.g., automatically retrieving) a profile of each of the plurality of users from the database(s) 200 in operative and digital communication with the user identification device 110 (and one or more additional components of the housing 105, as provided herein).

In some cases, the user identification device 100 (e.g., a camera) can be configured to take and save one or more images and/or videos of the user while using the smart medication collection system 100 for security and accountability purposes.

In some cases, the housing 105 can comprise a display to allow the user to interact with the smart medication collection system 100 via a GUI. The GUI of the display of the housing 105 can display confirmed identity of the user. The GUI of the display can, at least, (i) allow the user to select which of a list of medications associated with the user is being returned, (ii) allow the user to provide a signature for accountability (e.g., a touch screen GUI), (iii) provide instructions on how to use the smart medication collection system 100, (iv) provide one or more results from the analyses of the returned medication by the smart medication collection system 100 and/or the analysis engine 230 of the ecosystem 200, (v) provide one or more options of rewards award to the user, (vi) provide a reminder and details on a subsequent medication/container to pick up, (v) provide a remaining number of refills for one or more prescription medications, and/or (vii) alert the user if the information on the medication container does not match the identified medication deposited. In some cases, the housing 105 can comprise a physical keyboard for the user to interact with (e.g., instruct, provide information to, etc.) the smart medication collection system. In some cases, the smart medication collection system can comprise one or more sensors (e.g., microphones) to allow voice transmission to and/or activation of the smart medication collection system by the user.

The housing 105 can comprise a first door 115 coupled to a platform 120 (i.e., a receiving platform). The first door 115 can be configured to open and close. The first door 115 may comprise a lock that is configured to open only upon confirming identification of the user by the user identification device. Alternatively, the first door 115 may not comprise a lock. The first door 115 can be configured to expose and hide the platform 120 inside the housing 105. The first door 115 may comprise a first handle 116. The platform 120 may be part of a first container. The platform 120 may be an open platform without any wall. The first door 115 and/or the platform 120 may be operated by an actuator (e.g., linear, pneumatic, hydraulic, etc.). In some cases, the first door 115 may be omitted, in which case the platform 120 may be configured to move (e.g., slide in and out) relative to the housing 105 to receive one or more medication containers and transfer the received medication container(s) relative to the housing 105.

The platform 120 can be configured to hold one or more medication containers 150 (e.g., at least 1, 2, 3, 4, 5, 6, 7, 8, 9, 10, or more medication containers, at most 10, 9, 8, 7, 6, 5, 4, 3, 2, or 1 medication container(s)).

Figure 14B:
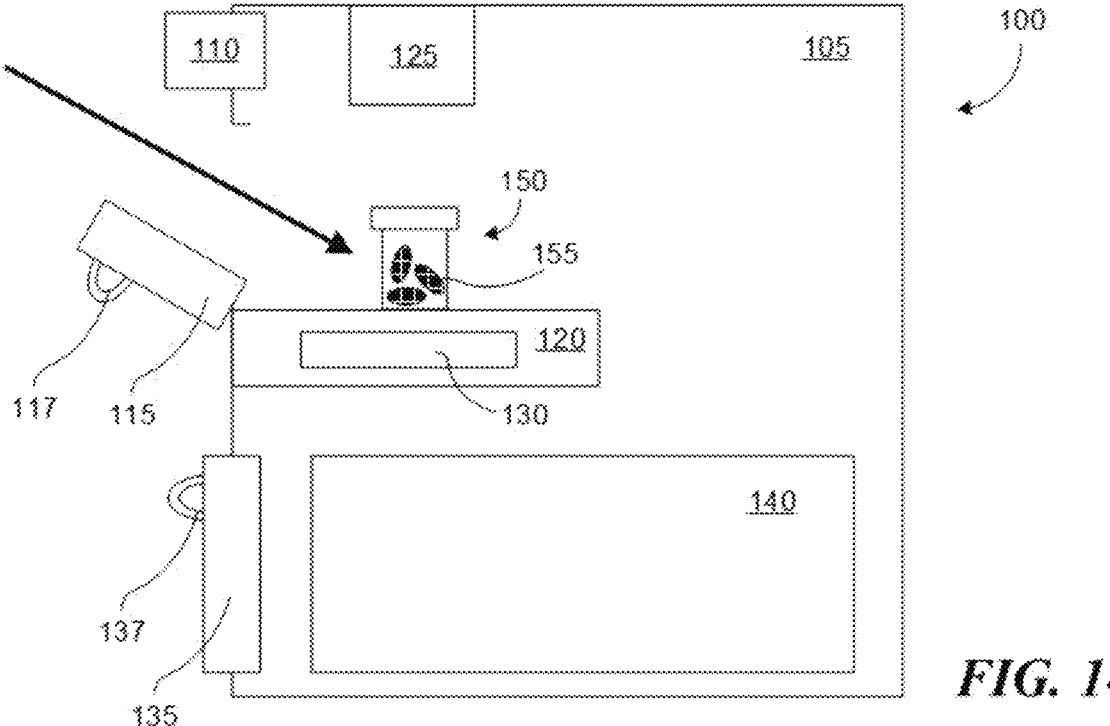

Referring to FIG. 14B, the user may open the first door 115, gain access to the platform 120, deposit (drop-off) the medication container(s) 150 on the platform 120, and close the first door 115. The medication container(s) 150 may or may not contain any medications 155. The first door 115 and the platform 120 can be configured such that upon closure of the first door 115, the user can no longer have any access to the deposited medication container(s) 150, e.g., even when the user re-opens the first door 105. A surface of the platform 120 can be partially or entirely smooth, knurled, or serrated to adjust contact surface area and/or frictional force between the platform 120 and the deposited medication container(s) 150.

In some cases, the user may be allowed to open the first door 105 upon confirmation of the identity of the user by the user identification device 110.

Figure 14C:
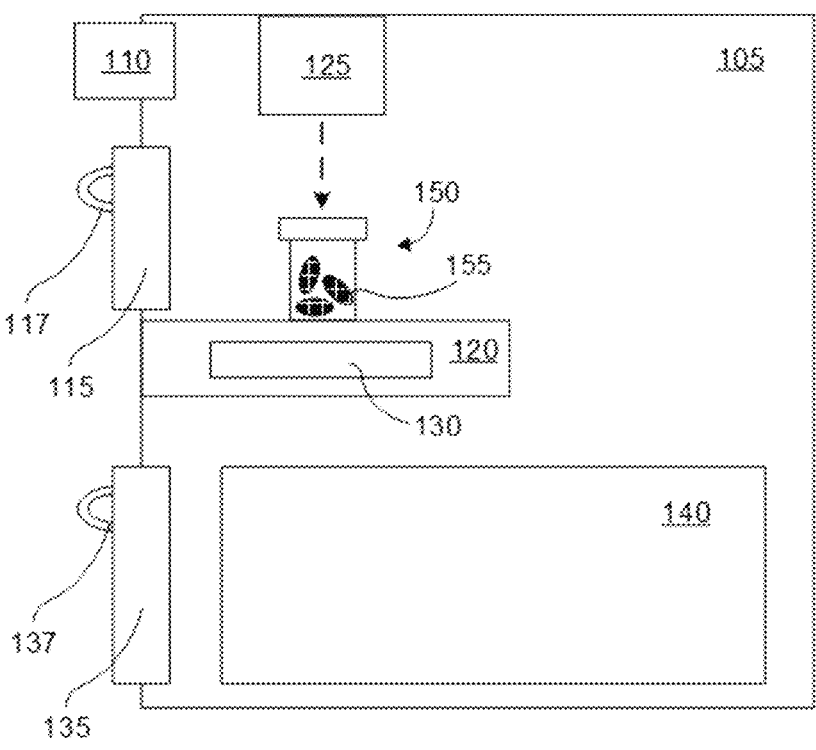

Referring to FIG. 14C, the housing 105 can comprise a medication container identifier 125. The medication container identifier 125 can comprise at least one identifier reader (e.g., at least 1, 2, 3, 4, 5, or more identifier reader, at most 5, 4, 3, 2, or 1 identifier reader(s)), as above-mentioned, configured to scan an identifier of the medication container(s) 150 that is being deposited to the smart medication collection system 100. The medication container identifier 125 can be in digital communication with the database(s). The medication container identifier 125 can be configured to scan the identifier of the medication container(s) 150 and retrieve data comprising information about the particular medication (e.g., medication prescription details, instructions) and/or the user (e.g., patient history, proxy identification, pharmacy/physician of the patient, etc.).

The identifier of the medication container(s) 150 may be disposed on a surface of a cap of the medication container(s) 150, on a container of the medication container(s) 150, or both. At least a portion of the cap and/or the container of the medication container(s) 150 can be opaque, transparent, or semitransparent. In some cases, the least the portion of the cap and/or the container of the medication container(s) 150 may be transparent or semitransparent to allow visualization (e.g., by human eye or a sensor) of the contents, such as any leftover medications, inside the medication container(s) 150.

The medication container identifier 125 can be disposed on or adjacent to an outer surface of the housing 105. As such, the user can scan the medication container(s) 150 prior to opening the first door 115 to deposit the medication container(s) 150. Alternatively or in addition to, the medication container identifier 125 can be disposed inside the housing 105. The medication container identifier 125 that is disposed inside the housing 105 can be visible or invisible to the user. The medication container identifier 125 can be operatively coupled to the first door 115 and the platform 120. In some cases, the user may open the door 115, use the medication container identifier 125 to scan the identifier on the medication container(s) 150, and place/deposit the medication container(s) 150 to the platform 120. In some cases, the user may open the door 115, place/deposit the medication container(s) 150 to the platform 120, and subsequently, the medication container identifier 125 may scan (e.g., automatically scan) the identifier on the medication container(s) 150.

The medication container identifier 125 can utilize any sensing features or devices described in the present disclosure (e.g., those of the medication sensor(s) 1370 of the medication management system 1205, as shown in FIG. 3B). In some cases, the medication container identifier 125 can comprise a sensor (e.g., a camera) that is disposed inside the housing 105. When the deposited medication container(s) 150 is deposited to the housing 105 (e.g., on the platform 120), the sensor can be top facing, side facing, and/or bottom facing with respect to the deposited medication container(s) 150. As such, the sensor can be configured to scan from top, side(s), and/or bottom of the medication container(s) 150. In some cases, the platform can comprise a rotating carousel that is configured to spin the medication container(s) 150 about 360 degrees (counterclockwise and/or clockwise). The rotating carousel may be coupled to an actuator (e.g., a rotary actuator) that is configured to direct the rotating carousel to rotate. The user may deposit the medication container(s) 150 on the rotating carousel. In some examples, as the rotating carousel spins, the medications (e.g., pills) inside the medication container(s) 150 can move and spread out (e.g., due to centrifugal force from the spinning), thus revealing medications that were hidden by or between other medications to be detected by the sensor. Alternatively or in addition to, the sensor can be configured to visualize the contents of the medication container(s) 150 as the medication container(s) 150 is rotated by the rotating carousel, thereby to obtaining a more accurate representation (e.g., a three-dimensional representation) of the contents inside relative to without such spinning.

The rotating carousel may be configured to rotate at least about 10 degrees, 20 degrees, 30 degrees, 60 degrees, 90 degrees, 120 degrees, 150 degrees, 180 degrees, 210 degrees, 240 degrees, 270 degrees, 300 degrees, 330 degrees, 360 degrees, 540 degrees, 720 degrees, or more. The rotating carousel may be configured to rotate at most about 720 degrees, 540 degrees, 360 degrees, 330 degrees, 300 degrees, 270 degrees, 240 degrees, 210 degrees, 180 degrees, 150 degrees, 120 degrees, 90 degrees, 60 degrees, 30 degrees, 20 degrees, 10 degrees, or less.

In some cases, the platform 120 can comprise a platform sensor 130 (e.g., a digital scale) configured to measure weight of (i) the medication container(s) 150 with unused medications, (ii) the medication container(s) 150 without unused medications, and/or (iii) any unused medications (e.g., pills, patches, etc.) alone without the medication container(s) 150. The platform sensor 130 can be configured to send any data generated to the database(s) 210 and/or the analysis engine 230 of the ecosystem 200.

In some cases, the platform sensor 130 can measure a weight of the medication container(s) 150 and send the data to the database(s) 210 and the analysis engine 230. The analysis engine 230 can obtain a weight of the medication container(s) 150 when empty based on the identified prescription details (e.g., from scanning the identifier of the medication container(s) 150). By comparing the weight of the empty medication container(s) 150 and the weight of the medication container(s) 150 measured by the platform sensor 130, the analysis engine can determine a presence or absence of unused medications deposited and their quantification (see Equations 1 through 3). Additionally, the analysis engine 230 can further obtain the number of medications initially prescribed and a weight of each of the medications, and use the results from the above-mentioned comparison to determine a number of unused medications deposited, percentage of deposited medications relative to a total number of medications prescribed, a medication utilization/compliance rate, etc.

$$\text{weight}_{med\ container, deposited} - \text{weight}_{med\ container, empty} = U \quad \text{(Equation 1)}$$

According to Equation 1, U may indicate a medication utilization value, wherein U=0 may indicate no unused medications deposited, wherein U>0 may indicate a presence of unused medications deposited, and wherein U<0 may prompt (i) the platform sensor 130 to re-measure the deposited medication container(s) one or more times, and/or (i) the analysis engine 230 to confirm the empty weight of the medication container(s) 150 based on information found in the database(s) 210, the database(s) 215, and/or the internet 220.

$$\frac{U}{\text{weight}_{medication\ per\ unit}} = N \quad \text{(Equation 2)}$$

According to Equation 2, N may indicate a number of unused medications deposited to the smart medication collection system 100, wherein the weight of a single unit (or count) of medication can be obtained by the analysis engine 230 from the database(s) 210, the database(s) 215 (e.g., a database of NLM, FDA, etc.), and/or the internet 220.

$$\left(1 - \frac{N}{\text{number}_{initial\ medications}}\right) \cdot 100 = R \quad \text{(Equation 3)}$$

According to Equation 3, R may indicate a medication utilization percentage (%), wherein R=100% may indicate that all of the initially contained or prescribed medications in the medications container(s) 150 are utilized, wherein R<100% may indicate that not all of the initially contained or prescribed medications are utilized, and wherein R=0% may indicate that none of the initially contained or prescribed medications is utilized. In an example, when 30 pills are prescribed and 27 pills are determined (e.g., by the smart medication collection system 100) to have been returned, the pill utilization may be 10%.

In some cases, the smart medication collection system 100 can be configured to open the deposited medication container(s) 150 and dispose any unused medications from the medication container(s) 150 to the platform 120, on or adjacent to the platform sensor 130. The platform sensor 130 can be configured to measure a weight of the unused medications, if any, send the data to the database(s) 210 and the analysis engine 230 for tracking and analysis, as provided herein. In such a case, the weight of the unused medications measured by the platform sensor 130 can be used as the medication utilization value U for further analyses in Equations 2 and 3.

The user may (or may be required to) return unused medications in the original medication container(s) that the unused medications came with (e.g., prescribed with). In other words, the user may (or may be required to) not mix one type of medication into a medication container of another medication of a different type or different prescription.

In some cases, a plurality of types of medications can be returned/deposited in a single medication container. In such a case, subsequent to the transfer of the unused medications to the platform 120, the platform 120 can be configured to (i) sort out (e.g., by vibration and/or mechanical sorting) the unused medications by brand, size, shape, density, and/or weight, and (ii) analyze medication utilization for each individual type of medication and for the entire collection of medications.

In some cases, the sensor of the medication container identifier 125 or a different sensor disposed inside the housing 105 of the smart medication collection system 100 can be configured to capture one or more electromagnetic spectroscopies (e.g., absorbance and/or reflectance of light), images, and/or videos of any unused medications disposed inside the medication container(s) 150. Such sensor can "visualize" through the cap or the container of the medication container(s) 150 to obtain the spectroscopies, images, and/or videos. Alternatively or in addition to, the contents of the medication container(s) 150 can be transferred from the medication container(s) 150 to the platform 120, wherein such sensor can "visualize" the contents. Subsequently, the analysis engine can use one or more algorithms to use the data to estimate a number of medications returned. In such a case, the estimated number of medications returned can be used as the value N for further analysis in Equation 3.

Alternatively or in addition to, a different scoring system (e.g., based on a numeric, alphabetic, or symbolic system) may be utilized by the analysis engine to evaluate at least the medication utilization and/or compliance. An exemplary scoring system may comprise one or more algorithms and/or mathematical formulas that utilizes one or more of the following factors: (1) patient information (e.g., age, gender, ethnicity, occupation, geolocation, marital status, etc.); (2) date of prescription and date of return of the medications and/or the medication containers; (3) type (e.g., pills, powder, gels, patches, etc.) of medication returned; (4) a number of medications (e.g., a number of pills) returned; (5) a percentage of prescribed medications that are returned; (6) a history of medication return of the patient (e.g., details and results of one or more previous returns of the same patient, wherein the returns are of the same or different medications, etc.), and (7) a number of different types of medications are being returned by the patient. In some cases, the resulting score that is derived by the ecosystem 200 comprising the smart medication collection system 100 may be a reflection of medication utilization and/or the medication prescription (or instruction) compliance. The resulting score may be transferred to the physician of the patient. The score can comprise a probability of likelihood of diversion of the medication by the patient. The score can comprise a probability of likelihood of the prescription medication being overprescribed and/or underprescribed. The score can comprise a degree of compliance of the patient in terms of taking one or more additional medications. Thus, the score can be an indicator for a drug-specific and patient-specific medication utilization and/or compliance. In some cases, the physician(s) may discuss the score and its relevant data with the patient to obtain additional data or confirm the score.

In some cases, a plurality of types of medications can be returned in a single medication container. In such a case, the algorithm(s) of the analysis engine can (i) analyze spectroscopies, images, and/or videos data, (ii) digitally sort out the unused medications by size, shape, and/or color, and (iii) analyze medication utilization for each individual type of medication and for the entire collection of medications.

Figure 14D:
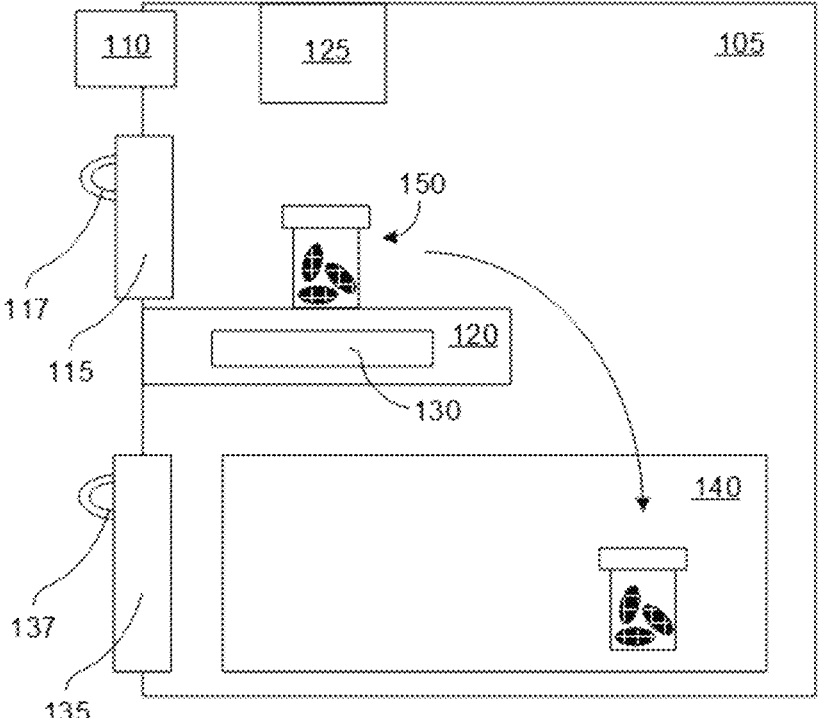

Referring to FIG. 14D, the housing 105 can be configured to transfer the unused medications and/or the medication container(s) 150 from the platform 120 to the storage unit 140. The platform 120 can be part of a one-way medication drop chute that drops the medication container(s) 150 to a storage unit 140 upon a trigger (e.g., after a predetermined time point, after the closure of the first door 105, etc.). Alternatively or in addition to, the housing 105 can comprise one or more transferring units (e.g., translating and/or rotating actuators, belts, etc.) configured to transfer the medication container(s) 150 from the platform 120 to the storage unit 140. Thus, the transferring unit(s) can be operatively coupled to the platform 120 and/or the storage unit 140.

Figure 14E:
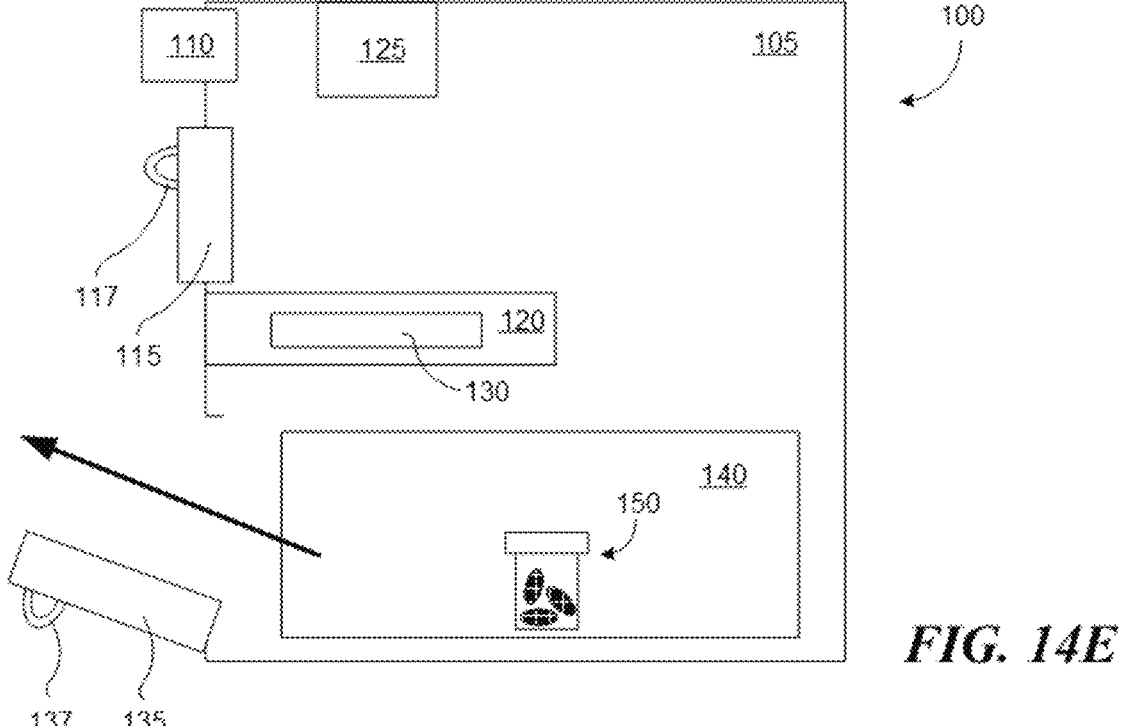

Referring to FIG. 14E, the storage unit 140 can be a removable storage unit. The housing 105 can comprise a second door 135 comprising a second handle 137, wherein the second door 135 is disposed adjacent to the storage unit 140. The second door 135 can comprise one or more locks. The lock(s) can be configured to require a key (e.g., a mechanical key, a digital key, etc.) to be unlocked to allow the second door 135 to be opened. An authorized personnel (e.g., a pharmacist, a medical disposal professional, government employee, etc.) can bring or activate such key to open the second door 135, thereby creating an orifice to remove the storage unit 140 out of the housing 105 or a collection bag inside the storage unit 140 that comprises the deposited medications and/or medication container(s) 150 for appropriate disposal (e.g., incineration). The second door 135 may be operated by an actuator (e.g., linear, pneumatic, hydraulic, etc.).

The user (e.g., patients, pharmacy customers, etc.) can return any unused medications in the same medication container(s) that the medications were dispensed in into the smart medication collection system. The medication container(s) can be returned with an original cap of the medication container(s) or a different, specialized cap. The specialized cap may be compatible with the smart medication collection system. In some cases, the specialized cap may lock (e.g., irreversibly lock) the medication container(s) to prevent any further access or tampering to any unused medications inside the medication container(s). In some cases, the specialized cap may be transparent or semitransparent to one or more sensing mechanism (e.g., the medication container identifier 125 or its sensor) of the smart medication collection system to allow analysis of any unused medications in the medication container(s). In some cases, the specialized cap can have a specialized identifier that is not found in the original cap of the medication container(s), and the specialized identifier of the specialized cap may help track return of the medication container(s) by the user.

In some cases, the housing 105 can comprise a neutralizer (e.g., chemical decontaminants, drug antagonists, mechanical encapsulant, etc.) to deactivate any unused and/or residual medications (e.g., drugs, pills, gels, powder, transdermal patches, liquid, etc.). Once the any unused and/or residual medications are analyzed (e.g., by the medication container identifier 125 or any different/additional sensor operatively coupled to the housing 105), the neutralizer may be applied to the unused and/or residual medications by way of a solid, liquid, gel, vapor and/or gas medium. Examples of the neutralizer are provided in the present disclosure. The unused and/or residual medications may be inside or outside the medication container(s) (e.g., the medication container(s) 150) when deactivated by the neutralizer.

The housing may have at least 1, 2, 3, 4, 5, or more neutralizers. The housing may have at most 5, 4, 3, 2, or 1 neutralizer. The at least one neutralizer may be disposed within the housing. The at least one neutralizer may be a part of the platform (e.g., the platform 120) configured to receive the medication container(s). The at least one neutralizer may be a part of the storage unit (e.g., the storage unit 140)

configured to receive the medication container(s). The at least one neutralizer may be on a top and/or side inner surface of the housing and in operative communication with (i) the platform and/or (ii) the storage unit.

Figure 15:
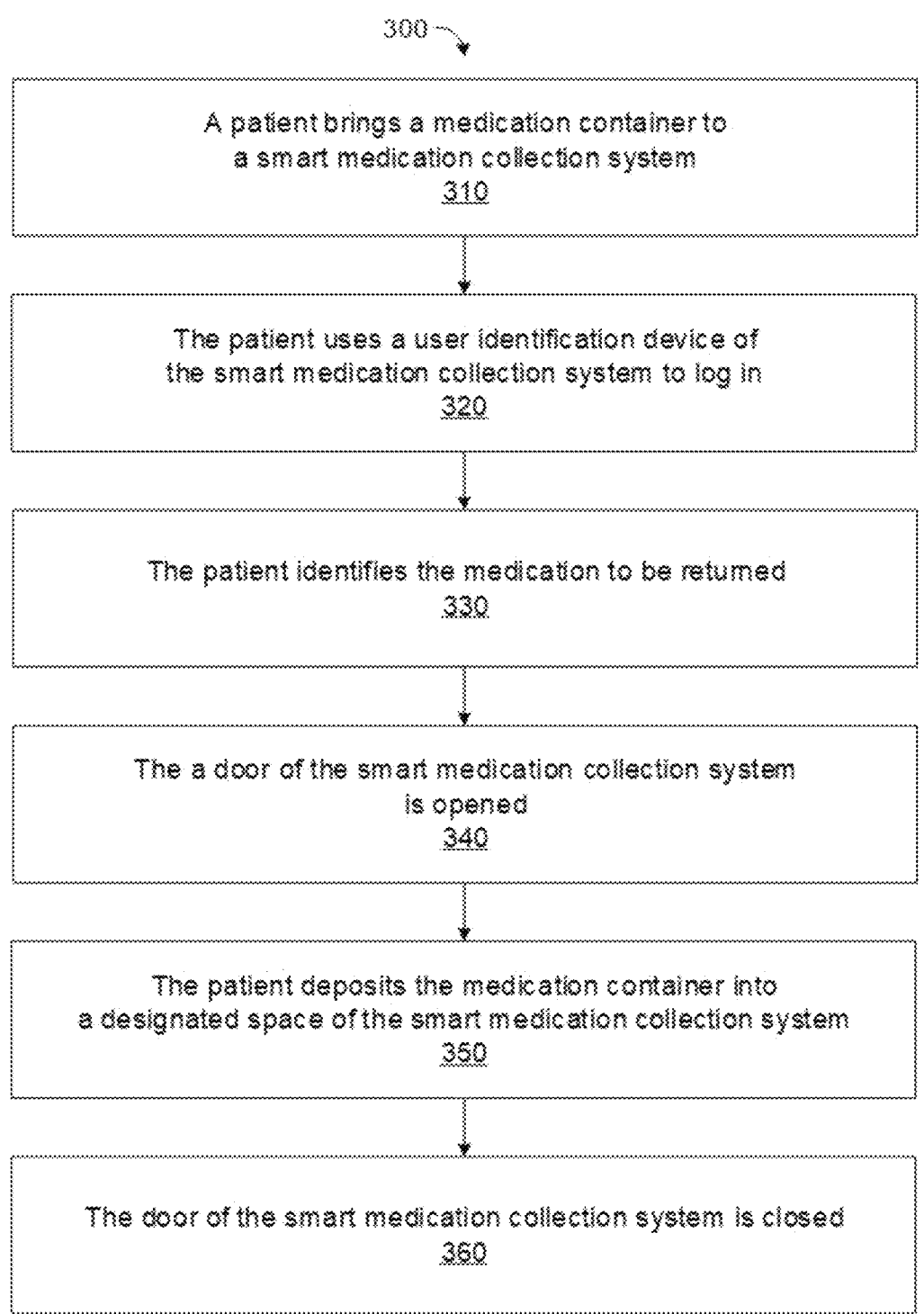
FIG. 15 illustrates an exemplary flowchart of a method for returning a medication container to a smart medication collection system.

FIG. 15 illustrates an exemplary flowchart 300 of a method for returning a medication container to the smart medication collection system provided herein. A patient is an exemplary user of the smart medication collection system, and thus the exemplary flowchart 300 can be applicable to, at least, (i) a user returning a generic medication/container, (ii) a proxy returning a generic medication/container associated with a different user, (iii) a patient returning a prescription medication/container, (iv) a proxy returning a prescription medication/container associated with a different patient, and/or (v) a pharmacy returning expired medication/container, comprising controlled and/or non-controlled medications.

Referring to FIG. 15, a patient brings a medication container to a smart medication collection system (step 310). The medication container may or may not include unused medications. The medication container may be the original medication container that the patient was prescribed with (e.g., by a pharmacist). The smart medication collection system may be located at the same or a different pharmacy that the patient received the prescription medication from. The medication container may be sealed by its original cap or by a specialized cap as provided herein in the present disclosure.

Subsequently, the patient uses a user identification device of the smart medication collection system to log in (step 320). Logging in via the user identification device and/or a GUI of a display of the smart medication collection system, as provided herein, may be required to use the smart medication collection system. In some cases, a proxy may return a medication/container. The proxy may need to be pre-approved by the patient and/or the pharmacist. The proxy may need to log in by using the user identification device, and the smart medication collection system may need to confirm that the identified proxy is associated with a particular patient before allowing usage of the smart medication collection system. Alternatively or in addition to, the proxy may log in and select or input an identification of the patient whose medication/container is being returned.

Subsequently, the patient identifies the medication to be returned (step 330). This step can provide further security and accountability in the medication/container returning process. The GUI of the smart medication collection system may display one or more medications that are prescribed to the patient, and the patient may select which one of the listed medication(s) is being returned. The patient may return more than one medication containers. In such a case, the patient may repeat the steps of the flowchart 300 as many times as the number of the medication containers. Alternatively or in addition to, the patient may provide a sequential list of medication containers to be returned via the GUI of the smart medication collection system. In some cases, the patient's user device (e.g., a mobile device) may be in digital communication (e.g., via Bluetooth, NFC, WiFi, etc.) with the smart medication collection system. The patient may determine the medication to be returned via the GUI of the user device.

Subsequently, a door of the smart medication collection system is opened (step 340). The door can be opened manually by the patient (e.g., by holding and pulling on a handle of the door). Alternatively or in addition to, the patient may instruct the door to be opened via the GUI of the smart medication collection system and/or a button disposed adjacent to the door to be opened.

Subsequently, the patient deposits the medication container into a designated space of the smart medication collection system (step 350). The designated space may be a platform (e.g., a slot) disposed adjacent to or coupled to the door. The designated space may comprise a sign (e.g., "Deposit Here") to guide the patient in depositing the medication container.

Subsequently, the door of the smart medication collection system is closed (step 360). The door can be closed manually by the patient (e.g., by holding and pulling on a handle of the door). Alternatively or in addition to, the patient may instruct the door to be closed via the GUI of the smart medication collection system and/or a button disposed adjacent to the door. In a different alternative or addition, the door may be programmed to close automatically after a predetermined period of time.

Following, the patient may or may not receive a notification (e.g., via the GUI of the smart medication collection system or the user device) that the returned medication container is being validated and/or analyzed. After the smart medication collection system validates the medication container and/or its contents (e.g., unused medications inside the medication container), the patient may receive a notification (e.g., via the GUI of the smart medication collection system or the user device) that one or more rewards (e.g., monetary credits to be used for refill or other medications) have been awarded to the patient. In some cases, the smart medication collection system can be configured to prevent serial returns of portions of the same medication (or different medications), e.g., to receive or "stack" multiple financial rewards. In an example, when a user has a bottle of 30 pills, the user may not be allowed to return 3 pills on 10 different occasions (e.g., on the same day or different days) to receive 10 separate rewards. The smart medication collection system can be configured to determine (e.g., based on prescription medication records of the user) the user's return patterns or intentions. The smart medication collection system can utilize one or more algorithms (e.g., machine learning algorithms) for this process. In some cases, the smart medication collection system can allow any user to return unused/leftover medications even when the user is not eligible to receive any rewards. In some cases, the smart medication collection system can be configured to offer different amounts, levels, or tiers of the rewards based on the amount of information (e.g., personal information, such as real name, phone number, e-mail address, age, gender, insurance provider's information, etc.) provided by the user to the smart medication collection system. For example, providing a greater amount of information can yield a greater reward. In another example, a separate reward can be provided for anonymous returns of certain medications (e.g., dangerous and/or addictive medications). In some cases, the reward(s) can be a financial reward, e.g., cash, co-payment reductions, gift cards, airline miles, lottery tickets, user-directed donations to charitable causes (e.g., local, regional, and/or national charities), etc. In some embodiments, healthcare workers (e.g., nurses, doctors, etc.) can be incentivized for encourage patients to use the smart medication collection system. In some cases, when a patient is given medication-related information (e.g., written descriptions of the medications, dosing, follow-up instructions, etc.), a nurse can provide the patient with a scannable code (e.g., a physical scannable code, a virtual scannable code via e-mail or text messaging, etc.). The scannable code can be configured to link the patient's prescription and its return to the smart medication collection system back to the nurse to provide the nurse with one or more incentives, as described herein.

Figure 16:
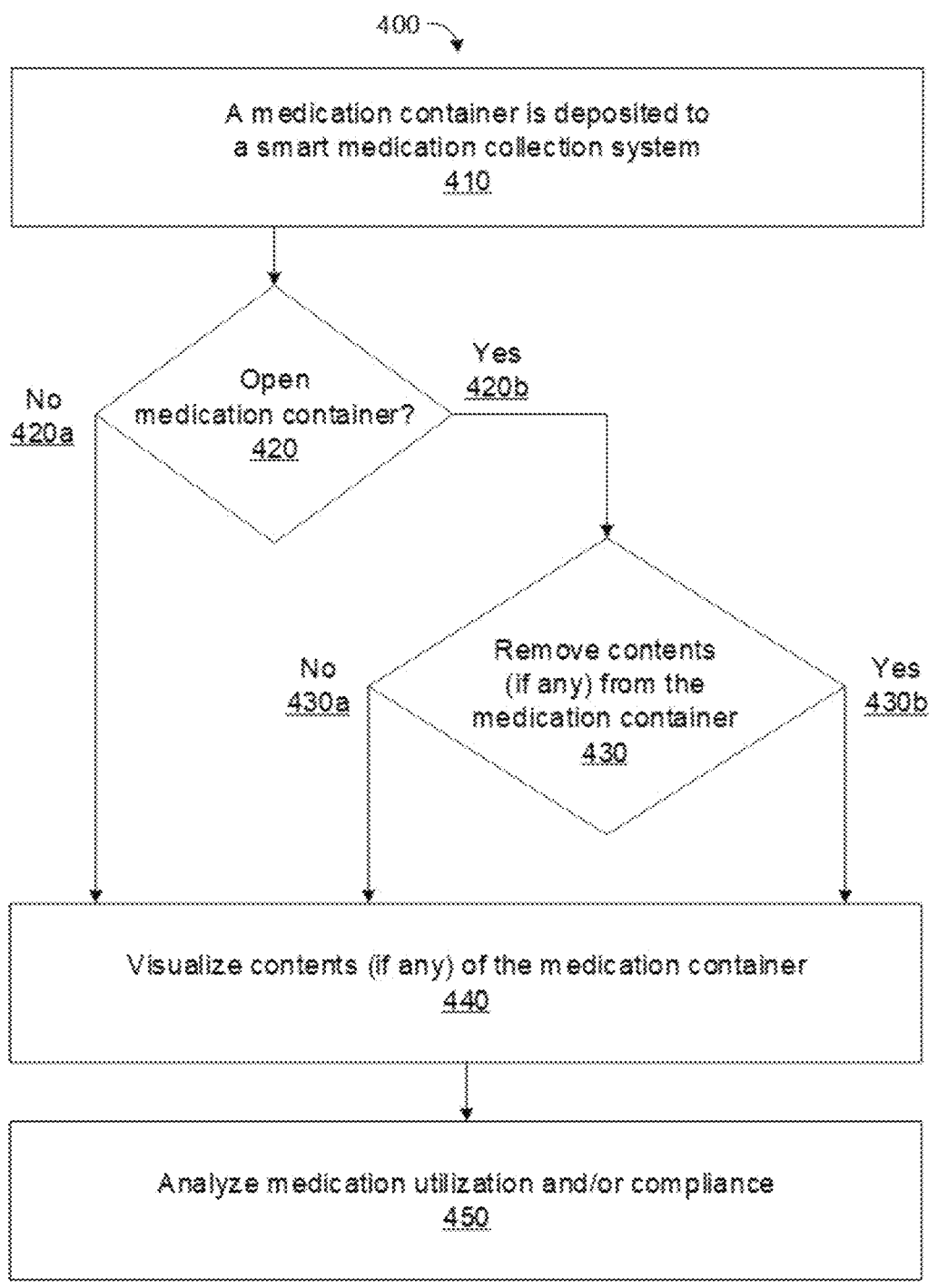
FIG. 16 illustrates an exemplary flowchart of a method of analyzing one or more medications deposited to a smart medication collection system.

FIG. 16 illustrates an exemplary flowchart 400 of methods of analyzing unused medication(s) deposited to the smart medication collection system, at least in part by visualization. The methods described in the flowchart 400 can utilize one or more steps, procedures, and/or components provided throughout the present disclosure. The methods can comprise a "non-contact" mode, wherein a cap of the medication container is not opened for analysis (e.g., visualizing or weighing) an amount of any unused medications within the medication container. Alternatively or in addition to, the methods can comprise a "contact" mode, wherein the smart medication collection system is configured to open the cap of the medication container to analyze the amount of any unused medications within the medication container.

Referring to FIG. 16, initially, a medication container is deposited to a smart medication collection system (e.g., see flowchart 300 in FIG. 15) (step 410). The medication container can comprise a cap that seals an opening of the medication container. The medication container can be in a "closed" or "sealed" configuration when deposited to the smart medication collection system.

Subsequently, the smart medication collection system can either (1) open the medication container (e.g., by removing the cap from the medication container), or (2) keep the medication container closed (step 420). In step 420*a*, the medication container is not opened (or is kept closed), and the smart medication collection system can proceed to visualize contents of the medication container (step 440). In step 420*b*, the medication container is opened by the smart medication collection system. In some cases, one or more components (e.g., actuators, robotic arms, etc.) of the smart medication collection system can be configured to remove the cap from the medication container. In an example, one or more robotic arms of the smart medication system can be configured to twist open the cap of the medication container. After detecting the contents (e.g., unused medications) within the medication container, the robotic arm(s) can dispose the contents elsewhere (e.g., the storage unit 140 of the smart medication collection system 100), and screw back the cap back on the medication container. The cap may be a generic cap or a specialized cap that is compatible with the component(s) of the smart medication collection system. In an example, the specialized cap may have one or more markings (e.g., indents and/or protrusions) that allow coupling between the specialized cap and one or more robotic arms of the smart medication collection system. In another example, the specialized cap may have one or more magnets that allow such coupling.

Subsequently, the smart medication collection system can either (1) remove contents (e.g., medication(s), if any) from the medication container, or (2) keep the contents (e.g., medication(s), if any) inside the medication container (step 430). In step 430*a*, the medication(s) of the medication container is kept inside the medication container, and the smart medication collection system can proceed to visualize contents of the medication container (step 440) through at least in part the opening of the medication container (e.g., where the cap used to be). In step 430*b*, the medication(s) of the medication container are removed from the medication container. In some cases, the medication(s) may be transferred to (e.g., poured onto) an area (e.g., a tray). Following, the smart medication collection system can proceed to visualize the medication(s) of the medication container (step 440) that are disposed over the area. In some cases, the tray may be shaken to reduce a chance of overcrowding or stacking of the medications over the tray.

During the visualization process in step 440, the smart medication collection system can utilize, for example, one or more sensors (e.g., electromagnetic spectrometers, cameras, etc.) to visualize the contents inside the medication container. The sensor(s) can be configured to visualize the contents through the medication container and/or the cap of the medication container, which portions can be transparent and/or semitransparent. The sensor may generate one or more data (e.g., spectroscopies, images, and/or videos) of what may or may not be inside the medication container.

Subsequently, the smart medication collection system can analyze medication utilization and/or compliance of the user (e.g., patient) (step 450). As provided in the present disclosure, an analysis engine that is operatively linked to the sensor can use one or more algorithms to estimate a number of returned medications (e.g., a number of returned pills) based at least in part on the generated data by the sensor. The estimated number of returned medications can be compared to a "gross" amount of medications that were originally prescribed inside the returned medication bottle. The gross amount of medications may be obtained from a label of the returned medication container, or from by connecting to one or more external database(s) (e.g., pharmacy databases) via one or more MRCs disposed on the label of the returned medication container.

In some cases, a relative movement between (i) the sensor (e.g., a camera) and (ii) the medications (inside or outside of the medication container, if any) can generate a plurality of images, videos, and/or a reconstructed multi-dimensional (e.g., three-dimensional) view of at least the medications. Thus, the algorithm(s) of the analysis engine can be used to (1) validate that the returned medication is associated with the medication container, and (2) estimate how many medications have been returned. In some cases, the sensor(s) can be configured to compare an image of the returned medication (e.g., a pill) to one or more authentic images of the medication (e.g., retrieved from the database(s) 210, database(s) 215, and/or internet 220 as shown in FIG. 13) to confirm or authenticate the wasted medication or contents thereof. The database(s) 215 can be, for example, from the National Library of Medicine (NLM). In some cases, the smart medication collection system can determine when the user is returning illegitimate medications (e.g., counterfeit medications) and prevent the user from receiving any reward. Additionally, the smart medication collection system can notify the user (e.g., via a user device) that no reward may be awarded. Alternatively or in addition to, the smart medication collection system can alert the healthcare providers (e.g., nurses, doctors) or pharmacy of such incidence of illegitimate return Following, the medications can be collected and later be discarded. In an example, the collected medications (with or without the collected medication bottles) can be transferred to a registered reverse distributor (e.g., a DEA registered reverse distributer) for destruction (e.g., incineration) of the collected medications. Alternatively, the collected medications can be destructed by the smart medication collection system (e.g., by using one or more neutralizers disclosed herein).

The analysis engine of the smart medication collection system may be configured to: (i) determine medication utilization (see Equation 3, for example); (ii) confirm the medication collection/return transaction or void the medication collection/return transaction for placement of incorrect/different medications in the medication container, and/ or (iii) and generate one or more new sets of data (e.g., original prescription details, date and/or time of return of the medication container, a length of time between prescription (or receipt by the patient) and return of the medication container, a number of medications returned, utilization and/or compliance analysis, etc.). In some cases, at least a portion of such data can be shared with the prescription drug monitoring program (PDMP) database for use and/or further analysis by prescribers (e.g., physicians) and pharmacists.

The PDMP database can be an electronic database that tracks controlled substance prescriptions. Conventionally, data in the existing PDMP database can be limited to one or more of: (i) a number of controlled substance prescriptions; (2) a number of controlled substance healthcare providers (i.e., prescribers); (3) a number of active prescriptions; (4) a number of pharmacies that are able/equipped/permitted to distribute and/or refill controlled substance prescriptions; (5) locations of the pharmacies in (4); (6) locations of the healthcare providers in (2); (7) overlapping prescriptions; (8) morphine equivalence score; and (9) Narx Score from NARxCHECK. Overlapping prescriptions can be two or more prescriptions of the same drug type (e.g., opioid and benzodiazepine) that overlap by at least a portion of the prescribed medication period (e.g., overlap by at least 25% of the days prescribed), wherein the initially dispensed prescription is characterized by having a predetermined supply time (e.g., 5 days or longer). The Narx Score can be used as a predictor of unintentional overdose death (e.g., overdose of controlled substances, such as, for example, narcotics, sedatives, and stimulants). The Narx Score can range from 000-999.

The smart medication collection system ecosystem for controlled substance take-back, as provided herein, can be capable of addressing the above shortcomings of existing medication take-back systems. In addition to the currently available data in the PDMP database, the smart medication collection system ecosystem (e.g., the smart medication collection system 100, the database(s) 210, and/or the analysis engine 230) can generate and provide additional data for (1) tracking and verification of return of controlled substances, prescription medication containers, or both; (2) tracking and verification of timing of the returns in (1); (3) tracking a controlled substance utilization data (e.g., rate, score, etc.) for each patient for one or more prescriptions; (4) tracking a controlled substance compliance data for each patient for one or more prescriptions; and/or (5) assisting healthcare provider(s) and pharmacies to reduce or prevent overprescription and/or underprescription of controlled substances.

Figure 17:
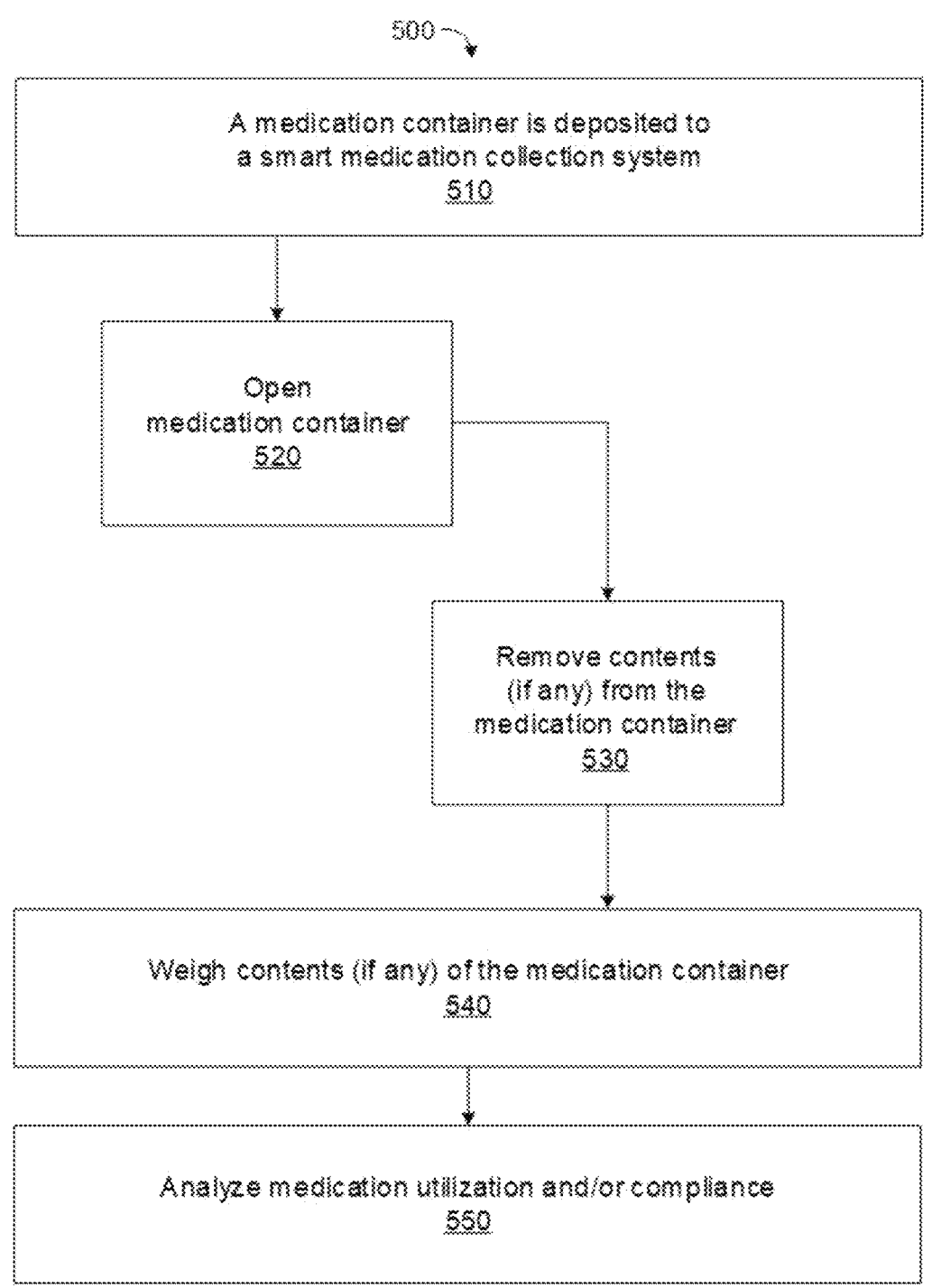
FIG. 17 illustrates another exemplary flowchart of a method of analyzing one or more medications deposited to a smart medication collection system.

FIG. 17 illustrates an exemplary flowchart 500 of methods of analyzing unused medication(s) deposited to the smart medication collection system, at least in part by weight the unused medication(s). The methods described in the flowchart 500 can utilize one or more steps, procedures, and/or components provided in the flowchart 400 of FIG. 16 or throughout the present disclosure. Referring to FIG. 17, initially, a medication container is deposited to a smart medication collection system (e.g., see flowchart 300 in FIG. 15) (step 510). The medication container can comprise a cap that seals an opening of the medication container. The medication container can be in a "closed" or "sealed" configuration when deposited to the smart medication collection system. Subsequently, the smart medication collection system opens the medication container (e.g., by removing the cap from the medication container) (step 520). Following, the smart medication collection system removes contents (e.g., medication(s), if any) from the medication container, and transfer (e.g., by inverting the medication container and pouring) the contents onto an area (e.g., a tray) (step 530). The area can comprise a sensor (e.g., a scale, a piezoelectric sensor, etc.) that can measure weight of any content that is disposed on or over the sensor. Afterwards, the smart medication collection system proceeds to direct the sensor of the area to weigh the medication(s) of the medication container (step 540) that are disposed over the area. Subsequently, the smart medication collection system can analyze medication utilization and/or compliance of the user (e.g., patient) (step 550).

In some cases, one or more steps of the methods provided in the flowcharts 400 and 500 may be combined and modified to improve accuracy in the analysis of medication utilization and/or compliance of the user.

FIG. 18 illustrates an exemplary flowchart 600 of currently available and conventional methods of prescribing one or more medications (e.g., controlled substance pills, transdermal patches, etc.). Initially, a patient consults a healthcare provider (e.g., a physician) (step 610). The consult may be at the physician's office or via digital communications (e.g., telecommunication and/or video communication). Subsequently, the healthcare provider accesses the patient's PDMP report (step 620). Subsequently, the healthcare provider prescribes medications into the patient's PDMP report (step 630). In an example, the healthcare provider may prescribe a specific dosage of fentanyl tablets (e.g., 10 tablets of 200 microgram (mcg) fentanyl, five Q72H fentanyl patches, etc.). Subsequently, the patient visits a pharmacy (step 640) (e.g., a pharmacist at the pharmacy). The pharmacy may verify the patient's identification prior to accessing the PDMP report. In some cases, the patient's proxy may be authorized to visit the pharmacy to pick up the prescription medication. Subsequently, the pharmacy accesses the patient's PDMP report to retrieve medication prescription (step 650). Subsequently, the pharmacy dispenses the prescription medication to the patient (step 660) (e.g., 10 tablets of 200 microgram (mcg) fentanyl, five Q72H fentanyl patches, etc.). In some case, prescribed medications, such as pills or tablets, can be dispensed in medication container systems. In some cases, prescribed transdermal patches can be dispensed in the packing provided by the transdermal patch manufacturer (e.g., each patch in a separate and secure packaging).

In some cases, the patient can be hospitalized. In such a case, a medical professional (e.g., a nurse) can visit the pharmacy (e.g., inside the hospital) and perform the steps 640 through 660 in place of the patient. Alternatively or in addition to, the pharmacist in step 640 can comprise an ADM disposed at the hospital, as disclosed herein. The medications can be stored in a drawer of the ADM (e.g., a CUBIE pocket in the Pyxis MedStation). Thus, the medical professional (e.g., the nurse) can visit the ADM (e.g., inside the hospital) and perform the steps 640 through 660 in place of the patient.

FIG. 19 illustrates an exemplary flowchart 700 of methods of prescribing one or more transdermal patches. Steps 710 through 760 of the flowchart 700 in FIG. 19 can be similar or identical to the steps 610 through 660 (and their embodiments) of the flowchart 600 in FIG. 18. In some cases, however, a specific remover (i.e., a patch remover) may be advised or required to remove a used transdermal patch from a bodily surface (e.g., skin) of a subject (e.g., a patient). Thus, in the flowchart 700 in FIG. 19, one or more patch removers (e.g., at least 1, 2, 3, 4, 5, or more patch removers; at most 5, 4, 3, 2, or 1 patch remover(s)) may be dispensed alongside the prescription medications (e.g., transdermal patches) (step 770).

The patch remover can be configured to assist the user (e.g., the person who is treated with the transdermal patch, a nurse, etc.) to remove the transdermal patch without being in direct contact with the transdermal patch. The patch remover can be configured to selectively remove the transdermal patch without damaging the skin (e.g., abrasions). The patch remover can be configured to remove at least 1, 2, 3, 4, 5, or more transdermal patches. The patch remover can be configured to remove at most 5, 4, 3, 2, or 1 transdermal patch(es). In some cases, an individual patch remover can be configured to remove an individual transdermal patch, and, thus, when a patient is prescribed with five transdermal patches, five patch removers may be dispensed accordingly (as described in step 770 of FIG. 19).

In comparison to current methods of manually removing the used transdermal patches and discarding them (e.g., flushing in the toilet, discarding as trash, etc.), the use of the patch removers to remove the transdermal patches and a subsequent disposal of the patch removers/transdermal patches to the smart medication collection system, as provided herein, can introduce a number of advantages including, for example, (1) safety (e.g., reduced or prevented third-party exposure during patch removal), (2) environmentally friendly, (3) accountability, (4) security, (5) DEA compliance, (6) tamper resistance, (7) proof of non-diversion, (8) proof of prescription compliance, and (9) generation of data on medication utilization.

Figure 20:
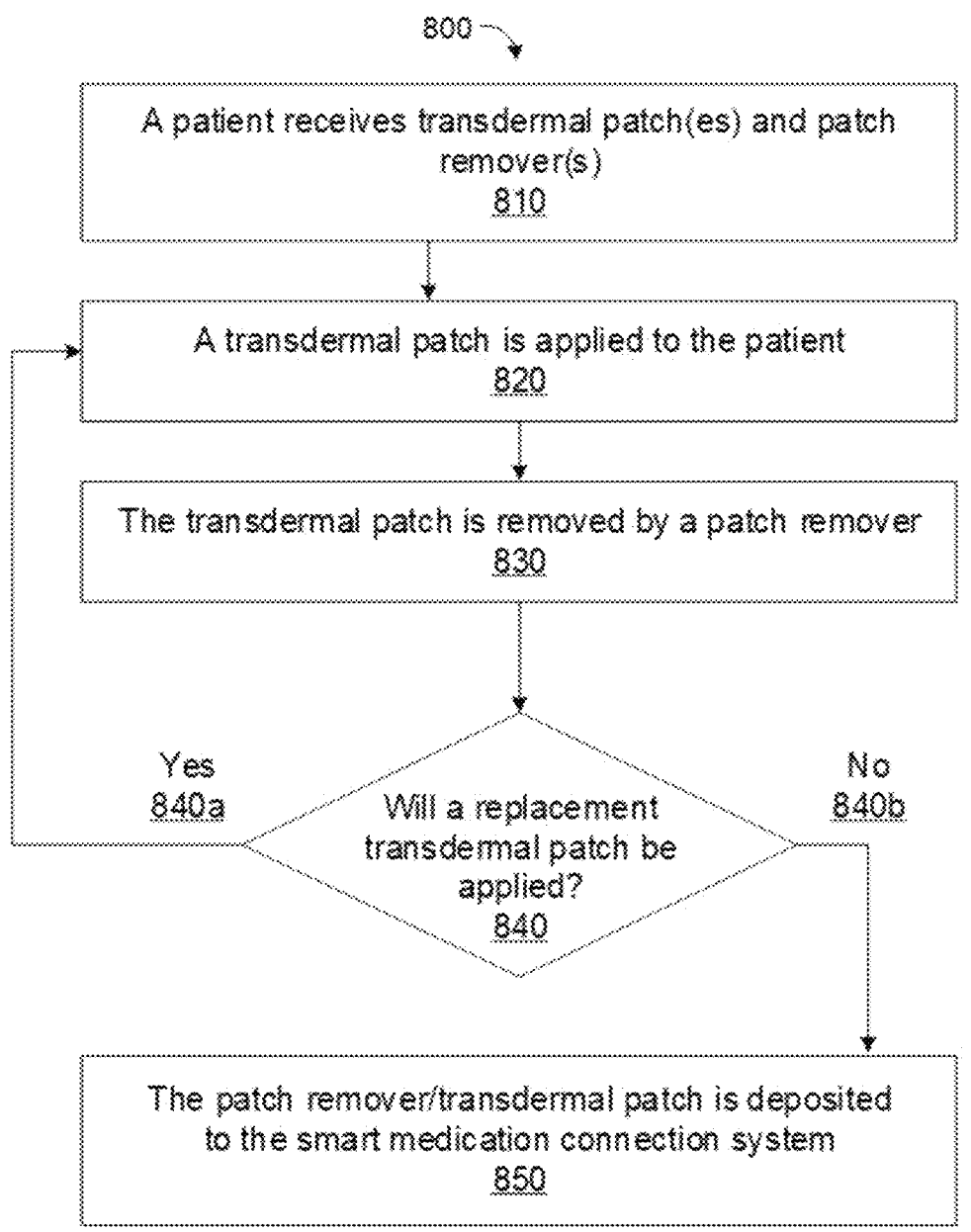
FIG. 20 illustrates an exemplary flowchart of methods of returning one or more transdermal patches to a smart medication collection system.

FIG. 20 illustrates an exemplary flowchart 800 of methods of returning one or more transdermal patches to the smart medication collection system. Initially, a patient receives one or more transdermal patches and one or more patch removers (step 810). In some cases, the patient may receive an equal number of the transdermal patch(es) and the patch remover(s). In some cases, the patient may receive different numbers of the transdermal patch(es) and the patch remover(s) (e.g., wherein each patch remover is configured to retrieve more than one transdermal patches). In some cases, the patient may receive the transdermal patches and patch removers from a pharmacy. In some cases, a medical professional (e.g., a nurse) may receive the transdermal patches and patch removers on behalf of the patient (e.g., from the ADM). Subsequently, a transdermal patch is applied to the patient's skin (step 820). Subsequently, the transdermal patch is removed from the patient's skin by a patch remover (step 830). Subsequently, whether or not a replacement transdermal patch will be applied to the patient is determined (step 840). In step 840$a$, there is at least one additional replacement transdermal patch to be applied, and thus the steps 820 and 830 are repeated. In step 840$b$, there is no additional replacement transdermal patch, and the patch remover/transdermal patch is deposited to the smart medication collection system (step 850). In some cases, the deposition of the patch remover/transdermal patch to the smart medication collection system may be similar or identical to the steps illustrated in the flowchart 300 in FIG. 15. Following, the smart medication collection system may utilize one or more features, or improvements thereof, provided herein to analyze the returned patch remover/transdermal patch.

In some cases, returning the patch removers/transdermal patches to the smart medication collection system may be a prerequisite for receiving (or dispensing) any subsequent prescription (e.g., refill) of new transdermal patches, thereby tracking and keeping accountable (i) healthcare providers on how much and how often they prescribe transdermal patches (e.g., controlled substance transdermal patches), (ii) pharmacies on how much and how often they dispense transdermal patches, (iii) pharmaceutical companies on how many transdermal patches they are introducing to the market, and/or (iv) patients on their compliance and/or utilization of the transdermal patches. In some cases, returning the patch removers/transdermal patches to the smart medication collection system can reduce or prevent third-party access (e.g., medication diversion), misuses and related outcomes (e.g., addictions), and/or accidental exposures (e.g., to children) of the transdermal patches.

Once the used and/or unused transdermal patches (e.g., along with one or more patch removers) have been deposited to the smart medication collection system, the smart medication collection system can track and generate one or more datasets for every patient, thereby assessing whether or not (i) the patient, a healthcare provider responsible for removing the transdermal patches, and/or a pharmacist responsible for dispensing the transdermal patches is diverting one or more transdermal patches, (ii) the patient or the healthcare provider is compliant with the prescription (e.g., dosage, medication period, frequency, etc.), and/or (iii) the patient is doctor shopping.

Additionally, as aforementioned, each patient can be rewarded for returning the used and/or unused transdermal patches (e.g., along with one or more patch removers).

In some cases, the patch remover may also serve as the "medication container" that can be deposited into, manipulated (e.g., opened or closed) by, and/or analyzed by the smart medication collection system, as provided herein. In some cases, at least a portion of the patch remover (e.g., a "sleeve" portion of the patch remover comprising the removed transdermal patch, the entire patch remover, etc.) can be stored in a separate medication container that can be deposited into, manipulated (e.g., opened or closed) by, and/or analyzed by the smart medication collection system, as provided herein.

C. Medication Container(s)

The medication container, as used herein, can comprise a cap. The medication container can be configured to stand in a first orientation such that the medication container stands on a surface of the medication container (e.g., container down, cap up). Alternatively or in addition to, the medication container can be configured to stand in a second orientation such that the medication container stands on a surface of the cap (e.g., cap down, container up).

The medication container can have an opening (or mouth) for entry and withdrawal of the medications. The cap can be configured to open or close (seal) the opening of the medication container. The cap can be a reversible or an irreversible cap. In some cases, the medication container can comprise a reversible cap (e.g., the patients can manually open the cap once closed) and an irreversible cap (e.g., the patients cannot manually open the cap once closed). In an example, the reversible cap can be used to open and close the opening of the container during a medication period, and after the medication period (e.g., after running out of the medications or terminating the medication treatment), the opening of the container may be irreversibly closed, sealed, and locked by the irreversible cap. In some cases, while the irreversible cap may not be opened manually (e.g., by human hands), the irreversible cap may be configured to be opened by a compatible tool or machine (e.g., one or more robotic arms inside the smart medication collection system). In some cases, an example of the "specialized cap," as above-mentioned, can include such irreversible cap.

The medication container and the irreversible cap can be coupled by one or more connection mechanisms, including, for example, male-to-female fasteners, a tether, an adhesive, a magnet (e.g., permanent or electromagnet), a lock (e.g., manual, digital, etc.), etc.

The medication container and/or the cap can comprise one or more sensors (e.g., at least 1, 2, 3, 4, 5, or more sensors; at most 5, 4, 3, 2, or 1 sensor(s)) configured to provide a feedback (e.g., light absorption spectroscopy, image, video, counting, etc.) indicative of the use of the medication container. The feedback can include withdrawal of the medications from the medication container, such as movement (e.g., insertion and/or retraction) of the medications or of a drug loading device (e.g., syringes, forceps, etc.) in and out of the medication container, an amount of the drug in the drug vial, and/or opening/closing of the cap of the medication container. The sensor may be operatively coupled to a memory device of the medication container and/or the cap to store such feedback while the medication container is in use. Examples of the sensor of the medication container may comprise a detector, vision system, computer vision, machine vision, imager, camera, electromagnetic radiation sensor (e.g., IR sensor, color sensor, etc.), proximity sensor, densitometer (e.g., optical densitometer), profilometer, spectrometer, pyrometer, force sensor (e.g., piezo sensor for pressure, acceleration, temperature, strain, force), motion sensor, magnetic field sensor (e.g., microelectromechanical systems), electric field sensor, chemical sensor, etc.

The medication container can comprise a ring (e.g., a resilient, flexible colored ring) that is mounted (e.g., removably mounted) around the opening of the container. In some cases, a household may have two or more medication containers, each with a ring of a unique color mounted around the opening. In addition to the respective label on a surface of each container, the rings can aid patients in distinguishing among different medications for different family members or among multiple types of medications for each individual patient. Each family member, or each type of medication, can be assigned to a different color, corresponding to the color of the ring.

In some cases, a user (e.g., a patient) may return the same medication container that he or she received the prescription medications in. Alternatively or in addition to, the user may be prescribed with medications in a medication container (e.g., a medication container generically used by pharmacists). At the same time, the user may be provided with a separate return container. After a medication period (e.g., prior to, during, or subsequent to a prescribed medication period), the user may (1) (i) insert the medication container, which may or may not include unused medications, inside the return container, or (ii) insert only the contents (e.g., unused medications, if any) of the medication container into the return container; and (2) deposit the return container to the smart medication collection system.

The medication container can hold at least one type of pills (e.g., at least 1, 2, 3, 4, 5, or more types of pills; at most 5, 4, 3, 2, or 1 type(s) of pills). The pills can have the same or different colors. In some examples, different types of pills can be distinguished at least in part by their colors. The pills can have the same or different shapes and/or dosages. The pills may have a cross-section that is circular, triangular, quadrilateral (e.g., square, rectangle, rhombus, trapezoid, parallelogram, etc.), pentagonal, hexagonal, or any partial shape or combination of shapes thereof. In some examples, different types of pills can be distinguished at least in part by their shapes. The pills can have the same or different weights. In some examples, different types of pills can be distinguished at least in part by their weights.

In some cases, the medication container can hold at least one covering (e.g., new and/or used covering), as described herein.

III. Other Applications

Any of the subject systems and methods for medication management (e.g., in Sections I and II of the Specification) can be implemented with (e.g., comprise) a voice recognition device. The voice recognition device can comprise one or more microphones and a controller for speech recognition. The voice recognition device can be capable of performing automatic speech recognition (ASR) and/or speech to text (STT) conversion, to convert voice commands of the user to computer data. The voice recognition device can be operatively coupled to a controller of the medication management system 1205, such that the user can (i) log in to the medication management system, (ii) gain access to one or more components of the medication management system, (iii) provide patient information, and/or (iv) provide medication information (e.g., name, type, quantity, and/or dose to be deposited for wasting). In an example, the user may direct, by speech or voice command alone, to open a door and gain access to a medication collector within the medication management system. Such use of the voice recognition system can eliminate or reduce physical contact of the medication management system by the user while abiding by the confidentiality rules under HIPAA. During operation, the controller of any of the subject medication management system can be configured to perform speech synthesis (e.g., text-to-speech (TTS)) to "speak" to the user via one or more speakers and send a message and/or an instruction to the user. Alternatively or in addition to, the controller can display any message and/or instruction to the user via a user interface (e.g., via a GUI on a display).

One or more aspects of the systems and methods for medication management (e.g., in Section I of the Specification) can be configured to detect (e.g., via the user identification device(s) 1310 as shown in FIG. 3B) one or more biological signals of a user while the user is (i) dosing a medication (e.g., drawing liquid medication into a syringe) and/or (ii) wasting unused/leftover medications. Examples of the biological signal(s) can include, but are not limited to, blood pressure, heart rate, breathing rate, body temperature, blood oxygen level, and/or movement (e.g., shivering or coughing). In an example, a forehead temperature can be measured (e.g., with or without contacting the forehead of the user) by the medication management system. Based on the biological signal(s) the medication management system (e.g., via the analysis engine 1230 as shown in FIG. 3A) can determine a probability of the user having a health condition (e.g., healthy, sick, fever, etc.). When the probability of the user having a particular health condition (e.g., sick or fever) is above a predetermined threshold (e.g., at least 50%, 55%, 60%, 65%, 70%, 75%, 80%, 85%, 90%, 95%, or more), the medication management system can alert a supervisor of the user and/or an administrator of the medication management system, such that another person can be called in to resume in place of the user. As such, the medication management system provided herein can prevent spreading of a disease or condition (e.g., a viral disease, such as that of a coronavirus) from healthcare providers to their colleagues and/or patients. Additionally, the medication management system provided herein can monitor the health of the healthcare providers to ensure their safety and well-being while working at the medical facilities. Any sensor data recorded and/or analysis data generated can be stored in the database(s) of the medication management ecosystem. In some embodiments, analysis of the health condition of the healthcare providers can be required to determine whether the healthcare provider should be allowed to proceed with medication dosing and/or wasting. In some examples, the detection of biological signal(s) of the user may be utilized when the user is logging into the system. In some embodiments, the biological signal of the user can be used as an indication of the user's suspicious behavior or activity. For example, the user identification device(s) can be used to detect facial expression, eye movement, and/or bodily movements, which can be analyzed for signs (e.g., darting eyes, twitching, shaky hands, perspiration, etc.) indicative of a person involved in a suspicious activity.

Similarly, one or more aspects of the systems and methods for smart medication collection (e.g., in Section II of the Specification) can be configured to monitor the health of medication consumers/subscribers (or their proxy) to ensure their safety and well-being while they are returning/wasting their unused/leftover medications.

One or more aspects of the systems and methods for medication management (e.g., Section I and II of the Specification) can be utilized in facilities responsible for manufacturing, producing, or packaging any of the medications provided herein. Examples of the facilities include, but are not limited to an industrial pharmacy, a compounding pharmacy, an IV preparation pharmacy, a nuclear pharmacy, and a research pharmacy. The aspect(s) of the systems and methods provided herein can provide and/or improve waste process standardization (e.g., for wasting of materials, including leftover precursors, solvents, and/or products below a quality threshold, etc.). For example, the aspect(s) of the systems and methods can provide improved recordation and reconciliation of material wasting.

One or more aspects of the systems and methods for medication management (e.g., Section I and II of the Specification) can be utilized in facilities responsible for manufacturing, producing, or packaging other goods (or products). Examples of the facilities include, but are not limited to, food preparation and/or production facilities, food service facilities, industrial process plants (e.g., oil refinery or petroleum refinery, petrochemical plants, chemical plants, etc.), consumer product research and/or manufacturing facilities (e.g., for over-the-counter consumer health products, such as oral medications including pills and/or capsules), etc.

Any of the subject systems and methods for medication management (e.g., in Sections I and II of the Specification) can be implemented to detect a user's tampering (or an attempt thereof) of the medication management system. The medication management system can monitor the user's activity (e.g., via the user identification device(s) 1310 as shown in FIG. 3B) to detect when the user ignores, circumvents, reverses, and/or attempts to override standard uses or functions of the medication management system. For example, the medication management system can determine when the user is prying or propping open a door to illegitimately gain access to one or more components within the medication management system (e.g., the medication collector(s) 1360 as shown in FIG. 3B). Upon detection of such unauthorized use, the system can be configured to terminate (e.g., log out the user or automatically turn off the system entirely) to stop the user. In some cases, the system can be configured to generate of an indicator (e.g., a log, report, signal, flag, message, alert, etc.) to the user's supervisor, pharmacist, nurse manager, diversion control official, and/or other personnel of the medical facility (e.g., from human resources, pharmacy, risk management, security, etc.).

One or more aspects of the systems and methods for medication management (e.g., Section I and II of the Specification) can be utilized in patient care facilities (e.g., hospitals, nursing homes, etc.), cafeterias, or any other facilities that provide food to individuals. Returning of any leftover foods (including beverages) and/or trays comprising such leftover foods can be tabulated for each individual to determine and track what the individual has consumed.

IV. Computer Systems

Figure 23:
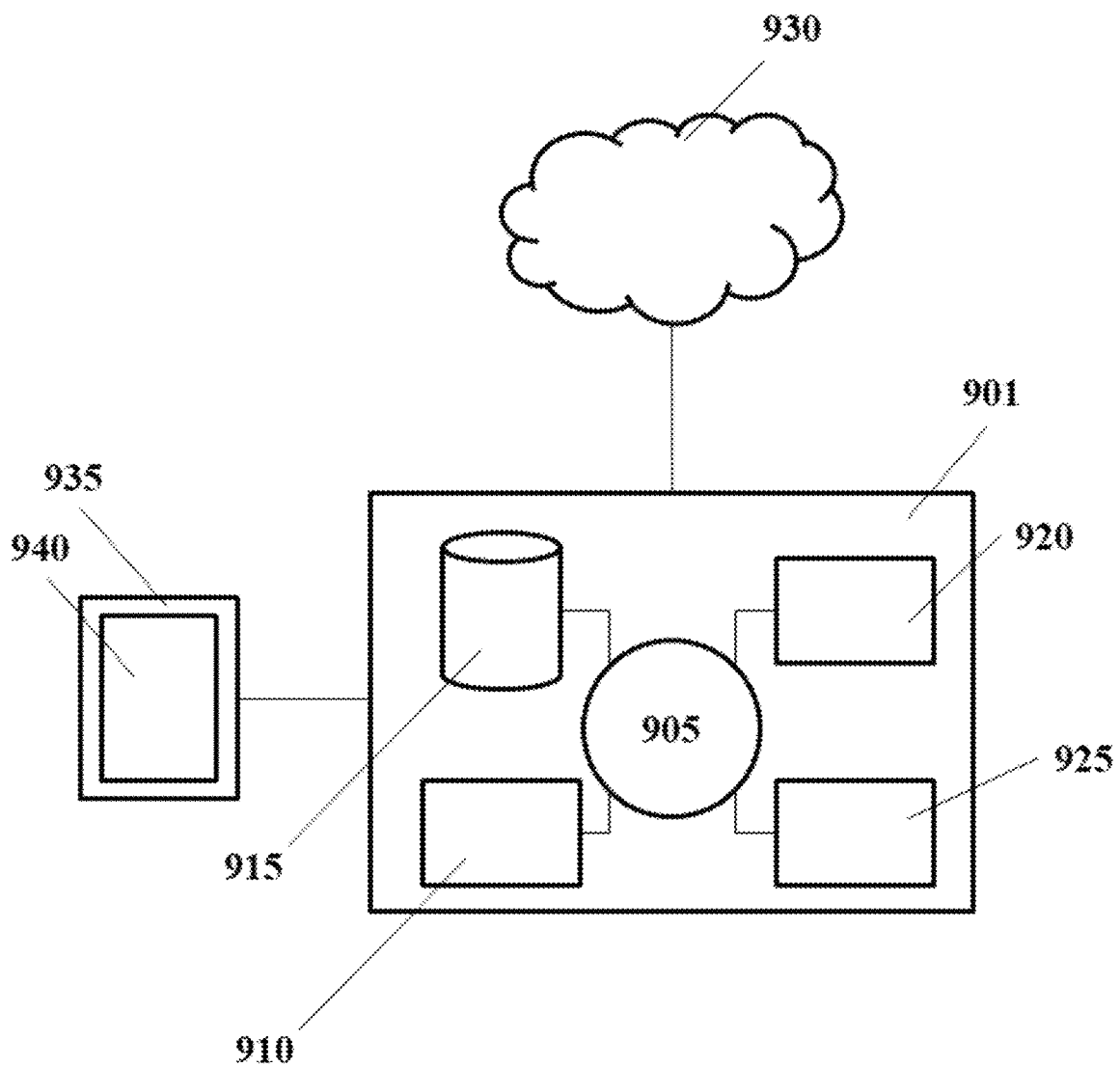
FIG. 23 shows a computer system that is programmed or otherwise configured to implement methods provided herein.

The present disclosure provides computer systems that are programmed to implement methods of the disclosure. FIG. 23 shows a computer system 901 that is programmed or otherwise configured to tracking use of one or more unused medications. The computer system 901 can regulate various aspects of (i) the medication management system and the ecosystem thereof and/or (ii) the smart medication collection system and the ecosystem thereof. The computer system 901 can be an electronic device of a user or a computer system that is remotely located with respect to the electronic device. The electronic device can be a mobile electronic device.

The computer system 901 includes a central processing unit (CPU, also "processor" and "computer processor" herein) 905, which can be a single core or multi core processor, or a plurality of processors for parallel processing. The computer system 901 also includes memory or memory location 910 (e.g., random-access memory, read-only memory, flash memory), electronic storage unit 915 (e.g., hard disk), communication interface 920 (e.g., network adapter) for communicating with one or more other systems, and peripheral devices 925, such as cache, other memory, data storage and/or electronic display adapters. The memory 910, storage unit 915, interface 920 and peripheral devices 925 are in communication with the CPU 905 through a communication bus (solid lines), such as a motherboard. The storage unit 915 can be a data storage unit (or data repository) for storing data. The computer system 901 can be operatively coupled to a computer network ("network") 930 with the aid of the communication interface 920. The network 930 can be the Internet, an internet and/or extranet, or an intranet and/or extranet that is in communication with the Internet. The network 930 in some cases is a telecommunication and/or data network. The network 930 can include one or more computer servers, which can enable distributed computing, such as cloud computing. The network 930, in some cases with the aid of the computer system 901, can implement a peer-to-peer network, which may enable devices coupled to the computer system 901 to behave as a client or a server.

The CPU 905 can execute a sequence of machine-readable instructions, which can be embodied in a program or software. The instructions may be stored in a memory location, such as the memory 910. The instructions can be directed to the CPU 905, which can subsequently program or otherwise configure the CPU 905 to implement methods of the present disclosure. Examples of operations performed by the CPU 905 can include fetch, decode, execute, and writeback.

The CPU 905 can be part of a circuit, such as an integrated circuit. One or more other components of the system 901 can be included in the circuit. In some cases, the circuit is an application specific integrated circuit (ASIC).

The storage unit 915 can store files, such as drivers, libraries and saved programs. The storage unit 915 can store user data, e.g., user preferences and user programs. The computer system 901 in some cases can include one or more additional data storage units that are external to the computer system 901, such as located on a remote server that is in communication with the computer system 901 through an intranet or the Internet.

The computer system 901 can communicate with one or more remote computer systems through the network 930. For instance, the computer system 901 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 901 via the network 930.

Methods as described herein can be implemented by way of machine (e.g., computer processor) executable code stored on an electronic storage location of the computer system 901, such as, for example, on the memory 910 or electronic storage unit 915. The machine executable or machine readable code can be provided in the form of software. During use, the code can be executed by the processor 905. In some cases, the code can be retrieved from the storage unit 915 and stored on the memory 910 for ready access by the processor 905. In some situations, the electronic storage unit 915 can be precluded, and machine-executable instructions are stored on memory 910.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 901, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semi-conductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 901 can include or be in communication with an electronic display 935 that comprises a user interface (UI) 940 for providing, for example, a UI on a display of the smart medication collection system for the user to identify which medication is being returned. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 905. The algorithm can, for example, (i) determine a probability of medication mismanagement (e.g., diversion) by a healthcare provider and/or (ii) determine utilization and/or compliance of a particular medication for a user (e.g., a consumer or a patient).

EXAMPLES

Example 1: Propofol Wasting Management

Propofol is an opaque emulsion formulation for induction of and/or maintenance of general anesthesia. In some cases, propofol can be used to sedate patients for non-surgical treatments or therapies. Such patients can be in an ICU and on a ventilator. Propofol is one of the most widely used and wasted medications in medical institutions, e.g., in operating rooms, endoscopy suites, and ambulatory surgery centers. This medication can be administered by injection for a short-term use or infusion for a long-term use. In some cases, wasted or discarded propofol can account for about 45% of all medication wastes. Additionally, propofol can be environmentally unfriendly (e.g., toxic to aquatic life) and can exhibit slow degradation or decomposition, e.g., in water. In some cases, a single bottle of propofol can be used for multiple doses for a single patient or multiple patients during successive surgical procedures. In some cases, propofol can be wasted into the sink, and due to colloidal and/or viscous properties of the medication, wasted propofol can clog pipes and cause additional problems, such as contamination of other liquids (e.g., water) flowing through such pipes.

Propofol is not yet classified as a controlled substance, and thus no regulations exists around managing usage and wasting of this medication. Thus, recognized herein is a need for systems and methods for proper wasting of unused or leftover propofol in the propofol vial. Therefore, the medication management system and methods provided herein (e.g., the medication management system 1205 as shown in FIG. 3B) can be used for medical institutions to manage propofol usage and wasting, e.g., to identify, quantify, and track wasting of propofol.

A healthcare provider (e.g., a nurse) who intends to waste unused/leftover propofol can be instructed (e.g., by audio and/or video prompts provided on a display of the medication management system) to present an unlabeled, transparent (or semi-transparent) side of the propofol vial (or bottle) to an optical scanner (e.g., a camera of the user identification device 1310 or the medication sensor 1370 as shown in FIG. 3B) of the medication management system. In some cases, the GUI provided on the display can show a digital frame and an image/video of the propofol vial in real-time to guide the user to a correct position and/or orient in real space. Following, the medication management system (e.g., the analysis engine 1230 as shown in FIG. 3A) can (1) evaluate the color and/or optical density of the propofol vial and (2) confirm whether the contents in the vial is likely to be propofol or not. The medication management system can provide a probability (e.g., greater than 90% chance, less than 50% chance, etc.) that the contents inside the vial is propofol. When the analysis determines a high probability (e.g., greater than 70% chance) that the contents inside the vial is not propofol, the medication management system can (i) instruct the user to retry positioning the medication vial to the camera and/or (ii) send an alert message to a supervisor or administrator of the medication management system for potential mismanagement (e.g., diversion) of the medication. The analysis can be saved in the database of the medication management system. In the cases when the medication management system confirms that the contents in the medication vial is likely propofol, the medication management system can instruct the user to proceed with the wasting process (e.g., disposing the liquid medications into the liquid collector(s) 1364 as shown in FIG. 3B, or disposing the entire propofol vial into an appropriate storage in the medication collector(s) 1360). The medication collector(s) 1360 can be configured to receive propofol vials having different sizes and/or shapes.

The medication management system can be configured to perform volumetric analysis of the propofol being returned and wasted to determine any diversion thereof. First, the quantity or dose of propofol used (and billed for) by the anesthesiologist can be documented (e.g., on paper or electronically) and retrieved. Such information, as well as the original amount or dose that was prescribed for the medical procedure can be retrieved by the medication management system. By comparing the prescribed amount of propofol and the used amount of propofol, the medication management system (e.g., the analysis engine 1230 as shown in FIG. 3B) can determine an amount of a range of the amount of propofol that should be leftover and returned to the medication management system for proper wasting. When the nurse demonstrates the contents of the propofol vial to the camera and/or sensor of the medication management system, the medication management system can determine an approximate amount (e.g., volume) of the leftover propofol in the vial and compare the result to the theoretical amount of propofol that should be returned. When the measured amount and the theoretical amount is determined to be within an acceptable margin of error (e.g., within a differ-
ence of less than at most 10%, 9%, 8%, 7%, 6%, 5%, 4%,
3%, 2%, 1%, 0.5%, 0.1%, or less), the user may be
instructed by the medication management system to proceed
with the propofol wasting process. Alternatively, when the
measured amount and the theoretical amount is not deter-
mined to be within the acceptable margin of error, the
medication management system can (i) instruct the user to
retry positioning the medication vial to the camera and/or
(ii) send an alert message to a supervisor or administrator of
the medication management system for potential misman-
agement (e.g., diversion) of the medication. The analysis can
be saved in the database of the medication management
system.

In some cases, the propofol vial can be graduated with
markings to indicate an approximate content volume. Alter-
natively, the propofol may not and need not be graduated for
the optical scanner of the medication management system to
perform analysis (e.g., volumetric analysis) of the content
inside.

The medication management system can be configured to
assess the weight of the propofol vial prior to and subsequent
to its use. A new propofol vial (e.g., uncapped and
unopened) can be weighed, e.g., at a production site of the
propofol vial or during loading to the medication manage-
ment system and/or an ADC that is operatively coupled to
the medication management system. In an example, a scale
of the medication management system can be used. Such
pre-use weight of the propofol vial can be saved (e.g., in the
database of the medication management system and/or
eMAR/CPOE) as a baseline weight. In some cases, the
medication management system can be configured to deter-
mine (e.g., calculate) an anticipated weight of the propofol
vial after use thereof based on the reported volume of
propofol used. The reported volume can be provided by the
nurse or separately by an anesthesiologist, e.g., to eMAR/
CPOE. For example, the weight per volume of propofol
formulations under different brand names can be approxi-
mately identical (e.g., within a difference of less than at most
5%, 4%, 3%, 2%, 1%, 0.5%, 0.1%, or less), and thus the
analysis engine of the medication management system can
(i) multiply the volume of propofol used by the weight per
volume of propofol to obtain a weight of propofol used, and
(ii) subtract the weight of propofol used from the baseline
weight to determine the anticipated after-use weight of the
propofol vial. When the weight of the propofol vial that is
being returned and its anticipated after-use weight are not
within a margin of error (e.g., within a difference of less than
at most 5%, 4%, 3%, 2%, 1%, 0.5%, 0.1%, or less), the
medication management system can (i) instruct the user to
retry positioning the medication vial on the scale and/or (ii)
send an alert message to a supervisor or administrator of the
medication management system for potential mismanage-
ment (e.g., diversion or tampering, such as dilution or
substitution) of propofol. The analysis can be saved in the
database of the medication management system. In the cases
when the medication management system confirms that the
weight of the propofol vial that is being returned and its
anticipated after-use weight are within the margin of error,
the medication management system can instruct the user to
proceed with the wasting process. In some cases, when the
reported use of the propofol is too low (e.g., indicative of
unauthorized dilution or substitution during use) or too high
(e.g., indicative of diversion), the medication management
system can send an alert message to a supervisor or admin-
istrator of the medication management system for potential
mismanagement.

Example 2: Multi-Purpose Medication Management
System

Figure 9A:
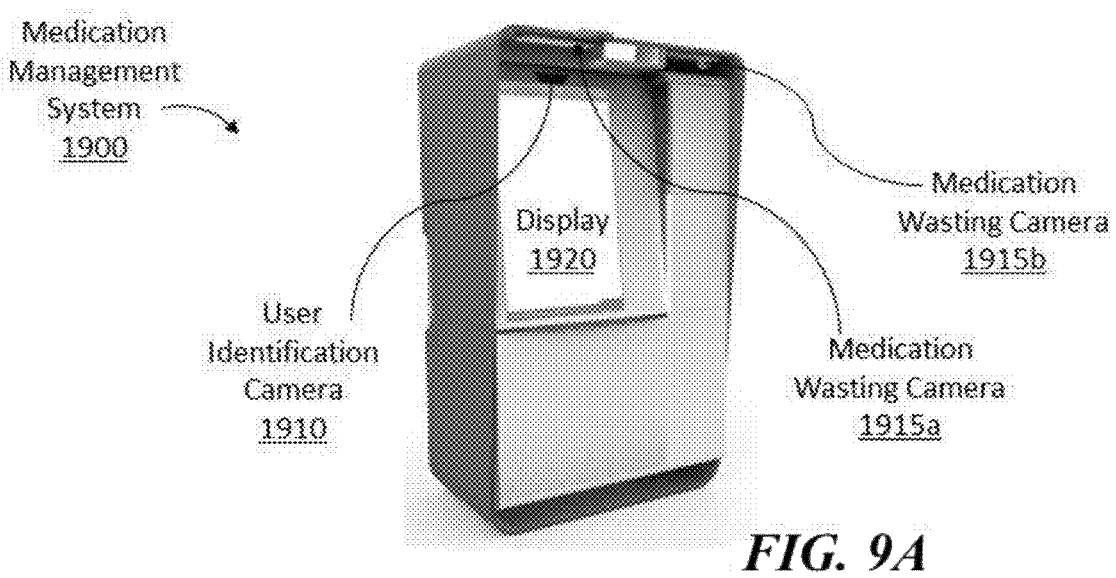
FIGS. 9A-9C schematically illustrate a different exemplary medication management system for inpatient medical institutions.
Figure 9B:
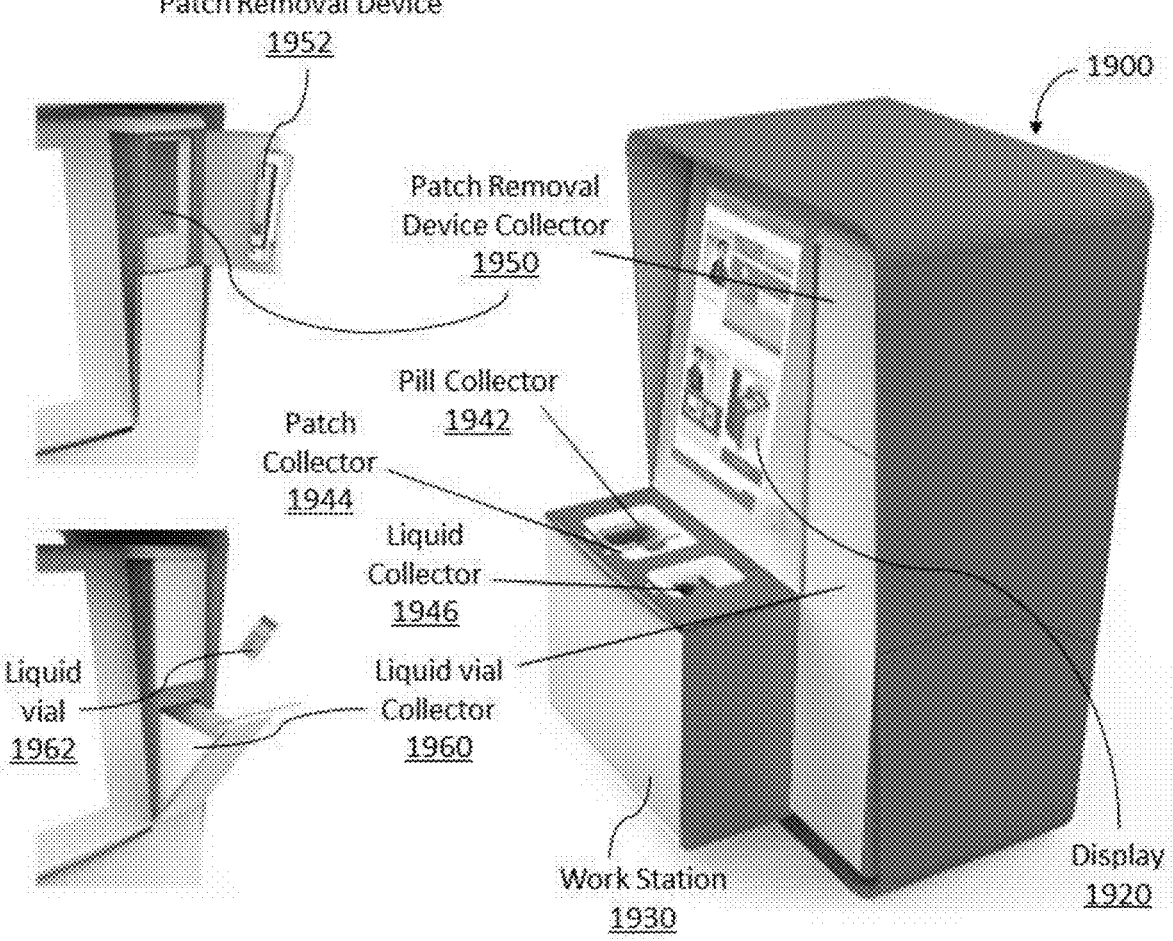

FIGS. 9A and 9B schematically illustrate an example
medication management system 1900. The medication man-
agement system 1900 may be disposed at a medical insti-
tution, e.g., a hospital. The medication management system
1900 can comprise a plurality of cameras for visual account-
ability of the users (e.g., nurses) during unused/leftover
disposal and wasting. Example medications, medication
packages, and/or medication handling unit that can be
deposited to the medication management system 1900 can
include pills, patches, liquid medications, liquid medication
vials 1660, and patch removal devices 1610.

Referring to FIG. 9A, the medication management system
1900 can conceal any medication collection units when it is
not in use (e.g., when a user has not logged in to the system).
The medication management system 1900 can comprise a
user identification camera 1910 that is configured to identify
and track a user (e.g., a nurse) during the user's medication
wasting process. The user identification camera 1910 can
record images and/or videos of the user. The user identifi-
cation camera 1910 can display the recorded images and/or
videos in real-time on the display 1920. The medication
management system 1900 can comprise medication wasting
cameras 1915a and 1915b configured to track the actual
medication disposal/wasting process. The camera 1915a can
be configured to view a first region of the medication
management system 1900, and the camera 1915b can be
configured to view a second region of the medication
management system 1900 that is different from the first
region.

Figure 9C:
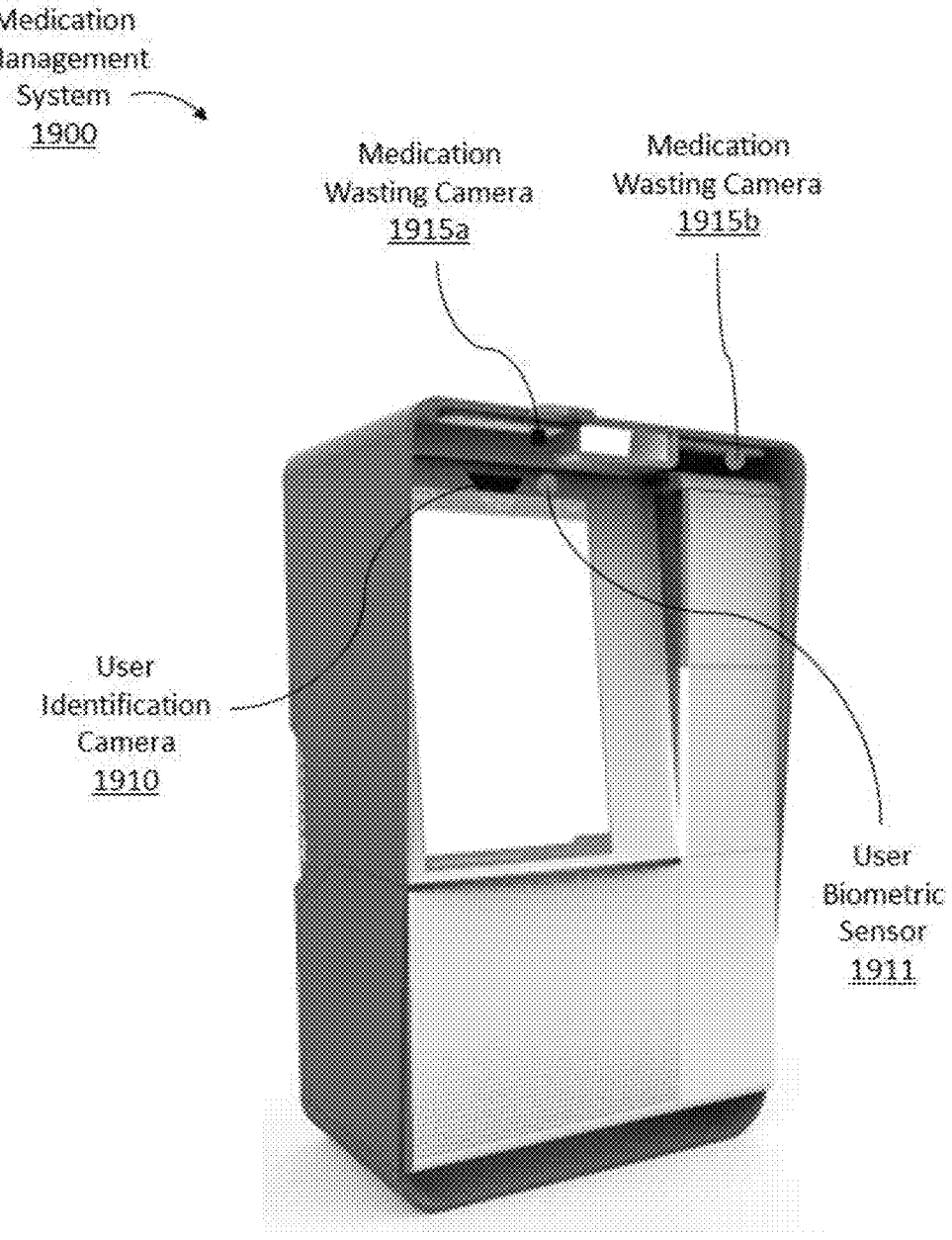

Referring to FIG. 9B, a work station 1930 of the medi-
cation management system 1900 can be hidden when the
medication management system 1900 is not in use. When in
use, the work station 1930 can be opened (e.g., manually or
automatically), to allow access to the work station 1930. The
work station 1930 can comprise a plurality of medication
collectors comprising: a pill medication collector 1942, a
patch medication (e.g., used and/or unused) collector 1944,
and a liquid medication (e.g., liquid, semi-liquid, gel, etc.)
collector 1946. Each of the plurality of medication collectors
can individually collect and store the respective medica-
tions. Alternatively, each of the plurality of medication
collectors can be in fluid communication with a separate
wasting bin to transfer and store the wasted medications. In
another alternative, the plurality of medication collectors
can be in fluid communication with a single wasting bin to
transfer and store the wasted medications. The medication
management system 1900 can further comprise a patch
removal device collector 1950 for the user to deposit one or
more patch removal devices 1952 for wasting. The medica-
tion management system 1900 can further comprise a liquid
vial collector 1960 for the user to deposit unused or leftover
liquid medication vials (or bottles) or empty liquid medica-
tion vials for wasting. Referring to FIG. 9C, the medication
management system 1900 can comprise the user identifica-
tion camera 1910 and a separate user biometric sensor 1911
disposed adjacent to the user identification camera 1910. In
other embodiments, a single user identification camera 1910
can be configured to also function as a user biometric sensor.

The medication management system 1900 can comprise
one or more sensors operatively coupled to the plurality of
medication collectors. The sensor(s) can be configured to
scan the unused/leftover medications and/or medication
mediation packages for, e.g., confirming the types or
amounts of the medications being wasted, sorting of the wasted medications into a respective medication collector (e.g., into one of the pill collector 1942, patch collector 1944, liquid collector 1946), and/or sorting the wasted medications from the medication collector(s) to a respective returned/wasted medication bin(s).

Example 3: Pill Medication Wasting

The medication management system 1900 in Example 2 can be used for a user 1905 (e.g., a nurse) to deposit pill medications for wasting. FIGS. 10A-10E show example images (or representations of videos) recorded by the user identification camera 1910 and the medication wasting cameras 1915*a* (for viewing the work station 1930 when extended out of the system 1900), 1915*b* (for viewing other collector regions of the system 1900), and 1915*c* (for viewing the sharps bin 1970) of the medication management system 1900 during pill medication wasting. The user 1905 is anonymized in the images for the purpose of identity security in the present disclosure. However, actual images or videos recorded by the medication management system 1900 may not and need not anonymize the users in order to accurately track the users during medication dosing and/or wasting.

Figure 10A:
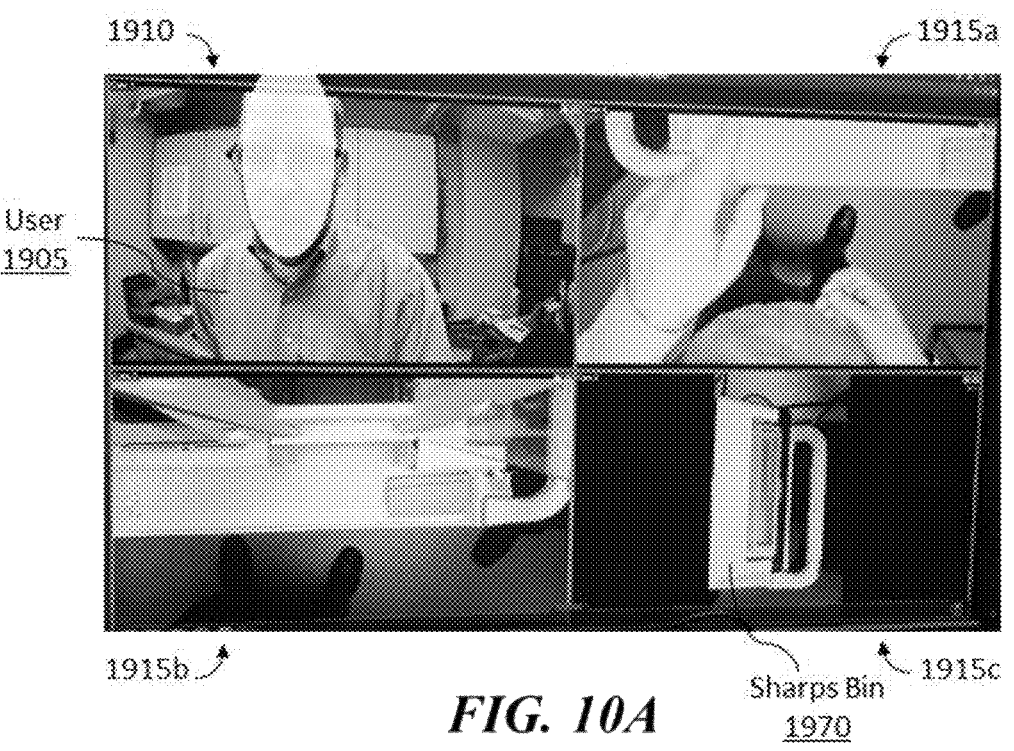
FIGS. 10A-10E show exemplary images obtained by cameras of a medication management system during an oral medication wasting process.
Figure 10B:
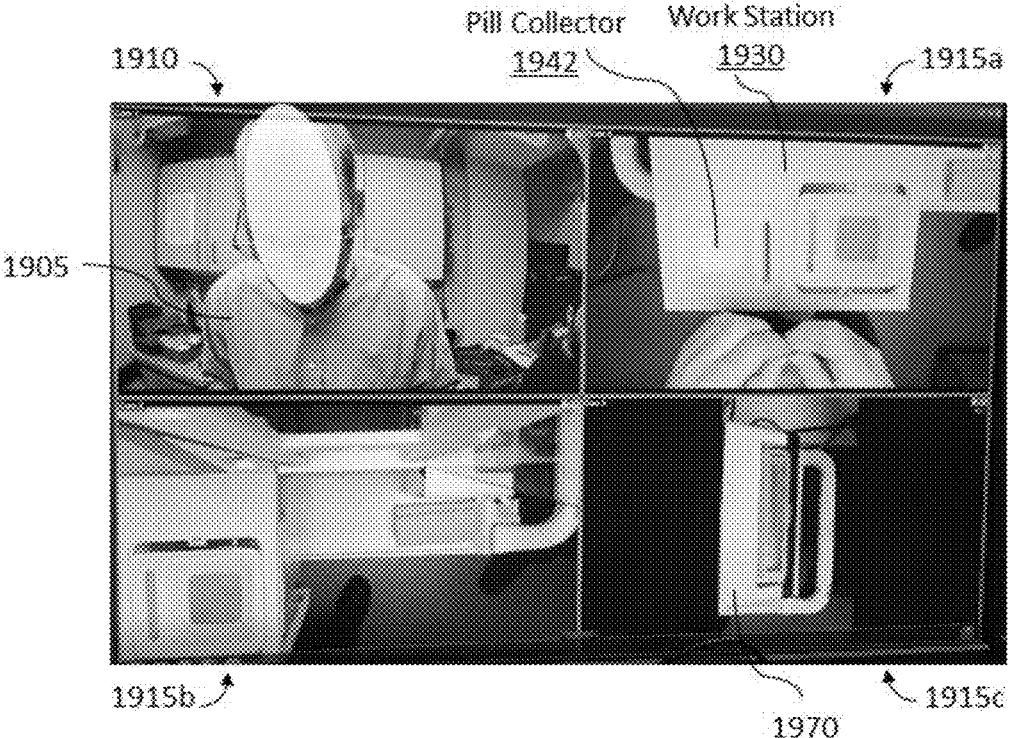
Figure 10C:
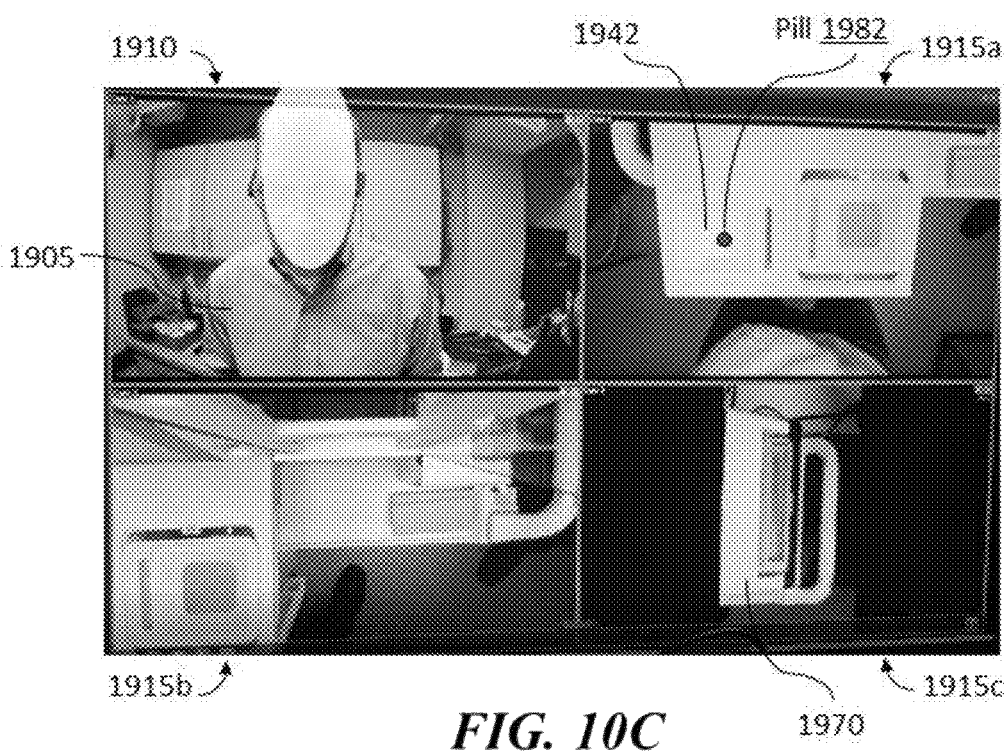
Figure 10D:
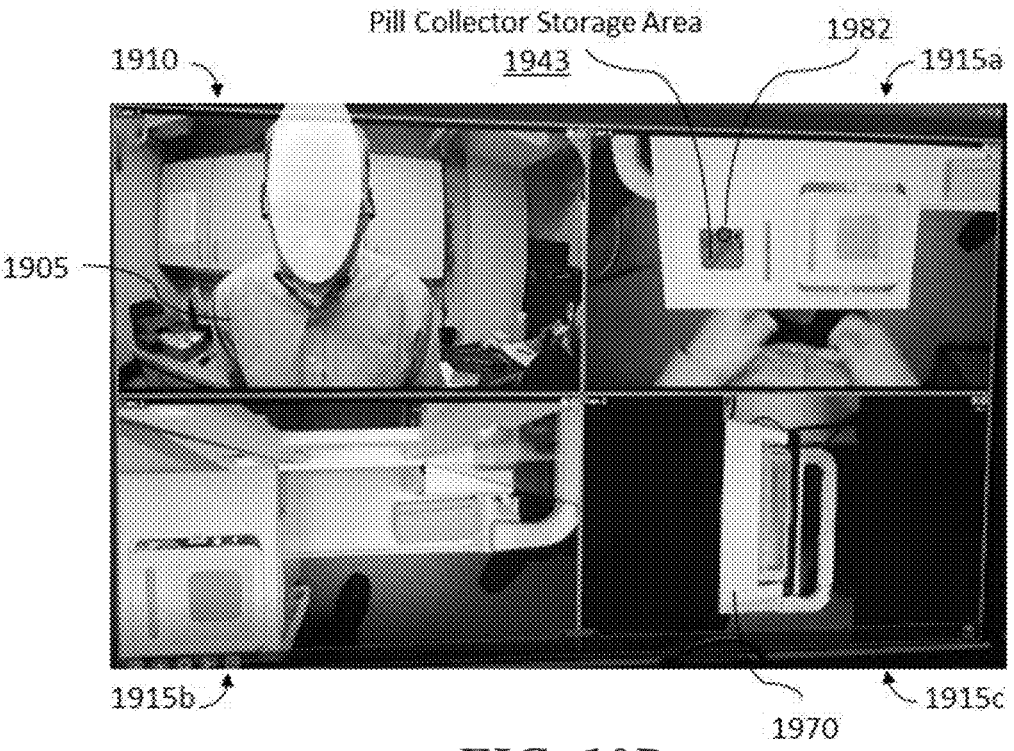
Figure 10E:
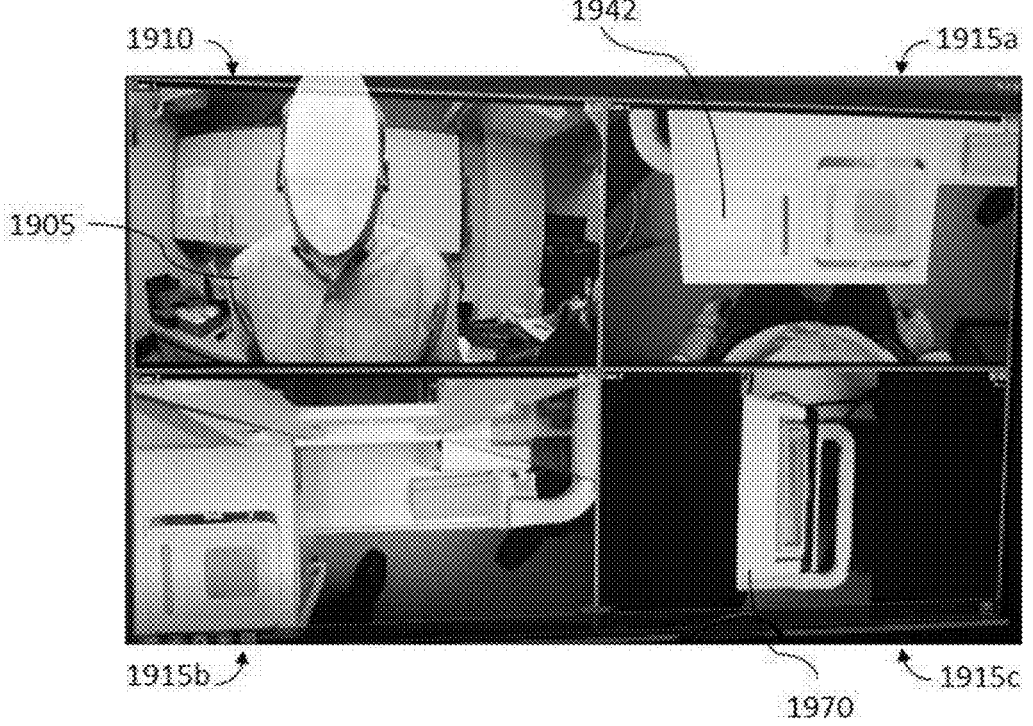

Referring to FIG. 10A, the user 1905 can approach the medication management system 1900 to log in to the system and initiate the pill medication wasting process. The user can carry the unused/leftover pill medications in his or her hand, pocket, or in a separate container. The sharps bin 1970 can be disposed adjacent to the system 1900. Referring to FIG. 10B, the user 1905 can log into the system 1900 to gain access to the work station 1930, which comprises the pill collector 1942. Referring to FIG. 10C, the user can place a pill 1982 on a platform (or top covering) of the pill collector 1942. Referring to FIG. 10D, the platform of the pill collector 1942 can open (e.g., pivot, turn, or rotate) to expose the pill collector storage area 1842 and allow the pill 1982 to drop into the pill collector storage area 1842, as shown by the image captured by the camera 1915*a*. The opening of the platform can be triggered manually by the user (e.g., via selecting a button on the GUI of the system 1900) or automatically by a controller of the system 1900 (e.g., by sensing the presence of the pill 1982 using one or more sensors, or by a timer). Referring to FIG. 10E, the platform of the pill collector 1942 can be closed to conceal the pill collector storage area 1842 to complete the pill wasting process of the user 1905.

Example 4: Liquid Medication Wasting

The medication management system 1900 in Example 2 can be used for a user 1905 (e.g., a nurse) to deposit liquid medications for wasting. FIGS. 11A-11G show example images (or representations of videos) recorded by the user identification camera 1910 and the medication wasting cameras 1915*a* (for viewing the work station 1930 when extended out of the system 1900), 1915*b* (for viewing other collector regions of the system 1900), and 1915*c* (for viewing the sharps bin 1970) of the medication management system 1900 during liquid medication wasting. The user 1905 is anonymized in the images for the purpose of identity security in the present disclosure. However, actual images or videos recorded by the medication management system 1900 may not and need not anonymize the users in order to accurately track the users during medication dosing and/or wasting.

Figure 11A:
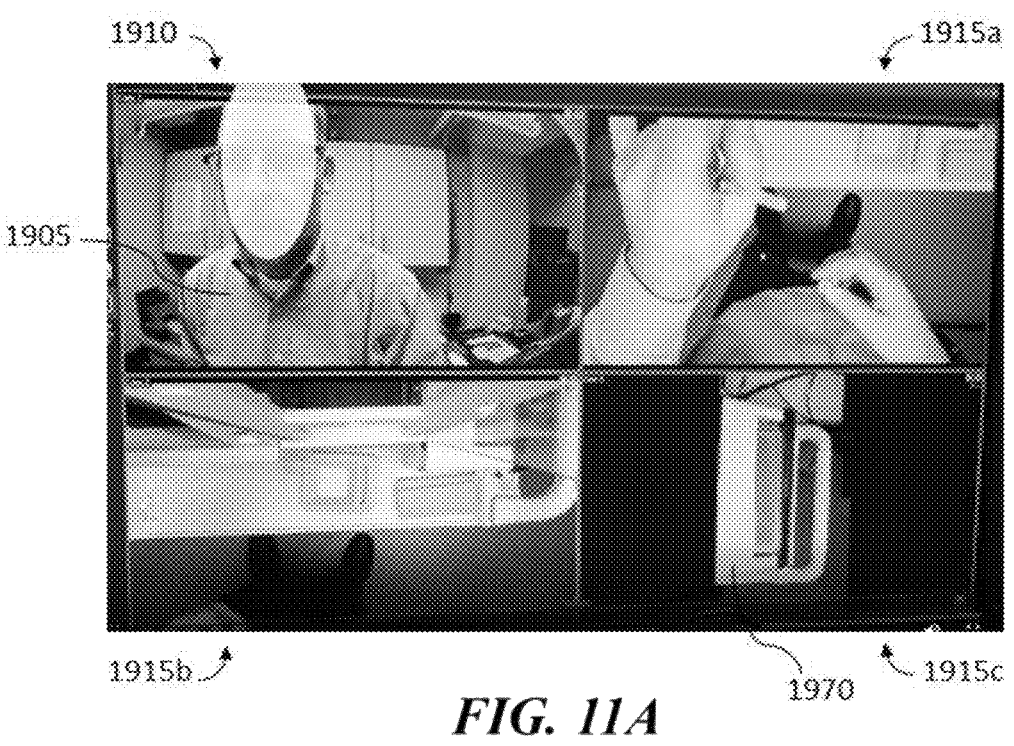
FIGS. 11A-11G show exemplary images obtained by cameras of a medication management system during a liquid medication dosing and wasting process.
Figure 11B:
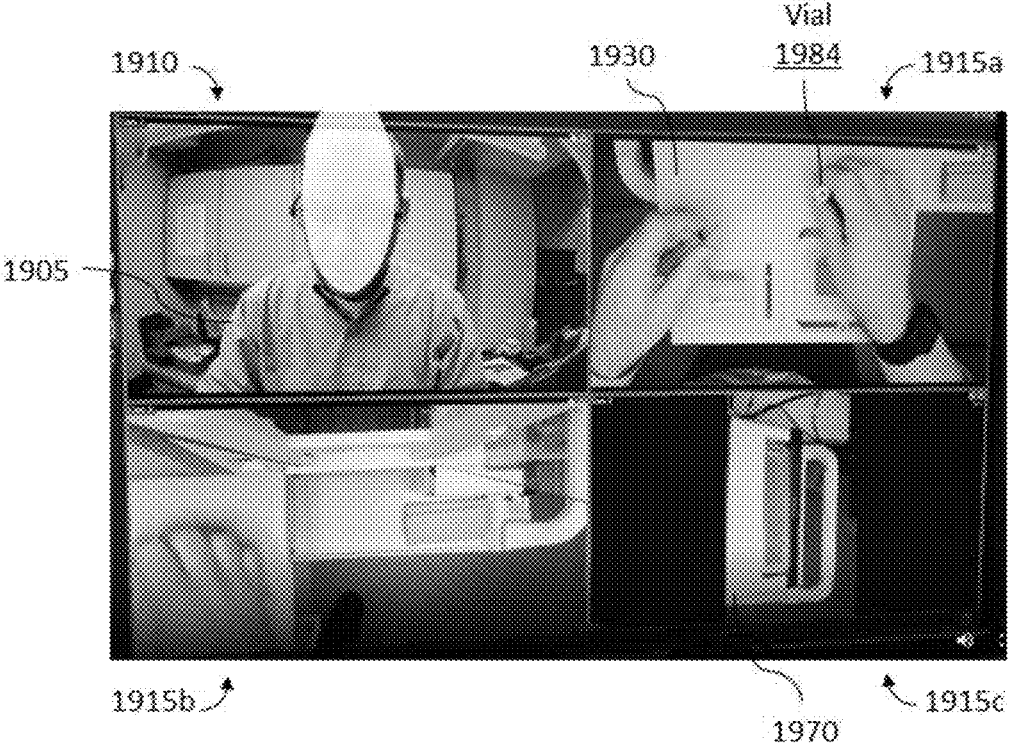
Figure 11C:
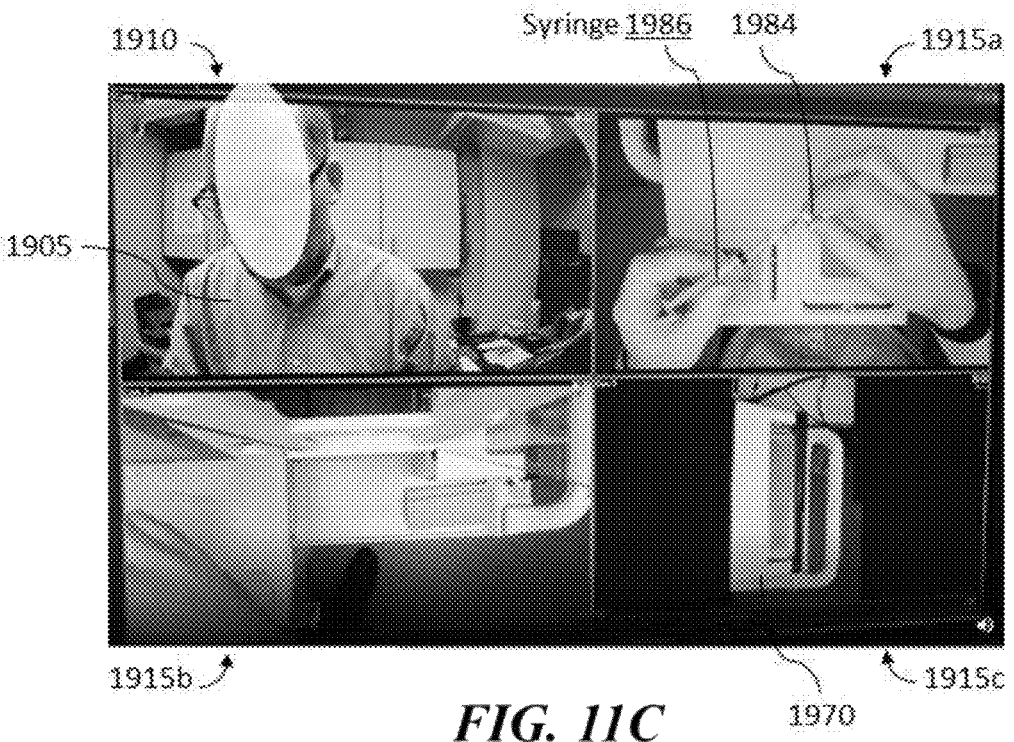
Figure 11D:
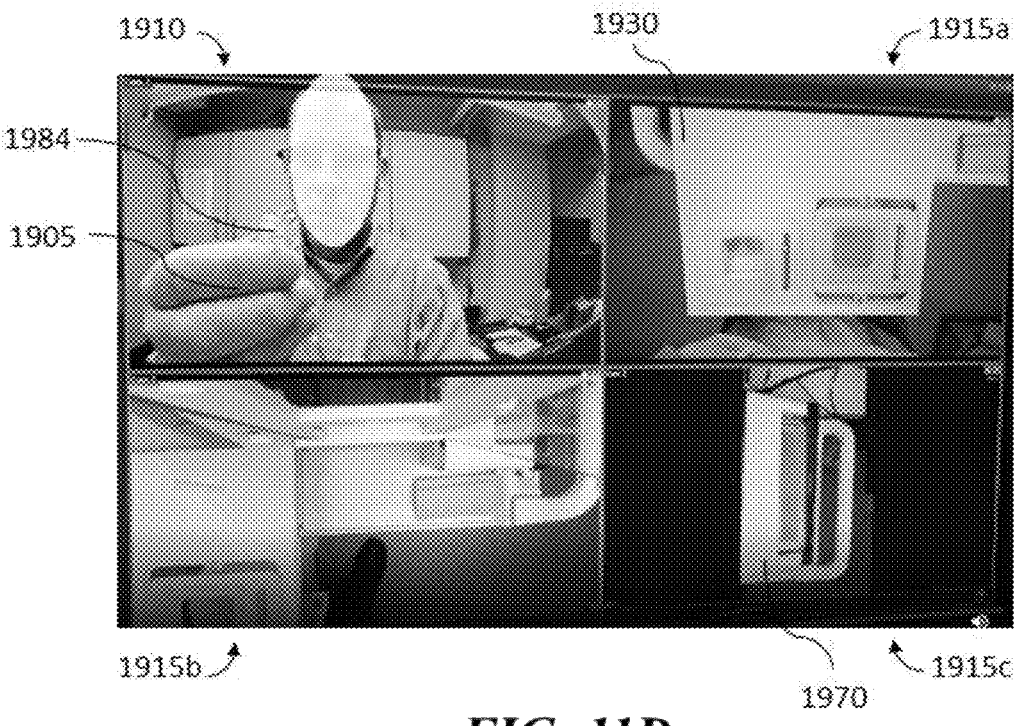
Figure 11E:
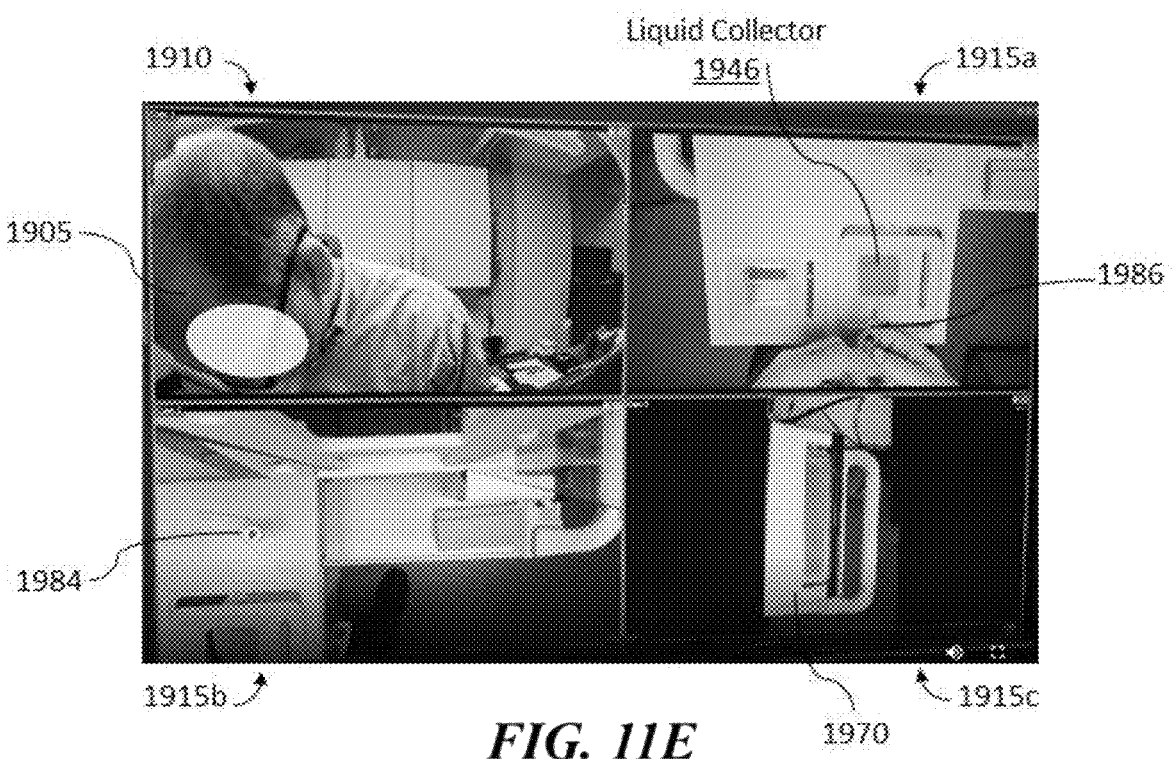
Figure 11F:
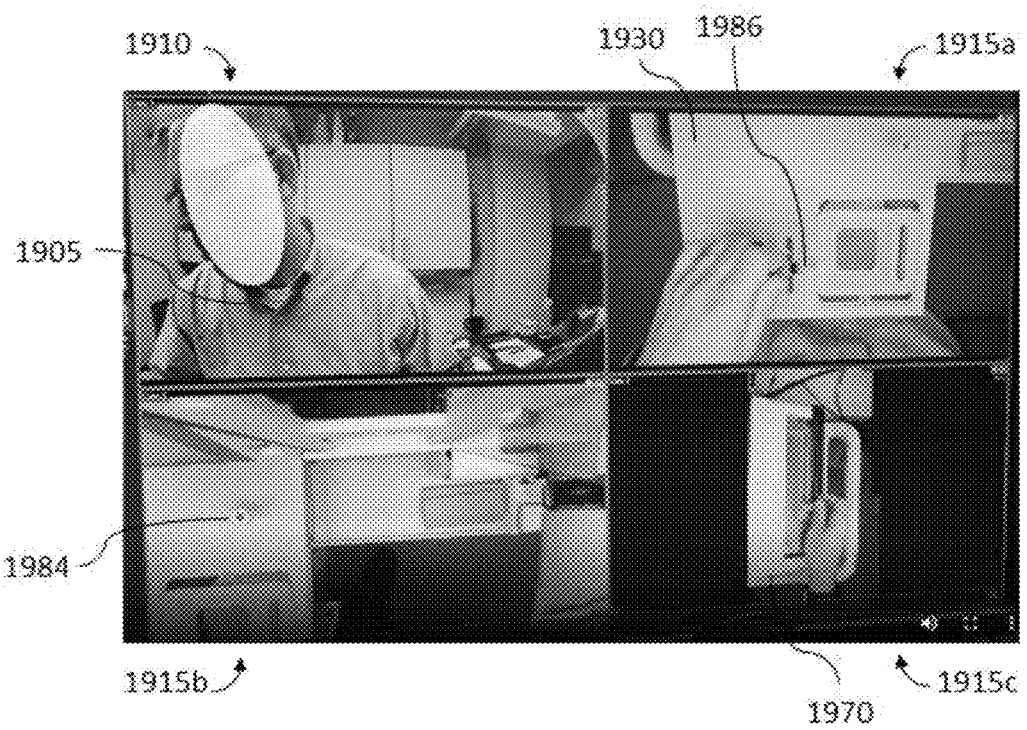
Figure 11G:
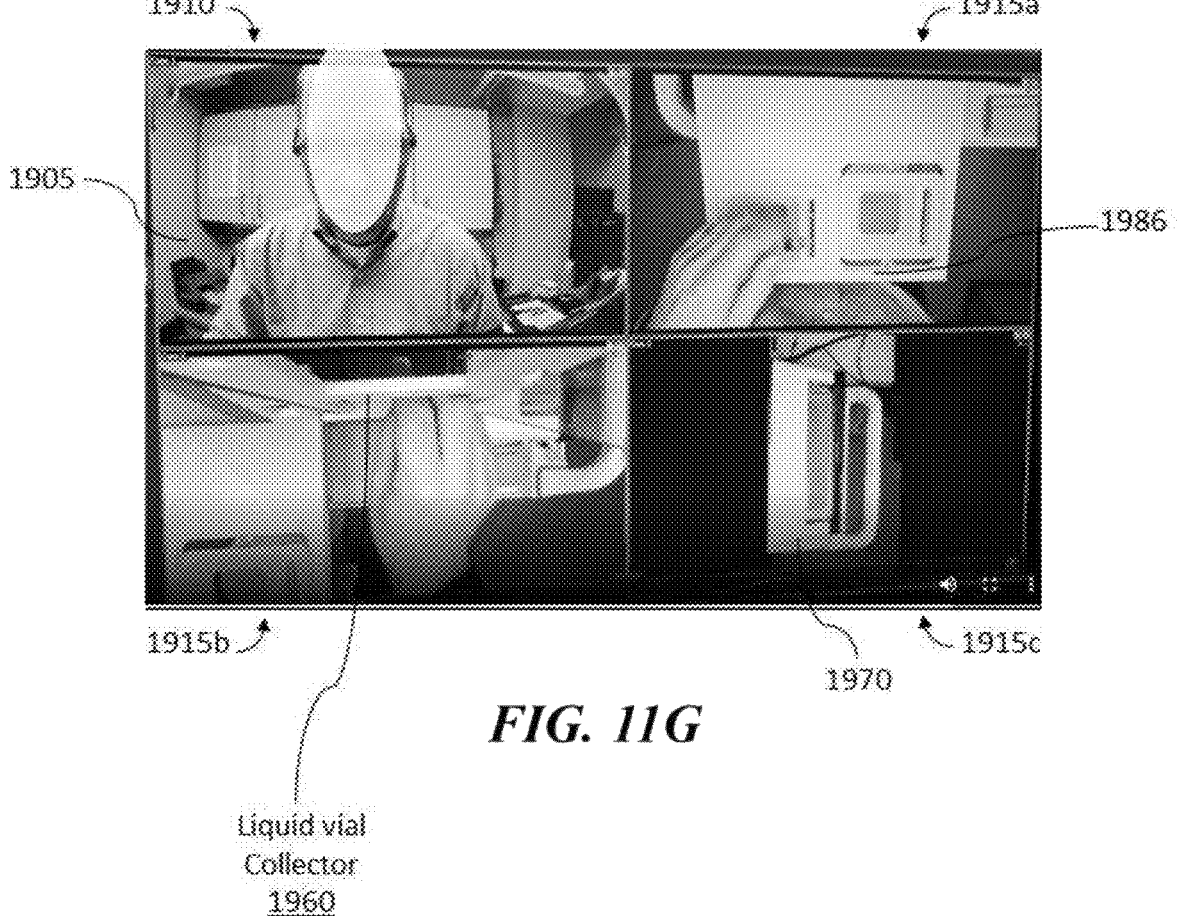

Referring to FIG. 11A, the user 1905 can approach the medication management system 1900 to log in to the system and initiate the liquid medication wasting process. The user can retrieve a liquid medication vial 1984 and a syringe 1986 from an ADC that is operatively coupled to the system 1900. The sharps bin 1970 can be disposed adjacent to the system 1900. Referring to FIG. 11B, the user 1905 can log into the system 1900 to gain access to the work station 1930, which comprises the liquid collector 1946. The user can use the surface of the work station 1930 to load the liquid medication into the syringe, e.g., for administration to a patient. Referring to FIG. 11C, the user can place a needle of the syringe 1986 inside the liquid medication vial 1984 in order to retrieve a sufficient amount of the liquid medication. At this time, the user 1905 is working near the work station 1930, and thus the camera 1915*a* can capture the user activity during medication dosing. Referring to FIG. 11D, the user 1905 is still retrieving the liquid medication from the vial 1984 into the syringe 1986. At this time, the user is working near the user identification camera 1910, and thus the user identification camera 1910 can capture the user activity during medication dosing. Referring to FIG. 11E, the work station 1930 can comprise the liquid collector 1946. Upon completion of the liquid medication loading to the syringe 1986, the user 1905 can squirt out air and/or excess liquid medication from the syringe 1986 into the liquid collector 1946, as shown by the image captured by the camera 1915*a*. The user can place the medication vial 1984 on the work station 1930 at this time, as shown in the image via the camera 1915*b*. Referring to FIG. 11F, the user can remove the sharp needle from the syringe 1986 and discard the sharp needle in the sharps bin 1970, as shown by the image captured by the camera 1915*c*. Referring to FIG. 11G, the user 1905 can deposit the liquid medication vial 1984 into the liquid vial collector 1960, as shown by the image captured by the camera 1915*b*.

Example 5: Medication Patch Wasting

The medication management system 1900 in Example 2 can be used for a user 1905 (e.g., a nurse) to deposit medication coverings (e.g., patches) for wasting. FIGS. 12A-12E show example images (or representations of videos) recorded by the user identification camera 1910 and the medication wasting cameras 1915*a* (for viewing the work station 1930 when extended out of the system 1900), 1915*b* (for viewing other collector regions of the system 1900), and 1915*c* (for viewing the sharps bin 1970) of the medication management system 1900 during patch wasting. The user 1905 is anonymized in the images for the purpose of identity security in the present disclosure. However, actual images or videos recorded by the medication management system 1900 may not and need not anonymize the users in order to accurately track the users during medication dosing and/or wasting.

Figure 12A:
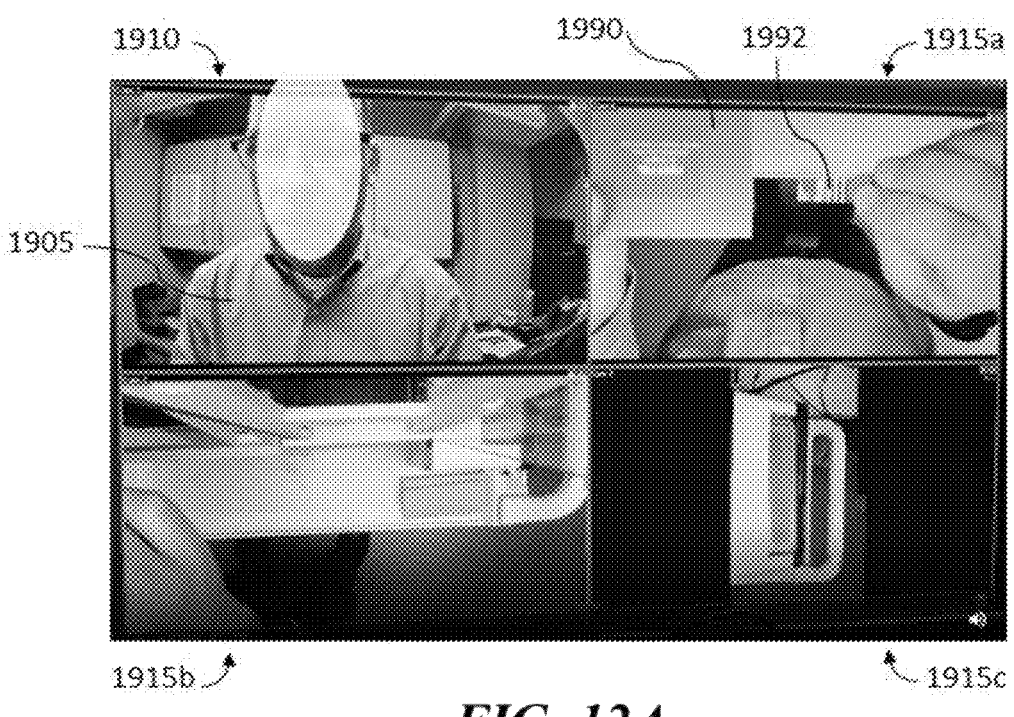
FIGS. 12A-12F show exemplary images obtained by cameras of a medication management system during a patch medication wasting process.
Figure 12B:
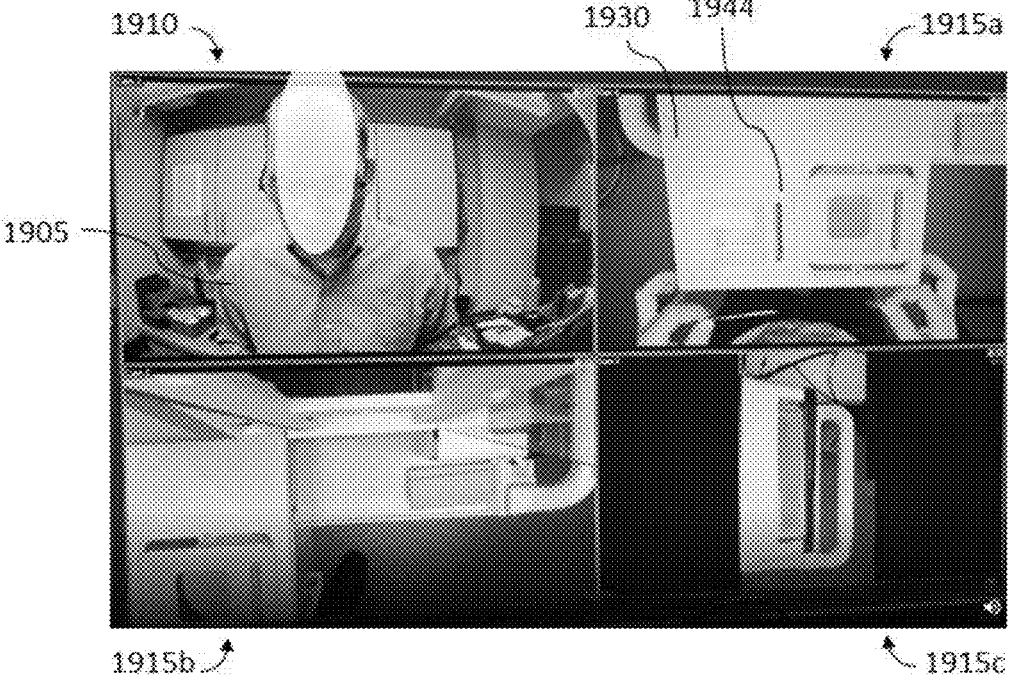
Figure 12C:
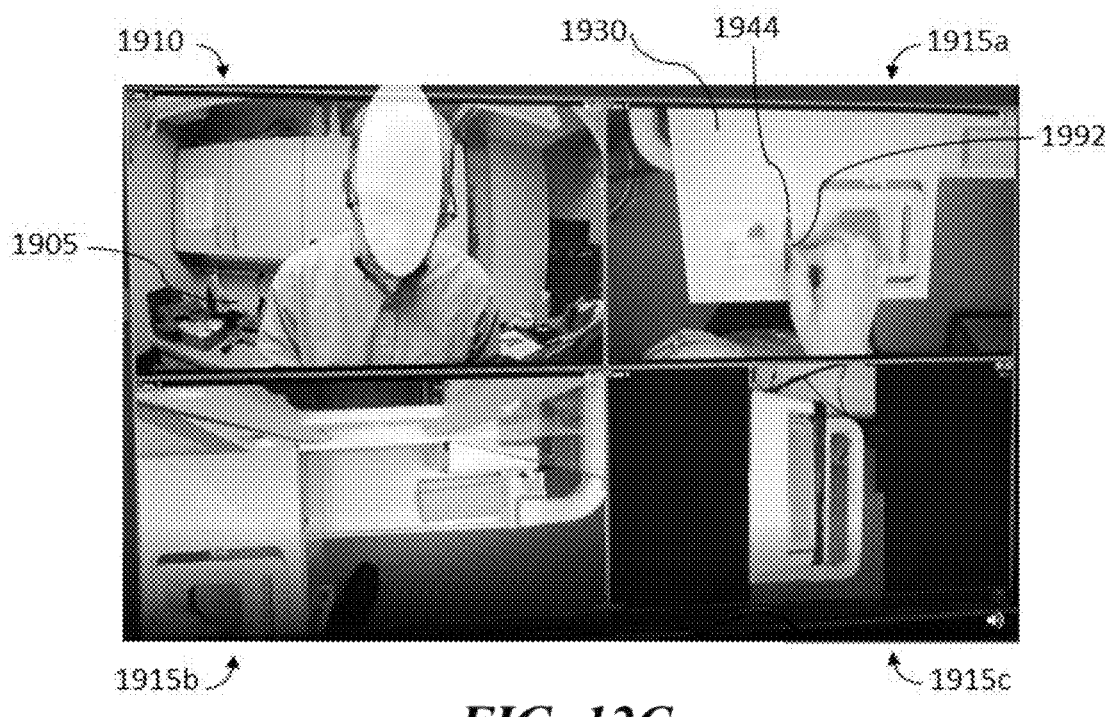
Figure 12D:
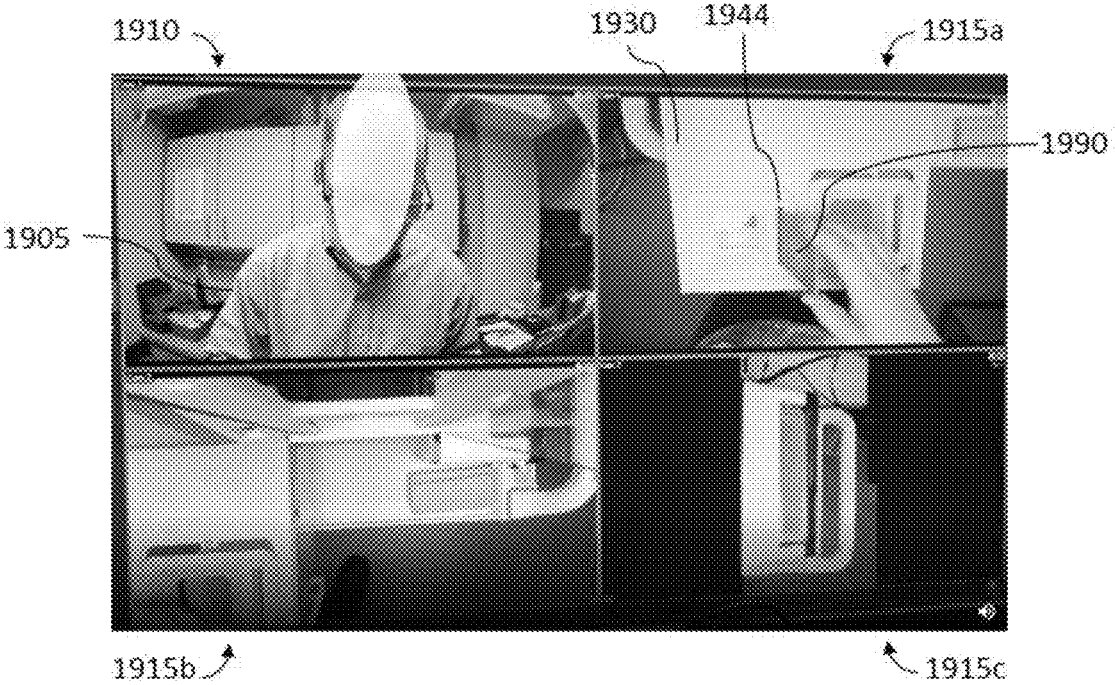
Figure 12E:
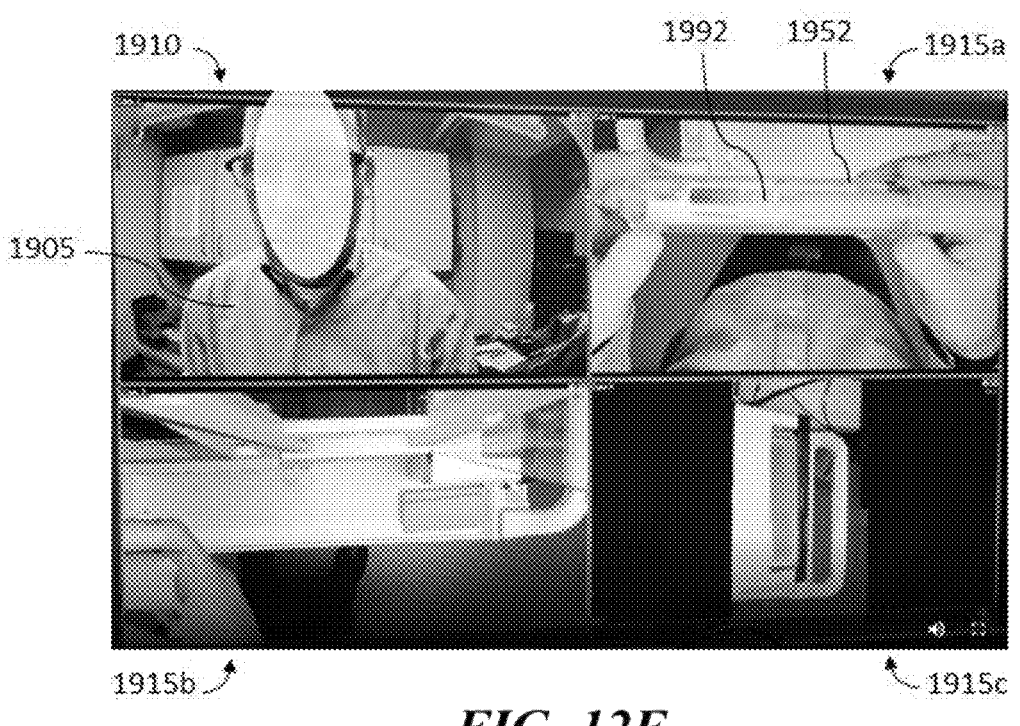
Figure 12F:
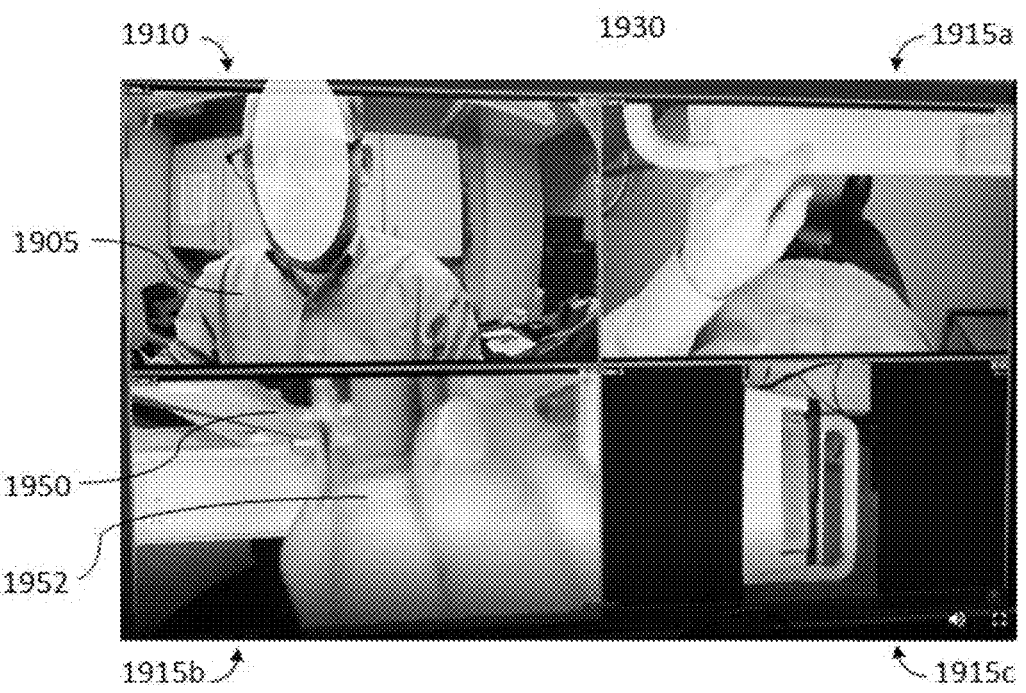

Referring to FIG. 12A, the user 1905 can approach the medication management system 1900 to log in to the system and initiate the patch wasting process. The user can deposit an unused patch 1990 (illustrated in the form of a "patch card" that protects the patch) and a used patch 1992 retrieved from a patient, as shown by the image captured by the camera 1915*a*. The used patch 1992 can be folded in half to hide the active side of the patch 1992. Referring to FIG. 12B, the user 1905 can log into the system 1900 to gain access to the work station 1930, which comprises the patch collector 1944. The patch collector 1944 can comprise a one-dimensional hole sufficient to allow one or more patch cards or used patches to pass through. Referring to FIG. 12C, the user 1905 can insert the used patch 1992 into the patch collector 1944. Referring to FIG. 0.12D, the user 1905 can insert the unused patch card 1990 into the patch collector 1944. Alternatively, referring to FIG. 12E, the user 1905 can use a patch removal device 1952 to remove the used patch 1992 from the patient. Afterwards, the user can bring the patch removal device 1952 (which comprises the used patch 1992) to the system 1900 for patch wasting. The user 1905 can position the patch removal device 1952 to the camera 1915a such that the patch 1992 (or an identifier thereof) can be scanned and verified by the system 1900. Following, refer- ring to FIG. 12F, the user 1905 can deposit the patch removal device 1952 into the patch removal device collector 1950, as shown by the image captured by the camera 1915b.

Example 6: Retail Medication Take-Back

Figures 21A, 21B:
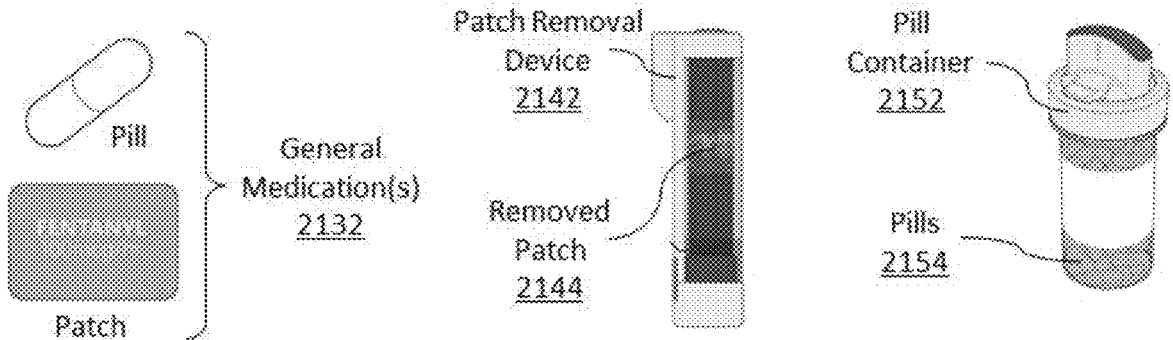
FIGS. 21A-21C schematically illustrates additional exemplary smart medication collection systems.

FIG. 21A schematically illustrates an example smart medication collection system 2100. The smart medication collection system 2100 can be disposed an outpatient facil- ity, a pharmacy, a post office, etc., to allow consumers or medication subscribers (e.g., patients or subjects taking prescribed medications) to take back any unused or leftover medications. The smart medication collection system 2100 can be configured to take-back medications only. As such, the smart medication collection system 2100 may not and need not contain any new medications to be dispensed to the consumer. The smart medication collection system 2100 can be a modular device, as disclosed herein, such that the smart medication collection system 2100 can be configurable or upgradable for different functions (e.g., modified to receive different types of medication handling units) or repair. The smart medication collection system 2100 can comprise one or more cameras for visual accountability of the consumers during disposal and wasting of one or more medications or medication containers. FIG. 21B schematically illustrates examples of general medications 2132 (e.g., pills, medica- tion patches, etc.) and medication handling units (e.g., a patch removal device 2142 configured to remove a used patch 2144 from the consumer, a pill container 2152 con- figured to contain pill medications 2154, etc.).

The smart medication collection system 2100 can utilize one or more components or features of (i) any subject medication management system (e.g., the medication man- agement system 1205 as shown in FIG. 3B) and/or (ii) any subject smart medication collection system (e.g., the smart medication collection system 100 a shown in FIGS. 14A- 14E), described in the present disclosure. Referring to FIG. 21A, the smart medication collection system 2100 can conceal any medication collection units when it is not in use (e.g., when a user has not logged in to the system). A medication collection unit can be opened (e.g., manually by the user, or automatically by a controller operatively coupled to the smart medication collection system 2100) during the medication wasting process. The smart medication collec- tion system 2100 can comprise one or more cameras 2110 that is configured to identify and track a user 2105 (e.g., a consumer of medications) during the user's medication wasting process. The camera(s) 2110 can record images and/or videos of the user, e.g., via facial tracking. The camera(s) 2110 can display the recorded images and/or videos in real-time on the display 2120. The camera(s) 2110 can be configured to track the actual medication disposal/ wasting process, e.g., record images/videos of the user's hands and the medications and/or the medication handling units being disposed for wasting. The smart medication collection system 2100 can comprise a single medication collector configured to receive different types of medications and/or medication handling units. In the alternative, the smart medication collection system 2100 can comprise a plurality of medication collectors, each configured to receive a unique type of medications or medication handling units. For example, the smart medication collection system 2100 can comprise: a general medication (e.g., pills or patches) collector 2130, a patch removal device collector 2140, and a pill container collector 2150. As a modular system, the smart medication collection system 2100 can additionally comprise an unused modular compartment 2160, which can be usable later, if necessary, to install at least one additional medication collector unit. The smart medication collection system 2100 can also comprise a printer 2125 to provide a receipt after the medication wasting process.

The smart medication collection system 2100 can scan the deposited medications and verifies the legitimacy and/or veracity of the medication return by the consumer, and then deposits the medications into one or more secure DEA- approved containers within the system 2100. During such analysis, the system 2100 can detect and record any attempted deception or diversion of medications by the consumer. In some cases, the consumer can receive awards (e.g., discounts, coupons, etc.) for compliance to the medi- cation take-back program and risk-reduction behavior. In some cases, a proxy of the consumer can be allowed to return the medications for providing anonymity to the con- sumer for medication take-back.

Figure 21C:
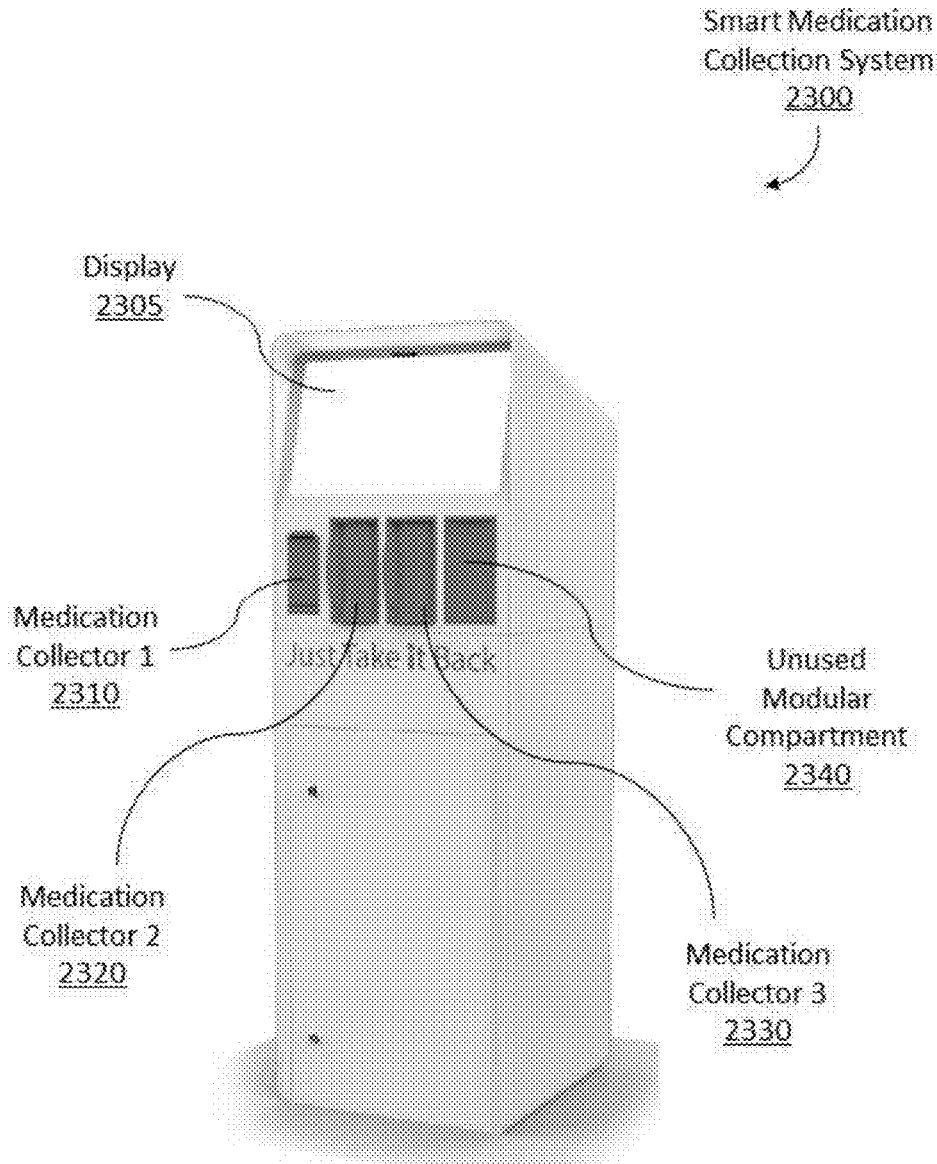

FIG. 21C schematically illustrates another exemplary smart medication collection system 2300. The smart medi- cation collection system 2300 can allow trackable, account- able disposal of excess medication with detailed reporting. The smart medication collection system 2300 can comprise one or more cameras to record images/videos of the user for virtual witnessing. Alternatively, the smart medication col- lection system 2300 may not or need not require any camera for recording the user. The smart medication collection system 2300 can generate discrepancy reports (e.g., discrep- ancy between the medication that is "reported" by the user and what is "detected" by the smart medication collection system 2300 via one or more medication sensors) in real- time, near real-time, or at a later time point. The smart medication collection system 2300 can be HIPAA compli- ant. Referring to FIG. 21C, the smart medication collection system 2300 can comprise a display 2305. The smart medi- cation collection system 2300 can comprise a plurality of medication collectors to collect different types of medica- tions and/or medication handling units. For example, the smart medication collection system 2300 can comprise medication collector 1 (2310) for users to drop off oral medication containers. The smart medication collection sys- tem 2300 can comprise medication collector 2 (2320) for users to drop off unused or leftover medication coverings (e.g., medical patches). The smart medication collection system 2300 can comprise medication collector 3 (2330) for users to drop off covering removal devices. In some cases, the smart medication collection system 2300 can comprise an unused modular compartment to configure another medi- cation collector.

FIG. 22 shows an example flowchart 2200 of the process for a user (e.g., a consumer or a medication subscriber) to dispose a medication or a medication handling unit to the smart medication collection system (e.g., the smart medica- tion collection system 2100 as shown in FIG. 21A). The user can log into the smart medication collection system via a user interface (e.g., a GUI) provided on a display of the smart medication collection system (process 2210). A new user or consumer can choose to create an account (e.g., by interacting via the GUI of the smart medication collection system) to be able to return any medications and receive rewards. The user can provide, on the user interface, a type, name, and/or amount of the medication being returned, either alone or as contained within the medication handling unit (process 2220). Optionally, the user can scan, by using an identification reader, an identifier of the medication and/or the medication handling unit to be disposed for wasting (process 2230). The user can open (e.g., pivot, turn, or rotate) a designated medication collector of the smart medication collection system (process 2240). In the alternative, the user can wait for the designated medication collector to open automatically, e.g., via a controller operatively coupled to the smart medication collection system. In some cases, the designated medication collector can be opened remotely by the user using a user device (e.g., a cell phone, a smart watch, personal computer, etc.). The user device can be operatively coupled to the smart medication collection system, such that the user can log into the user device to remotely open the designated medication collector (i.e., keyless medication drop-off). The user can dispose and waste the medication or the medication handling unit to the designated medication collector (e.g., the general medication collector 2130, the patch removal device collector 2140, and the pill container collector 2150 as shown in FIG. 21A) (process 2250). The user can additionally wait for a camera to capture image/video of the user and the disposal of the medication or the medication handling unit to the designated medication collector. The user can close the designated medication collector (process 2260). In the alternative, the user can wait for the designated medication collector to close automatically, e.g., via a controller operatively coupled to the smart medication collection system.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computer-implemented method for monitoring medication disposal, the method comprising:
(a) receiving, from a user, information associated with a prescribed medication to be discarded by the user;
(b) capturing a recording of the user while the user is discarding at least a portion of the prescribed medication to a waste collection unit comprising a medication neutralizer for deactivating discarded medications; and (c) analyzing the recording to determine a risk or probability of diversion of the prescribed medication by the user.

2. The method of claim 1, further comprising authenticating the user, wherein the user comprises a healthcare provider.

3. The method of claim 2, wherein authenticating a user comprises authenticating a user via one or more of:
a. a camera, a scanner, a sensor, a magnetic stripe reader, a biometric reader, or any combination thereof,
b. wherein the biometric reader comprises one or more of a fingerprint reader, a palm print reader, a hand geometry reader, a finger and/or palm vein pattern reader, a facial pattern reader, an iris reader, a retina reader, a heart rate reader, a pattern of behavior of the healthcare provider, or any combination thereof, or
c. wherein the pattern of behavior comprises a typing rhythm, voice recognition, or both.

4. The method of claim 1, wherein the prescribed medication information comprises (1) a number of the prescribed medication, (2) a weight of the prescribed medication, (3) a volume of the prescribed medication, (4) a chemical content of the prescribed medication, (5) a date or time of retrieval of the prescribed medication from a source of the prescribed medication, or (6) a date or time of administration of at least a portion of the prescribed medication to the patient.

5. The method of claim 1, wherein the prescribed medication information comprises information on a form of the prescribed medication, wherein the form of the prescribed medication is selected from the group consisting of: tablet, capsule, pill, powder, granule, dragee, gel, slurry, ointment, solution suppositories, inhalant, aerosol, transdermal patch, modifications thereof, or combinations thereof.

6. The method of claim 5, wherein the waste collection unit is selected from a plurality of waste collection units based on the form of the prescribed medication.

7. The method of claim 1, wherein capturing a recording of the user comprises capturing an image or video of a head of the healthcare provider and activity of hands of the healthcare provider during the disposing of the prescribed medication.

8. The method of claim 1, further comprising detecting the at least the portion of the prescribed medication that is discarded by the user.

9. The method of claim 8, wherein the detecting is based at least in part on analyzing at least a portion of the recording.

10. The method of claim 8, wherein the risk or probability of diversion is determined based on comparing (i) the information received from the user and (ii) the at least the portion of the prescribed medication that is detected.

11. The method of claim 8, wherein the risk or probability of diversion is determined to be low when the detected portion of the prescribed medication is at least 50% of an amount of a user input of the prescribed medication to be discarded.

12. The method of claim 8, wherein detecting the prescribed medication comprises measuring of one or more members of the following: (1) a number of the prescribed medication, (2) a weight of the prescribed medication, (3) a volume of the prescribed medication, (4) an optical property of the prescribed medication, or (5) a chemical content of the prescribed medication.

13. The method of claim 8, wherein detecting the prescribed medication comprises scanning a label on a surface of the prescribed medication.

14. The method of claim 1, wherein capturing the recording comprises generating a digital communication between a medication monitoring software module and at least one sensor.

15. The method of claim 1, further comprising storing a digital data representative of the recording in a database, wherein the digital data from the database is accessible for monitoring proper wasting of the prescribed medication by the user.

16. The method of claim 1, further comprising executing a virtual witness program to supplement or replace an onsite human witness during the disposing of the prescribed medication by the user.

17. The method of claim 16, wherein determining a risk or probability of diversion comprises executing the virtual witness program.

18. The method of claim 17, wherein the virtual witness program enables video transmissions during the disposal for synchronous or asynchronous review by a remote human witness to monitor for diversion of the prescribed medication.

19. The method of claim 1, wherein the medication neutralizer comprises one or more of a chemical neutralizer, or a mechanical neutralizer.

20. The method of claim 1, wherein the prescribed medication to be discarded by the user comprises an amount of an unused or leftover portion of the prescribed medication.

21. The method of claim 1, wherein discarding the at least a portion of the prescribed medication comprises discarding at least the portion of the prescribed medication to an opening of a working station, wherein the opening is in fluid communication with the waste collection unit for collecting wasted medications through the opening and within the waste collection unit.

* * * * *